United States Patent
Ito

(10) Patent No.: US 9,604,550 B2
(45) Date of Patent: Mar. 28, 2017

(54) SEAT DRIVE DEVICE

(71) Applicant: AISIN SEIKI KABUSHIKI KAISHA, Kariya-shi (JP)

(72) Inventor: Sadao Ito, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 496 days.

(21) Appl. No.: 14/342,184

(22) PCT Filed: Sep. 20, 2012

(86) PCT No.: PCT/JP2012/074003
§ 371 (c)(1),
(2) Date: Feb. 28, 2014

(87) PCT Pub. No.: WO2013/061715
PCT Pub. Date: May 2, 2013

(65) Prior Publication Data
US 2014/0238188 A1    Aug. 28, 2014

(30) Foreign Application Priority Data

Oct. 24, 2011   (JP) ................................ 2011-233289
Aug. 10, 2012   (JP) ................................ 2012-178451

(51) Int. Cl.
*B60N 2/02*   (2006.01)
*B60N 2/06*   (2006.01)
(Continued)

(52) U.S. Cl.
CPC ......... *B60N 2/0232* (2013.01); *B60N 2/0228* (2013.01); *B60N 2/0252* (2013.01);
(Continued)

(58) Field of Classification Search
CPC ... B60N 2/02; B60N 2/06; B60N 2/10; B60N 2/16; B60N 2/1635; B60N 2/22;
(Continued)

(56) References Cited

U.S. PATENT DOCUMENTS 3,105,669 A * 10/1963 Pickles ................ B60N 2/0232
                                                248/394
4,470,318 A *  9/1984 Cremer ................ B60N 2/0232
                                                248/396
(Continued)

FOREIGN PATENT DOCUMENTS

DE     102 47 703 B3    4/2004
JP       58 97528       6/1983
(Continued)

OTHER PUBLICATIONS

English language translation of the International Preliminary Report on Patentability and Written Opinion issued Apr. 29, 2014 in PCT/JP2012/074003.
(Continued)

*Primary Examiner* — Philip Gabler
(74) *Attorney, Agent, or Firm* — Oblon, McClelland, Maier & Neustadt, L.L.P.

(57) ABSTRACT

A seat drive device is provided with: a single rotary motor; a plurality of operating members, which are arranged to correspond to a plurality of positioning mechanisms; a plurality of tubular members, which are arranged to correspond to the positioning mechanisms and selectively connect an output shaft to the positioning mechanism corresponding to the operating member operated with the operation of any one of the operating members and input shafts rotated by the rotary motor; and a single switch, which passes an electric current through the rotary motor with a (Continued)

polarity corresponding to the direction of the operation with the operation of any one of the operating members.

17 Claims, 30 Drawing Sheets

(51) Int. Cl.
*B60N 2/16* (2006.01)
*B60N 2/18* (2006.01)
*B60N 2/225* (2006.01)
*B60N 2/07* (2006.01)
*B60N 2/22* (2006.01)

(52) U.S. Cl.
CPC ............ *B60N 2/0296* (2013.01); *B60N 2/06* (2013.01); *B60N 2/067* (2013.01); *B60N 2/0705* (2013.01); *B60N 2/0715* (2013.01); *B60N 2/165* (2013.01); *B60N 2/1615* (2013.01); *B60N 2/1839* (2013.01); *B60N 2/1864* (2013.01); *B60N 2/22* (2013.01); *B60N 2/225* (2013.01); *B60N 2002/024* (2013.01); *B60N 2002/0212* (2013.01); *B60N 2002/0236* (2013.01); *Y10T 74/19019* (2015.01)

(58) Field of Classification Search
CPC ...... B60N 2/44; B60N 99/00; B60N 2002/02; B60N 2002/0224; B60N 2002/0236; B60N 2002/024; B60N 2/0232; B60N 2/0228; B60N 2/0252; B60N 2/0296; B60N 2/067; B60N 2/0705; B60N 2/0715; B60N 2/1615; B60N 2/165; B60N 2/1839; B60N 2/1864; B60N 2/225; Y10T 74/19019

See application file for complete search history.

(56) References Cited

U.S. PATENT DOCUMENTS

| 4,932,290 | A | * | 6/1990 | Toyoda | ................. | B60N 2/0232 192/48.8 |
|---|---|---|---|---|---|---|
| 5,009,296 | A | * | 4/1991 | Ohkawa | ............... | B60N 2/0232 192/20 |
| 5,103,691 | A | * | 4/1992 | Periou | .................. | B60N 2/0248 74/665 GD |
| 5,163,734 | A | * | 11/1992 | Hakansson | .......... | B60N 2/0224 248/396 |
| 5,882,075 | A | * | 3/1999 | Partington | ........... | B60N 2/0228 248/157 |
| 6,553,866 | B1 | * | 4/2003 | Ursel | .................... | B60N 2/0224 297/330 |
| 8,621,960 | B2 | * | 1/2014 | Wrong | ................. | F16H 37/065 297/344.13 |
| 2011/0095584 | A1 | | 4/2011 | Tomida et al. | | |

FOREIGN PATENT DOCUMENTS

| JP | 63 199139 | 8/1988 |
|---|---|---|
| JP | 3 501832 | 4/1991 |
| JP | 6 9945 | 2/1994 |
| JP | 6 87363 | 3/1994 |
| JP | 6 71324 | 10/1994 |
| JP | 2011 11606 | 1/2011 |
| JP | 2011 93359 | 5/2011 |
| WO | WO 2010/058151 A1 | 5/2010 |
| WO | WO 2011/024964 A1 | 3/2011 |

OTHER PUBLICATIONS

International Search Report Issued Oct. 30, 2012 in PCT/JP12/074003 Filed Sep. 20, 2012.
Extended European Search Report issued Feb. 5, 2015 in Patent Application No. 12842792.9.

* cited by examiner

Fig.7(a) Fig.7(b)
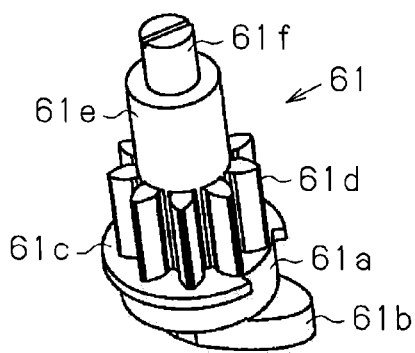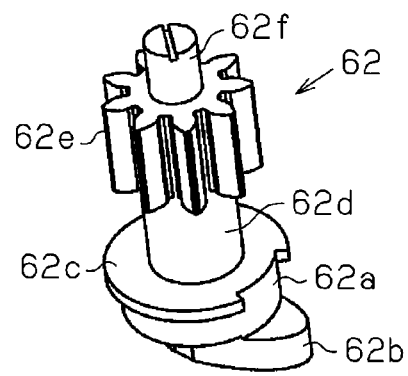
Fig.8
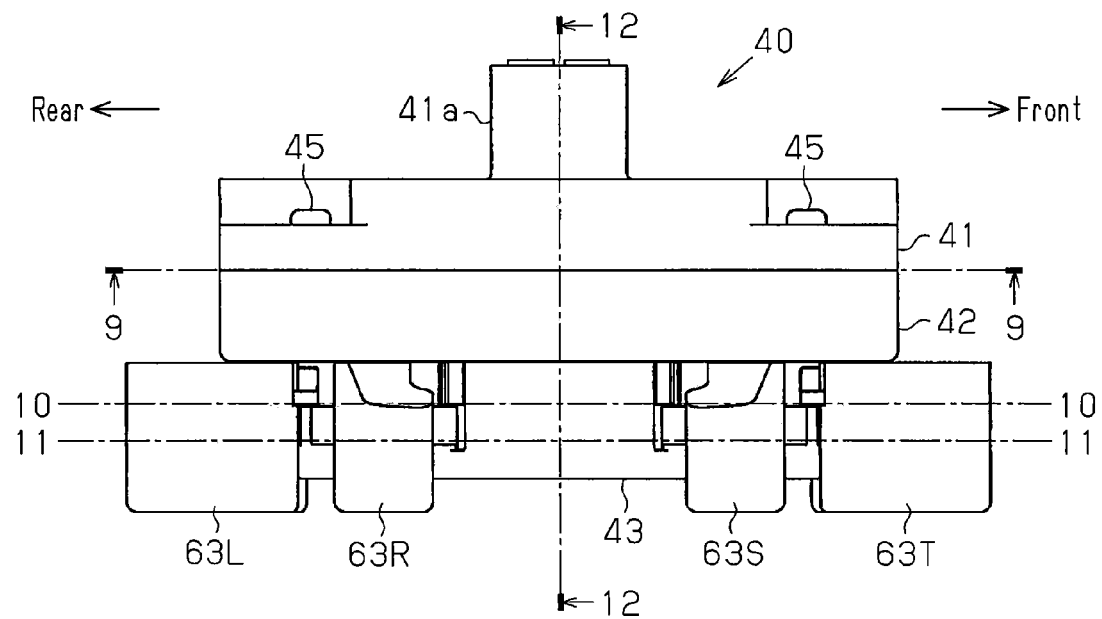

SEAT DRIVE DEVICE

FIELD OF THE INVENTION

The present invention relates to a seat drive device that selectively actuates positioning mechanisms with a single rotary motor.

BACKGROUND OF THE INVENTION

Various types of such a seat drive device have been proposed conventionally. As an example, Patent Document 1 describes a seat drive device with three positioning mechanisms (including two vertical positioning mechanisms arranged on the front side and the rear side and one fore-and-aft positioning mechanism). Output shafts to these positioning mechanisms can be drivably coupled to a single rotary motor through corresponding electromagnetic clutches and gear mechanisms.

Specifically, as shown in FIG. 42, operation switches 201, 202 and 203 related to operations on corresponding positioning mechanisms energize a single rotary motor 204 with polarities corresponding to directions of operations on the operation switches 201, 202 and 203. Further, the operation switches 201, 202 and 203 energize solenoids 206, 207 and 208 respectively of electromagnetic clutches to drivably couple output shafts to these positioning mechanisms and the rotary motor 204. This causes the rotary motor 204 to drive the positioning mechanisms through the electromagnetic clutches and gear mechanisms, so that an appropriate positioning mechanism performs positioning.

Patent Document 2 describes a seat drive device with two positioning mechanisms (two vertical positioning mechanisms arranged on the front side and the rear side). As shown in FIG. 43, output shafts 211 and 212 to the corresponding positioning mechanisms can be drivably coupled to a single rotary motor through a differential gear mechanism 215. The motion of the differential gear mechanism 215 is switched by two locking mechanisms 213 and 214 provided for the output shafts 211 and 212 respectively. Specifically, the differential gear mechanism 215 has an input channel coupled to the rotary motor and two output channels coupled to the corresponding ones of the output shafts 211 and 212 of the positioning mechanisms.

For actuation of one of the positioning mechanisms, in order to lock the output shaft 211 (212) to the other positioning mechanism, a plunger 213a (214a) of the pertinent locking mechanism 213 (214) is actuated. Then, the output shaft 211 (212) to the other positioning mechanism is coupled to the rotary motor through the differential gear mechanism 215 in a manner that disables drive by the rotary motor, so that the appropriate positioning mechanism performs positioning.

Patent Document 3 describes a seat drive device with two positioning mechanisms (including a reclining mechanism and a fore-and-aft positioning mechanism). As shown in FIG. 44, an output shaft 221 to one of the positioning mechanisms contacts two friction wheels 222 and 223 and permits movement of the friction wheels 222 and 223 while contacting the friction wheels 222 and 223. A spring 224 extends under tension between the friction wheels 222 and 223. A control knob 225 to move the friction wheels 222 and 223 is provided between the friction wheels 222 and 223. The control knob 225 is linked through an actuating plate 227 and an operation lever 228 to an operation button 226 relating to the aforementioned positioning mechanism. In response to operation on the operation button 226, the actuating plate 227 moves back and forth depending on the direction of the operation while the operation lever 228 swings. This makes the control knob 225 move the friction wheels 222 and 223 to couple one of the friction wheels 222 and 223 to a rotary shaft R of a rotary motor M in a manner that enables drive by the rotary motor M.

Likewise, an output shaft 231 to the other positioning mechanism contacts two friction wheels 232 and 233 and permits movement of the friction wheels 232 and 233 while contacting the friction wheels 232 and 233. A spring 234 extends under tension between the friction wheels 232 and 233. A control knob 235 to move the friction wheels 232 and 233 is provided between the friction wheels 232 and 233. The control knob 235 is linked through an actuating plate 237 and an operation lever 238 to an operation button 236 relating to the other positioning mechanism. In response to operation on the operation button 236, the actuating plate 237 moves back and forth depending on the direction of the operation while the operation lever 238 swings. This makes the control knob 235 move the friction wheels 232 and 233 to couple one of the friction wheels 232 and 233 to the rotary shaft R of the rotary motor M in a manner that enables drive by the rotary motor M.

The operation buttons 226 and 236 are linked through the actuating plates 227 and 237 respectively to a switch SW that energies the rotary motor M and discontinues energization of the rotary motor M. In response to operations on the operation buttons 226 and 236, the actuating plates 227 and 237 move back and forth depending on directions of the operations, thereby energizing the rotary motor M simultaneously with appropriate polarities.

As an example, for actuation of one of the positioning mechanisms, the pertinent operation button 226 (236) is operated and this moves the friction wheels 222 and 223 (232 and 233) together with the control knob 225 (235). Then, one of the friction wheels 222 and 223 (232 and 233) corresponding to the direction of the operation is linked to the rotary shaft R and the rotary motor M is energized with a polarity corresponding to the direction of the operation, so that the rotary shaft R is coupled to the output shaft 221 (231) through the appropriate friction wheel 222 or 223 (232 or 233). As a result, the aforementioned positioning mechanism performs positioning. This also applies to actuation of the other positioning mechanism.

PATENT DOCUMENTS

Patent Document 1: Japanese Laid-Open Patent Publication No. 58-97528
Patent Document 2: Japanese Examined Patent Publication No. 6-9945
Patent Document 3: Japanese Laid-Open Patent Publication No. 63-199139

SUMMARY OF THE INVENTION

The device of Patent Document 1 requires the operation switches 201 to 203 and the electromagnetic clutches (solenoids 206 to 208) both of which are the same in number as the outputs to the positioning mechanisms. Hence, increasing positioning mechanisms always involves complication of the electric circuits, for example.

The device of Patent Document 2 requires at least the locking mechanisms 213 and 214 (plungers 213a and 214a) same in number as the outputs to the two positioning mechanisms. This always involves complication of an electric circuit. Additionally, actuating both the positioning mechanisms selectively uses the differential gear mechanism 215 having one input channel and two output channels. This means that the device of Patent Document 2 produces only "two" outputs so that it does not achieve a sufficient positioning function for a seat.

The device of Patent Document 3 moves the three friction wheels in response to operations on the operation buttons 226 and 236. Such dynamic movements always involve increase of required operation force. These three friction wheels rotate about different rotation axes, so that size increase of the entire device is unavoidable.

It is an objective of the present invention to provide a seat drive device capable of relaxing restrictions on the number of functions relating to positioning of a seat without causing size increase of the entire device and complication of the electrical structure.

Means for Solving the Problems

To achieve the foregoing objective and in accordance with one aspect of the present invention, a seat drive device including a single rotary motor, a plurality of operating members provided in correspondence with a plurality of positioning mechanisms, a plurality of clutch mechanisms provided in correspondence with the positioning mechanisms, and a single switch is provided. Each of the clutch mechanisms includes an output shaft and an input shaft. The output shaft is connected to a corresponding positioning mechanism, and the input shaft is rotated by the rotary motor. In response to operation on any one of the operating members, the clutch mechanism selectively connects the output shaft to the positioning mechanism corresponding to the operated operating member to the input shaft rotated by the rotary motor. In response to operation on any one of the operating members, the switch energizes the rotary motor with a polarity corresponding to a direction of the operation.

The aforementioned structure uses the single rotary motor and the single switch. This achieves a simpler electrical structure. Each of the clutch mechanisms has a structure (a shaft coupling) that connects the output shaft to the corresponding one of the positioning mechanisms and the input shaft. This allows layout where arrangements are concentrated in areas around the output shaft, so that the device as a whole can be reduced further in size. Additionally, functions (positioning mechanisms) relating to positioning of a seat can be increased to a number corresponding to the number of the output shafts. This relaxes restrictions further on the number of these functions.

BRIEF DESCRIPTION OF THE DRAWINGS

FIGS. 7(a) and 7(b) are perspective views showing a first cam member and a second cam member respectively;

FIG. 8 is a plan view showing the first embodiment;

DETAILED DESCRIPTION OF THE PREFERRED EMBODIMENTS

First Embodiment

Figure 1:
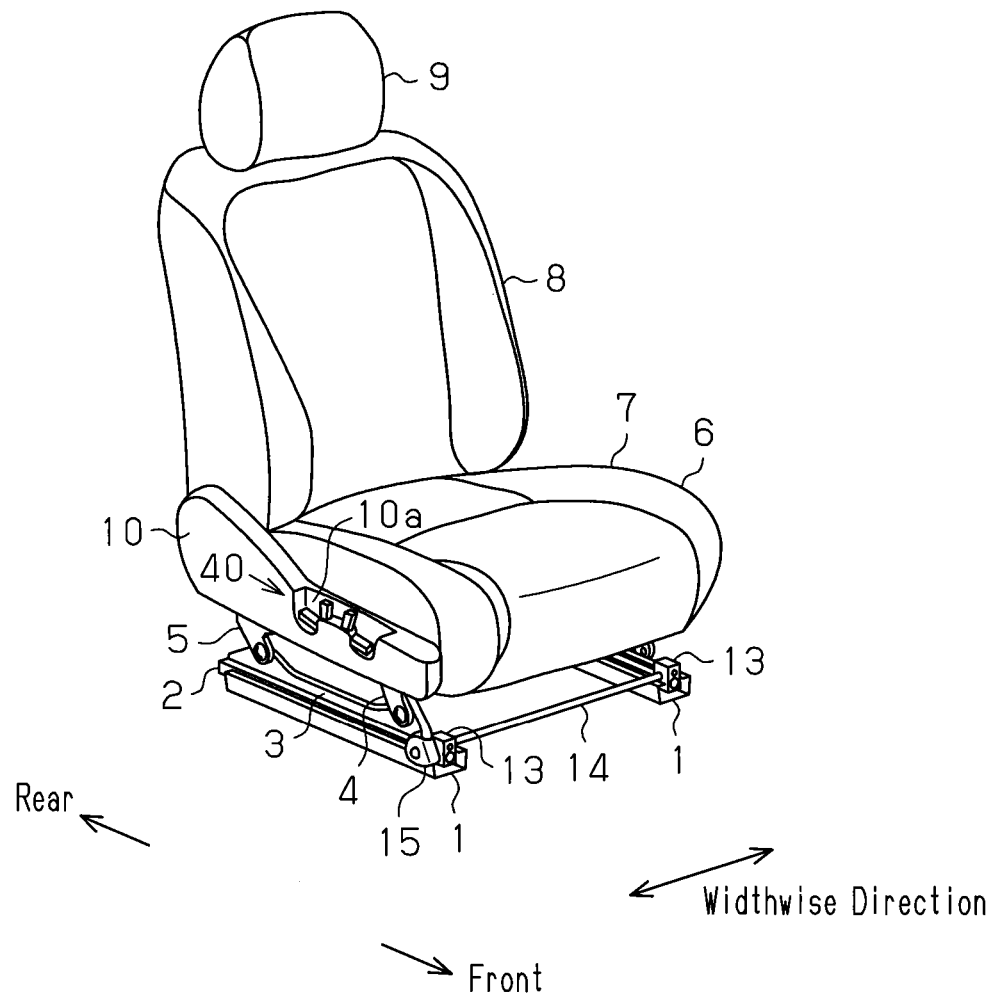
FIG. 1 is a perspective view showing an eight-way power seat to which a seat drive device of a first embodiment of the present invention is applied.

A first embodiment of the present invention will now be described by referring to FIGS. 1 to 21. As shown in FIG. 1, the floor of a vehicle is provided with two fixed lower rails 1 arranged side by side in the direction of the seat width and extending in the fore-and-aft direction. Two upper rails 2 are attached to the corresponding ones of the two lower rails 1 to be movable in the fore-and-aft direction.

Each of the upper rails 2 has a bracket 3 in an upright position composed of a plate material. Each of the brackets 3 supports a seat 6 through a front link 4 and a rear link 5 arranged on the front side and the rear side of the bracket 3. The seat 6 forms a seating part for an occupant. The seat 6 is composed of a seat cushion 7 forming a seating surface, a seat back 8 supported on a rear end portion of the seat cushion 7 to be movable in a tilting (pivoting) manner, and a head rest 9 supported on an upper end portion of the seat back 8.

The position of the seat 6 can be adjusted in the fore-and-aft direction by moving the lower rails 1 and the upper rails 2 on the opposite sides relative to each other. The position of the seat 6 can be adjusted in an up-and-down direction, specifically in a vertical direction by moving the front links 4 and the rear links 5 on the opposite sides. The seat 6 is adjustable in terms of the angle of tilt of a front part of the seat cushion 7 relative to a rear part of the seat cushion 7. The seat 6 is further adjustable in terms of the angle of tilt of the seat back 8 relative to the seat cushion 7. Thus, a person seated on the seat 6 can adjust the position of the eyes according to the physical size of the person, for example.

Figure 2:
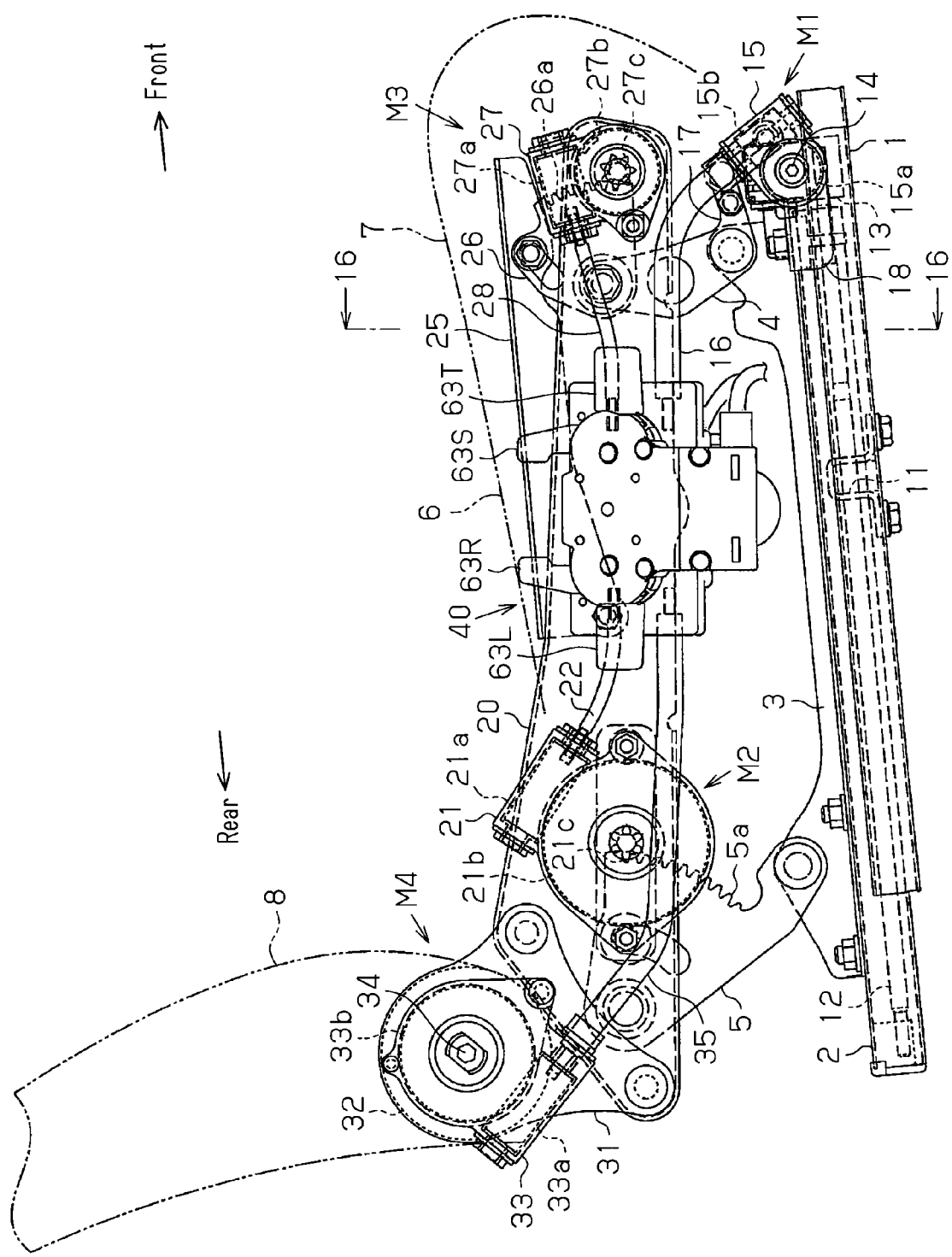
FIG. 2 is a side view showing the first embodiment.

The following further describes a structure relating to positioning of the seat 6. As shown in FIG. 2, a slide nut member 11 having an internal thread part extending through the slide nut member 11 in the fore-and-aft direction is fixed to the lower rail 1 on each side. The upper rail 2 on each side supports a slide lead screw 12 extending in the fore-and-aft direction and having an external thread part to threadedly engage the internal thread part of the slide nut member 11.

A slide gear box 13 is attached to a front end portion of each upper rail 2. The slide gear box 13 includes two built-in helical gears (not shown in the drawings) having respective axes: one extending in the fore-and-aft direction (direction of the axis of the lead screw 12) and one extending in the direction of the seat width. One of the helical gears having the axis extending in the fore-and-aft direction is coupled to the lead screw 12 to rotate integrally with the lead screw 12. The other helical gear having the axis extending in the direction of the seat width is coupled to a slide coupling rod 14 in the shape of a polygonal column to rotate integrally with the slide coupling rod 14. The slide coupling rod 14 has an axis extending in the direction of the seat width and bridges between the slide gear boxes 13 on the opposite sides.

The upper rail 2 on one side (right side as viewed in the direction toward the front of the seat) has a direction converting gear unit 15 arranged side by side with and externally to the slide gear box 13. The direction converting gear unit 15 has two built-in helical gears 15a and 15b. The helical gear 15a has an axis extending in the direction of the seat width (direction of the axis of the slide coupling rod 14). The helical gear 15b has an axis extending in substantially the fore-and-aft direction. One helical gear 15a is coupled to the slide coupling rod 14 to rotate integrally with the slide coupling rod 14. The other helical gear 15b is coupled to a slide torque cable 16 extending toward the back from the direction converting gear unit 15 to rotate integrally with the slide torque cable 16.

Thus, if the slide torque cable 16 rotates, the rotation is converted in direction by 90 degrees between the helical gear 15b on an input side of the direction converting gear unit 15 and the helical gear 15a on an output side thereof, and is then transmitted to the slide coupling rod 14. Rotation of the slide coupling rod 14 is converted in direction by 90 degrees at the slide gear boxes 13 on the opposite sides and is then transmitted to the slide lead screws 12 on the opposite sides. As a result, rotary motion of the slide lead screw 12 is converted to linear motion of the slide lead screw 12 relative to the slide nut member 11 by the action of a screw achieved by the slide lead screw 12 and the slide nut member 11 on each side. Then, the upper rails 2 move in the fore-and-aft direction relative to the lower rails 1.

A helical gear of the slide gear box 13 on an output side has a gear diameter larger than that of a helical gear of the slide gear box 13 on an input side. Rotation of the helical gear on the input side is decelerated during the aforementioned direction conversion and is then transmitted to the helical gear on the output side (and the slide lead screw 12). The slide nut member 11, the slide lead screw 12, the slide gear box 13, the slide coupling rod 14, and the direction converting gear unit 15 form a slide mechanism M1 as a positioning mechanism together with the lower rails 1 and the upper rails 2.

The front link 4 on each side has one end portion pivotally coupled to the bracket 3 and an opposite end portion pivotally coupled to a lower arm 20 composed of a plate material forming a frame of a lateral part of the seat cushion 7. The rear link 5 on each side has one end portion pivotally coupled to the bracket 3 and an opposite end portion pivotally coupled to the lower arm 20. Accordingly, the bracket 3 (upper rail 2), the front link 4, the rear link 5, and the lower arm 20 form a four-bar linkage while the lower arm 20 functions as an intermediate bar (joint bar) thereof.

The rear link 5 on one side, specifically on the right side as viewed in the direction toward the front of the seat has a sector gear section 5a spreading substantially in a sectoral pattern about a support shaft supported on the lower arm 20 toward the front side of the rear link 5. A lifter gear box 21 external to the lower arm 20 on the right side is attached to this lower arm 20. The lifter gear box 21 has a built-in speed reduction mechanism composed of a worm 21a and a worm wheel 21b (specifically, a worm gear). The lifter gear box 21 further has a lifter pinion 21c coaxial with the worm wheel 21b that rotates integrally with the worm wheel 21b. The lifter pinion 21c is exposed from the lifter gear box 21. The lifter pinion 21c has an axis extending in the direction of the seat width and makes meshing engagement with the sector gear section 5a of the rear link 5. The worm 21a is coupled to a lifter torque cable 22 extending toward the front from the lifter gear box 21 to rotate integrally with the lifter torque cable 22.

Thus, if the lifter torque cable 22 rotates, the rotation is decelerated between the worm 21a on an input side of the lifter gear box 21 and the worm wheel 21b on an output side thereof, and is then transmitted to the lifter pinion 21c. Rotation of the lifter pinion 21c is transmitted to the rear link 5 with the sector gear section 5a in meshing engagement with the lifter pinion 21c, thereby causing the rear link 5 to pivot about the support shaft supported on the lower arm 20. This causes both of the front link 4 and the rear link 5 forming the four-bar linkage to pivot about respective support shafts supported on the bracket 3, so that the lower arm 20 (seat 6) moves up and down relative to the bracket 3. The front link 4, the rear link 5, and the lifter gear box 21 form a lifter mechanism M2 as a positioning mechanism together with the bracket 3 (upper rail 2) and the lower arm 20.

Figure 3:
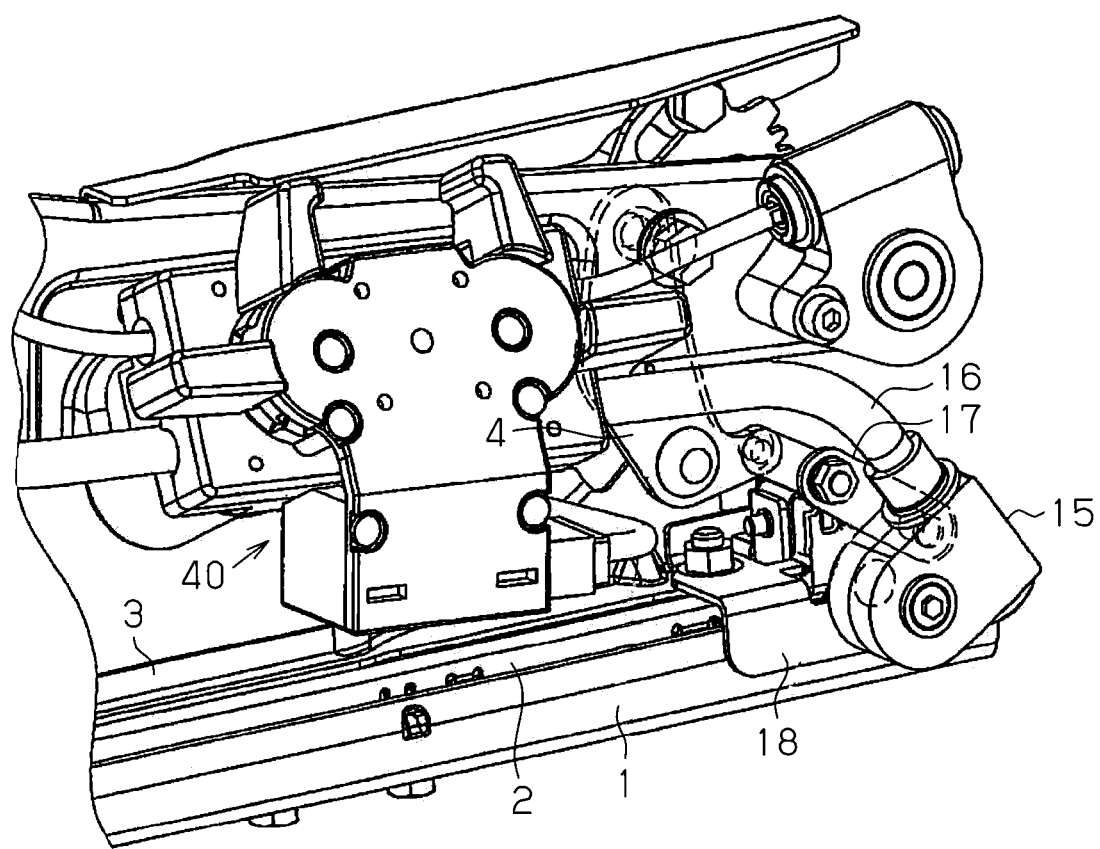
FIG. 3 is a perspective view showing the first embodiment.

By referring further to FIG. 3, one end portion of a travel link 17 is pivotally coupled near the support shaft supported on the bracket 3 to the front link 4 on one side, specifically on the right side as viewed in the direction toward the front of the seat. The direction converting gear unit 15 is pivotally coupled to a support bracket 18 composed of a plate material fixed to a front end portion of the pertinent upper rail 2, in a manner that makes the direction converting gear unit 15 coaxial with the helical gear 15*a* (the slide coupling rod 14) on the output side. An opposite end portion of the travel link 17 is pivotally coupled to the direction converting gear unit 15 near the helical gear 15*b*.

Figure 4:
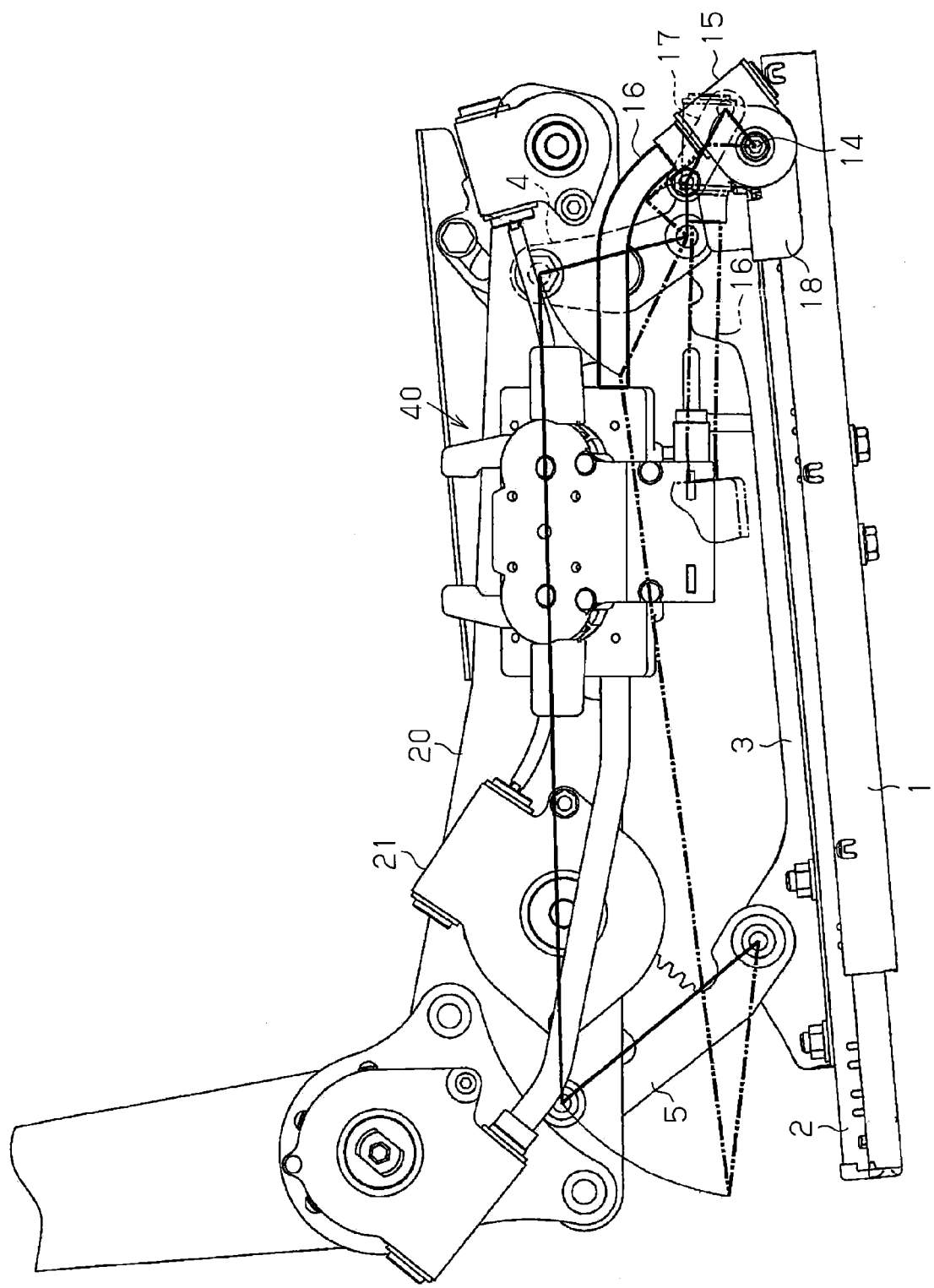
FIG. 4 is a side view showing the first embodiment.

Accordingly, as shown in FIG. 4, the front link 4, the travel link 17, the direction converting gear unit 15, and substantial integration of the upper rail 2, the bracket 3 and the support bracket 18 form a four-bar linkage while the travel link 17 functions as an intermediate bar (joint bar) thereof. This is intended to make the direction converting gear unit 15 swing to follow swinging motion of the front link 4 that accompanies actuation of the lifter mechanism M2, thereby preventing excess or deficiency of the length of the slide torque cable 16 connected to the direction converting gear unit 15.

As shown in FIG. 2, a rear end portion of a tilt arm 25 is pivotally coupled to the lower arm 20 on each side at a middle part of this lower arm 20 in the fore-and-aft direction. The tilt arm 25 is composed of a plate material forming a frame of a front part of a lateral part of the seat cushion 7. A front end portion of each tilt arm 25 is pivotally coupled to a tilt link 26 coaxial with the support shaft of the front link 4 supported on the lower arm 20 and pivotally coupled to this lower arm 20.

The tilt link 26 on one side, specifically on the right side as viewed in the direction toward the front of the seat has a sector gear section 26*a* spreading substantially in a sectoral pattern about a support shaft supported on the lower arm 20 toward the front side of the tilt link 26. A tilt gear box 27 external to the lower arm 20 on the right side is attached to this lower arm 20. The tilt gear box 27 has a built-in speed reduction mechanism composed of a worm 27*a* and a worm wheel 27*b* (specifically, a worm gear). The tilt gear box 27 further has a tilt pinion 27*c* coaxial with the worm wheel 27*b* that rotates integrally with the worm wheel 27*b*. The tilt pinion 27*c* is exposed from the tilt gear box 27. The tilt pinion 27*c* has an axis extending in the direction of the seat width and makes meshing engagement with the sector gear section 26*a* of the tilt link 26. The worm 27*a* is coupled to a tilt torque cable 28 extending toward the back from the tilt gear box 27 to rotate integrally with the tilt torque cable 28.

Thus, if the tilt torque cable 28 rotates, the rotation is decelerated between the worm 27*a* on an input side of the tilt gear box 27 and the worm wheel 27*b* on an output side thereof, and is then transmitted to the tilt pinion 27*c*. Rotation of the tilt pinion 27*c* is transmitted to the tilt link 26 with the sector gear section 26*a* in meshing engagement with the tilt pinion 27*c*, thereby causing the tilt link 26 to pivot about the support shaft supported on the lower arm 20.

As a result, the tilt arm 25 coupled to the tilt link 26 pivots about the rear end portion of the tilt arm 25 to move the front end portion of the tilt arm 25 up and down, thereby moving the front end portion of the tilt arm 25 (front end portion of the seat 6) up and down relative to the lower arm 20. The angle of the tilt arm 25 relative to the lower arm 20 (the angle of tilt of a front part of the seat 6 relative to a rear part thereof) increases and decreases. The support shaft of the tilt link 26 supported on the tilt arm 25 is permitted to move in a predetermined range relative to the tilt link 26 in order to share the pivotal movement of the tilt arm 25 that accompanies the pivotal movement of the tilt link 26. The tilt link 26 and the tilt gear box 27 form a tilt mechanism M3 as a positioning mechanism together with the lower arm 20 and the tilt arm 25.

A recliner plate 31 composed of a plate material is fixed to a rear end portion of the lower arm 20 on each side. A lower end portion of the seat back 8 is coupled to the recliner plate 31 through a substantially disk recliner 32. The recliner 32 forms a well-known hypocycloid speed reducer. Specifically, the recliner 32 includes: a first disk having an internal gear and fixed to the recliner plate 31; a second disk having an external gear with a smaller number of teeth than the internal gear and making meshing engagement with the internal gear; a wedge member that keeps the first and second disks in an eccentric condition in order to make meshing engagement therebetween; and a cam shaft arranged coaxially with the first disk (internal gear) while supporting the second disk and moving the wedge member. The recliner 32 is fixed to the seat back 8 at the second disk. In the recliner 32, the wedge member moves in response to rotation of the cam shaft to make the second disk revolve while meshing engagement is kept between the internal and external gears, thereby decelerating the rotation of the cam shaft determined as the number of rotations of the second disk during the revolution. The rotation of the second disk relative to the first disk makes the seat back 8 pivot, specifically tilt relative to the seat cushion 7.

A recliner gear box 33 external to the recliner plate 31 on one side, specifically on the right side as viewed in the direction toward the front of the seat is attached to this recliner plate 31. The recliner gear box 33 has a built-in speed reduction mechanism composed of a worm 33*a* and a worm wheel 33*b* (worm gear). The worm wheel 33*b* is coupled to a recliner coupling rod 34 in the shape of a polygonal column to rotate integrally with the recliner coupling rod 34. The recliner coupling rod 34 has an axis extending in the direction of the seat width and bridges between the recliners 32 on the opposite sides. The recliner coupling rod 34 extends through the recliners 32 on the opposite sides to be coupled to cam shafts of the recliners 32 to rotate integrally with the cam shafts. The worm 33*a* is coupled to a recliner torque cable 35 extending toward the front from the recliner gear box 33 to rotate integrally with the recliner torque cable 35.

Thus, if the recliner torque cable 35 rotates, the rotation is decelerated between the worm 33*a* on an input side of the recliner gear box 33 and the worm wheel 33*b* on an output side thereof, and is then transmitted to the recliner coupling rod 34. Rotation of the recliner coupling rod 34 is transmitted to the cam shaft of the recliner 32. This rotates the second disk relative to the first disk of the recliner 32 in the aforementioned manner, thereby causing the seat back 8 to pivot, specifically tilt relative to the seat cushion 7. The recliner 32, the recliner gear box 33, and the recliner coupling rod 34 form a recliner mechanism M4 as a positioning mechanism together with the recliner plate 31 (lower arm 20) and the seat back 8.

Specifically, the seat drive mechanism of this embodiment is an eight-way power seat that allows adjustment of a seat position in a normal direction and in an opposite direction at each of the slide mechanism M1, the lifter mechanism M2, the tilt mechanism M3, and the recliner mechanism M4.

A drive device 40 is attached to the lower arm 20 on one side, specifically on the right side as viewed in the direction toward the front of the seat. The drive device 40 is attached at a middle part of this lower arm 20 in the fore-and-aft direction placed between the lifter gear box 21 and the tilt gear box 27.

Figure 5:
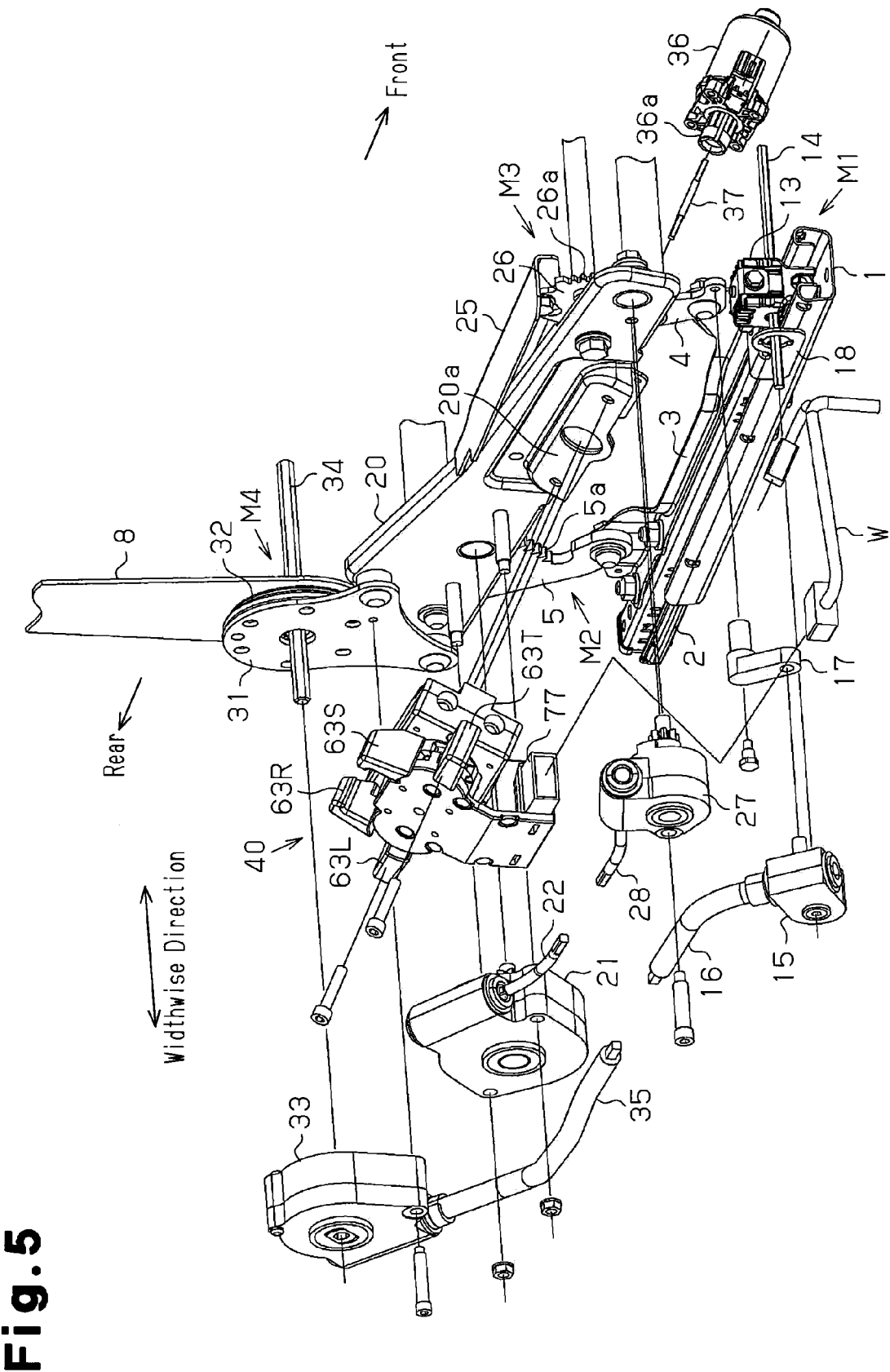
FIG. 5 is an exploded perspective view showing the first embodiment.

Specifically, as shown in FIG. 5, the lower arm 20 has a tilting section 20a formed at the middle part thereof in the fore-and-aft direction that tilts inward with respect to the direction of the seat width toward the upper end. The drive device 40 is fastened at the tilting section 20a. The drive device 40 is coupled to a rotary shaft 36a having an axis extending substantially in the direction of the seat width (direction substantially orthogonal to the tilting section 20a) of a rotary motor 36 composed for example of a brush motor through an input torque cable (twisted iron wire) 37 coaxial with the rotary shaft 36a, in a manner that enables drive by the rotary motor 36. The input torque cable 37 is inserted in the rotary shaft 36a of the rotary motor 36 to rotate integrally with the rotary shaft 36a.

Figure 6:
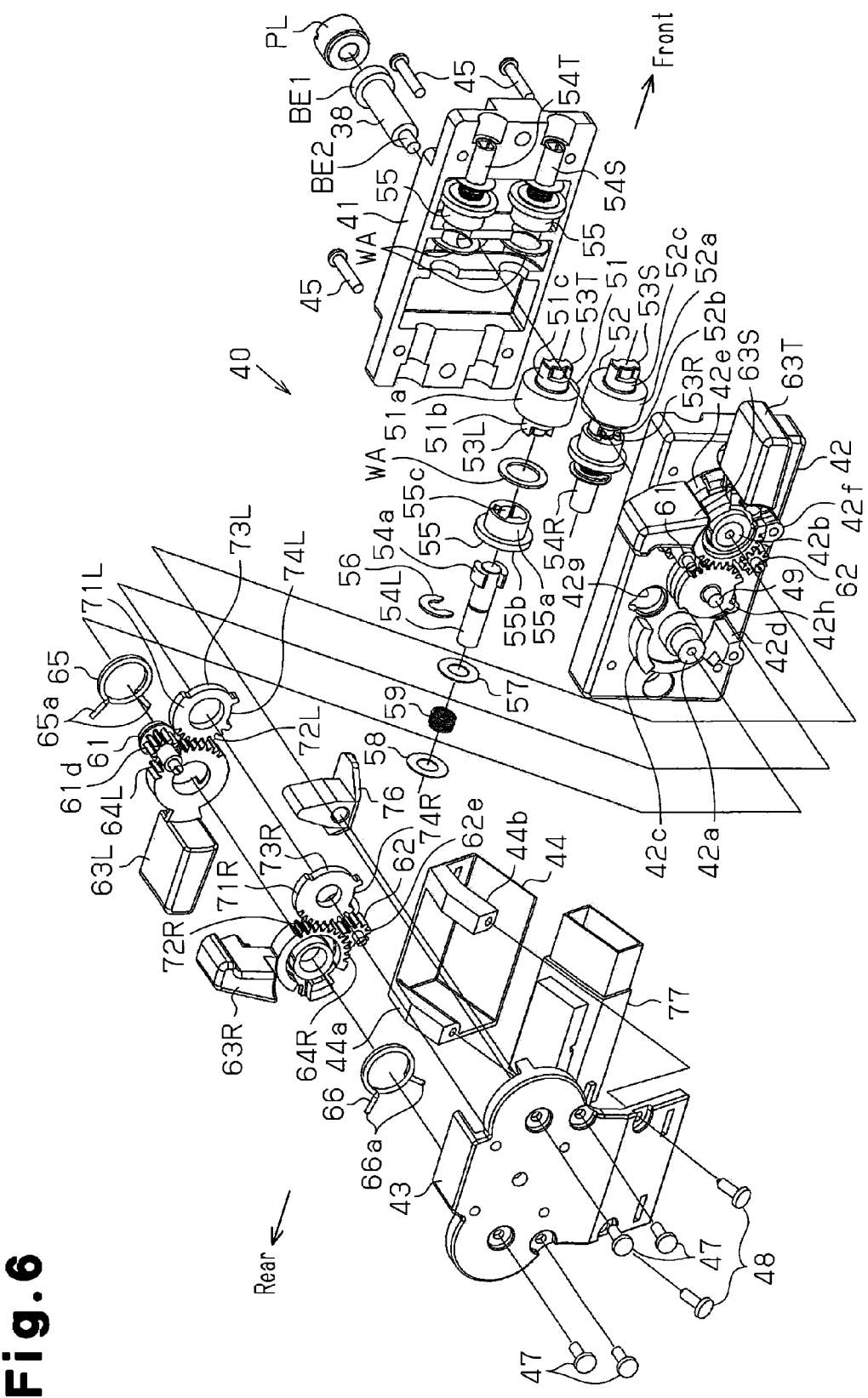
FIG. 6 is an exploded perspective view showing the first embodiment.

More specifically, as shown in FIG. 6, the drive device 40 has a housing composed of two body cases 41 and 42 separated in the direction of the axis of the rotary shaft 36a, and a cover 43 and a switch cover 44 that cover the body case 42 from outside and from below respectively. The body cases 41 and 42 are fastened with four screws 45 that extend through the body cases 41 and 42 at their respective four corners in a direction parallel to the direction of the axis of the rotary shaft 36a.

The drive device 40 is fastened to the tilting section 20a of the lower arm 20 at the body cases 41 and 42. Accordingly, the body cases 41 and 42 are placed in a posture that makes the body cases 41 and 42 tilt inward with respect to the direction of the seat width toward the upper end. The axis of the rotary shaft 36a (rotary motor 36) tilts down further toward the center of the seat width.

Figure 10:
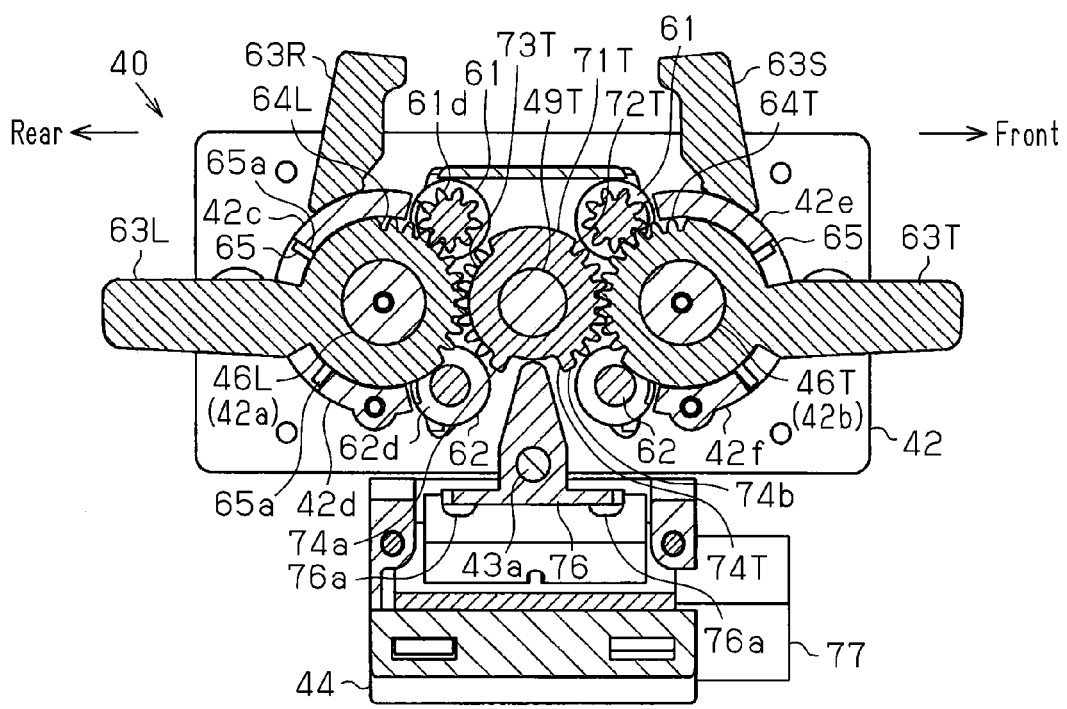
FIG. 10 is a cross-sectional view taken along line 10-10 of FIG. 8.
Figure 11:
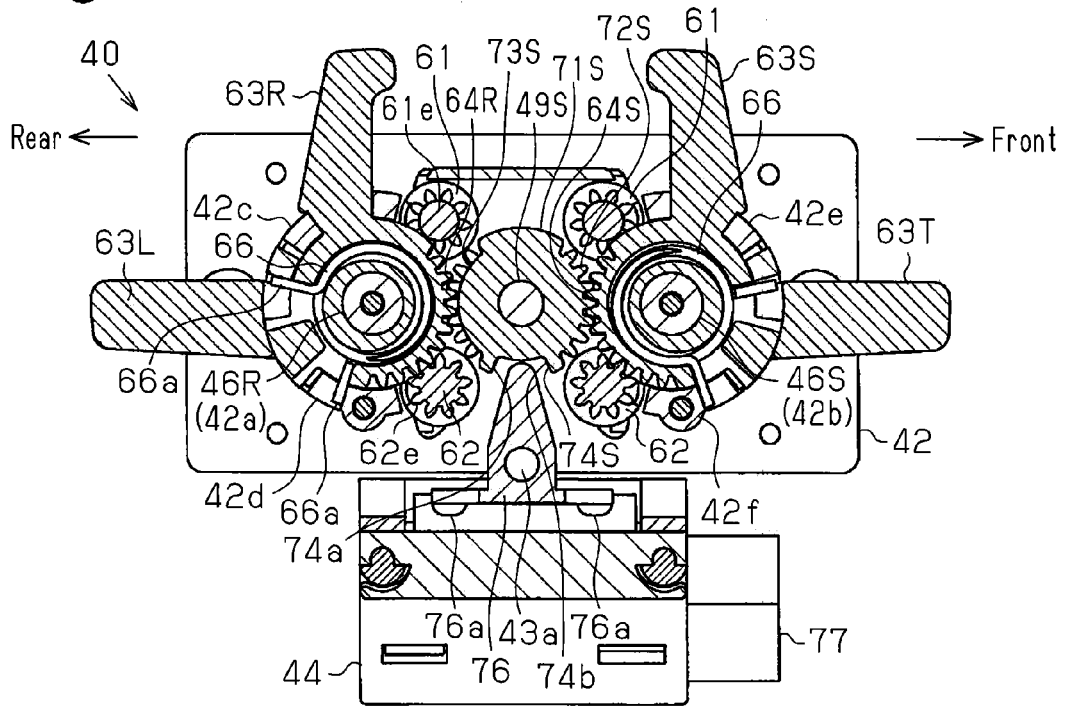
FIG. 11 is a cross-sectional view taken along line 11-11 of FIG. 8.

By referring further to FIGS. 10 and 11, the body case 42 includes two bearing sections 42a and 42b arranged side by side in the fore-and-aft direction (horizontal direction of the drawings) to project outward parallel to the direction of the axis of the rotary shaft 36a. The bearing section 42a has the shape of a stepped column composed of a lifter bearing part 46L arranged to be close to a base end and a recliner bearing part 46R smaller in diameter than the lifter bearing part 46L. The bearing section 42b has the shape of a stepped column composed of a tilt bearing part 46T arranged to be close to the base end and a slide bearing part 46S smaller in diameter than the tilt bearing part 46T.

The body case 42 includes a projecting guide section 42c and a projecting guide section 42d of a substantially arcuate columnar shape that are concentric with the bearing section 42a and provided above and below the bearing section 42a, respectively. The body case 42 further includes a projecting guide section 42e and a projecting guide section 42f of a substantially arcuate columnar shape that are concentric with the bearing section 42b and provided above and below the bearing section 42b respectively. The bearing sections 42a and 42b, and the guide sections 42d and 42f are fastened with four screws 47 that extend through upper part of the cover 43 in a direction parallel to the direction of the axis of the rotary shaft 36a, specifically in the direction substantially orthogonal to the tilting section 20a, thereby fastening the body case 42 and the cover 43.

As shown in FIG. 6, the switch cover 44 arranged below the body case 42 includes two columnar support sections 44a and 44b that extend from the opposite sides in the fore-and-aft direction of the upper end of the switch cover 44 toward the outside of the direction of the seat width. The support sections 44a and 44b are fastened with two screws 48 that extend through lower part of the cover 43 in a direction parallel to the direction of the axis of the rotary shaft 36a, thereby fastening the cover 43 and the switch cover 44.

The upper part of the cover 43 fastened to the body case 42 tilts inward with respect to the direction of the seat width toward the upper end. The lower part of the cover 43 stands in a substantially vertical posture. Accordingly, the switch cover 44 fastened to the lower part of the cover 43 is placed in a substantially horizontal posture.

Figure 12:
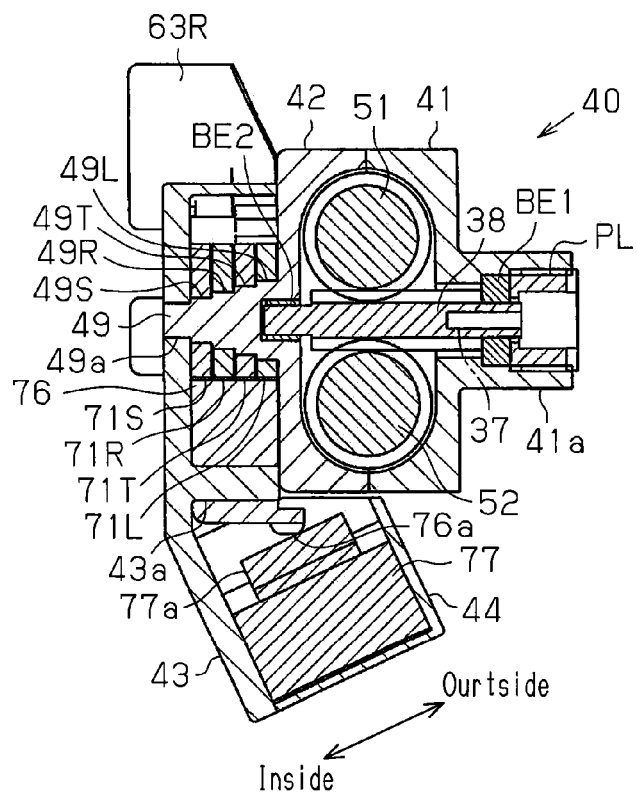
FIG. 12 is a cross-sectional view taken along line 12-12 of FIG. 8.

As shown in FIG. 12, the body case 41 arranged near the rotary motor 36 includes a substantially cylindrical holding section 41a concentric with the input torque cable 37 (rotary shaft 36a) that is provided to project from a side surface of the body case 41 through which the input torque cable 37 is inserted. An annular bearing BE1 is fitted in the holding section 41a and a plug PL of a substantially cylindrical shape with a closed end is screwed in the holding section 41a. The input torque cable 37 inserted in the plug PL is arranged at a central part of the bearing BE1. The bearing BE1 supports a base end portion of a worm 38 arranged coaxially with the input torque cable 37. The input torque cable 37 is fitted to a quadrangular hole formed at the base end portion of the worm 38, so that the worm 38 is coupled to the input torque cable 37 to rotate integrally with the input torque cable 37. A tip portion of the worm 38 is supported through a cylindrical bearing BE2 on the body case 42 arranged on a side away from the rotary motor 36.

The body case 42 includes a switch bearing section 49 concentric with the worm 38 (rotary shaft 36a) that is provided to project from a side surface of the body case 42 away from the worm 38. The switch bearing section 49 has the shape of a stepped column composed of a bearing part 49L, a bearing part 49T, a bearing part 49R, a bearing part 49S, and a support part 49a of respective diameters reduced stepwise in a direction from the base end toward the tip of the switch bearing section 49. The support part 49a is inserted and fitted in the upper part of the cover 43, thereby supporting the switch bearing section 49. By referring further to FIGS. 10 and 11, the center of the switch bearing section 49 comes at a midpoint between the bearing sections 42a and 42b.

As shown in FIG. 6, the body cases 41 and 42 include a worm wheel 51 and a worm wheel 52 arranged above and below the worm 38 that function as two input shafts having axes extending in the fore-and-aft direction.

Specifically, the rotary motor 36, and the worm wheels 51 and 52 coupled to the rotary motor 36 (rotary shaft 36a) through the worm 38 form a T-shaped structure.

The worm wheels 51 and 52 are in meshing engagement with the worm 38 at different skew positions relative to the worm 38. The worm wheels 51 and 52 have the same reduction ratio, which is one or greater. Specifically, by referring further to FIG. 9, the worm wheel 51 has a gear section 51a above the worm 38 and in meshing engagement with the worm 38, and two shaft sections 51b and 51c provided to project toward the back and toward the front respectively from the gear section 51a and supported on the body cases 41 and 42 through a washer WA. The worm wheel 51 has a fitting section 53L and a fitting section 53T provided to project further toward the back from the shaft section 51b and to project further toward the front from the shaft section 51c respectively.

Likewise, the worm wheel 52 has a gear section 52a below the worm 38 and in meshing engagement with the worm 38. The worm wheel 52 has two shaft sections 52b and 52c provided to project toward the back and toward the front respectively from the gear section 52a and supported on the body cases 41 and 42 through a washer WA. The worm wheel 52 has a fitting section 53R and a fitting section 53S provided to project further toward the back from the shaft section 52b and to project further toward the front from the shaft section 52c respectively. The fitting sections 53L, 53T, 53R and 53S have an outer shape like a two-bladed structure composed of a combination of a columnar shape and two arcuate columnar shapes extending radially toward opposite sides.

The body cases 41 and 42 support a lifter shaft 54L and a tilt shaft 54T as output shafts coaxial with the worm wheel 51 and arranged on the rear side and on the front side of the worm wheel 51 respectively in symmetric postures. The lifter torque cable 22 is fitted in a quadrangular hole formed at a tip portion of the lifter shaft 54L, so that the lifter shaft 54L is coupled to the lifter torque cable 22 to rotate integrally with the lifter torque cable 22. The tilt torque cable 28 is fitted in a quadrangular hole formed at a tip portion of the tilt shaft 54T, so that the tilt shaft 54T is coupled to the tilt torque cable 28 to rotate integrally with the tilt torque cable 28.

The body cases 41 and 42 further support a recliner shaft 54R and a slide shaft 54S as output shafts coaxial with the worm wheel 52 and arranged on the rear side and the front side of the worm wheel 52 respectively in symmetric postures. The recliner torque cable 35 is fitted in a quadrangular hole formed at a tip portion of the recliner shaft 54R, so that the recliner shaft 54R is coupled to the recliner torque cable 35 to rotate integrally with the recliner torque cable 35. The slide torque cable 16 is fitted in a quadrangular hole formed at a tip portion of the slide shaft 54S, so that the slide shaft 54S is coupled to the slide torque cable 16 to rotate integrally with the slide torque cable 16.

The lifter shaft 54L, the tilt shaft 54T, the recliner shaft 54R, and the slide shaft 54S have the same shape except their respective arrangements. Hence, the following describes the lifter shaft 54L as a representative and its surrounding structure.

The lifter shaft 54L is substantially columnar and has a tip portion extending from bearing sections of the body cases 41 and 42 toward a side facing the worm wheel 51. The tip portion of the lifter shaft 54L has two projecting sector parts positioned on opposite sides in a radial direction. These parts form an output shaft fitting section 54a of a shape substantially the same as the outer shape of the fitting section 53L.

A tubular member 55 is located between the fitting section 53L of the worm wheel 51 and the lifter shaft 54L. The tubular member 55 has a tubular section 55a, and a pressing piece 55b in the form of a flange provided to project radially outwardly from a tip of the tubular section 55a facing the lifter shaft 54L. The tubular member 55 has a fitting hole 55c to fit the output shaft fitting section 54a in a manner that causes the tubular member 55 to rotate integrally with the lifter shaft 54L while allowing movement of the tubular member 55 in the direction of its axis relative to the lifter shaft 54L. The tubular member 55 moves toward the worm wheel 51 in the direction of the axis, thereby permitting a fit between the fitting hole 55c and the fitting section 53L such that the tubular member 55 rotates integrally with the worm wheel 51.

Specifically, the fitting section 53L and the fitting hole 55c fit each other in response to movement of the tubular member 55, so that rotation of the worm wheel 51 can be transmitted through the tubular member 55 to the lifter shaft 54L. Releasing the fitting section 53L and the fitting hole 55c from the fit disables transmission of rotation of the worm wheel 51 through the tubular member 55 to the lifter shaft 54L. The fitting section 53L of the worm wheel 51, the output shaft fitting section 54a of the lifter shaft 54L, and the tubular member 55 form a clutch mechanism that selectively connects the worm wheel 51 and the lifter shaft 54L.

Figure 9:
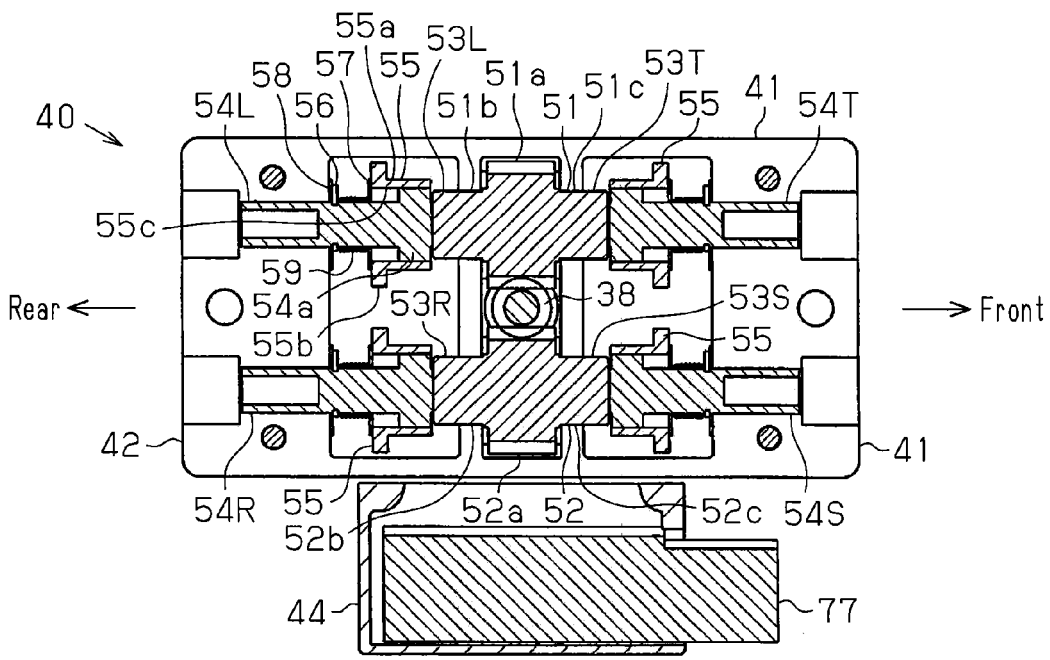
FIG. 9 is a cross-sectional view taken along line 9-9 of FIG. 8.

Rotation of the lifter shaft 54L is transmitted through the lifter torque cable 22 to the lifter gear box 21, thereby actuating the lifter mechanism M2 in the aforementioned manner. As shown in FIG. 9, an E-ring 56 is fitted to an outer circumferential part of the lifter shaft 54L at a middle part of the lifter shaft 54L in the direction of the axis. The lifter shaft 54L is inserted in an annular washer 57 abutting on the pressing piece 55b of the tubular member 55, and is further inserted in an annular washer 58 located between the body cases 41 and 42 and the E-ring 56.

The lifter shaft 54L is inserted in a compression spring 59 between the E-ring 56 and the washer 57 that is a first urging member composed of a coil spring. The tubular member 55 is always urged by the compression spring 59 in a direction that makes a fit between the fitting hole 55c of the tubular member 55 and the fitting section 53L of the worm wheel 51, specifically in a direction that permits transmission of rotation of the worm wheel 51 to the lifter shaft 54L. In other words, in a condition where rotation of the worm wheel 51 cannot be transmitted to the lifter shaft 54L, the tubular member 55 moves toward a direction that releases the fitting section 53L and the fitting hole 55c in a fitted state against the urging force of the compression spring 59.

The aforementioned clutch mechanism is also formed between the worm wheel 51 and the tilt shaft 54T for selective connection therebetween, between the worm wheel 52 and the recliner shaft 54R for selective connection therebetween, and between the worm wheel 52 and the slide shaft 54S for selective connection therebetween. Specifically, the body cases 41 and 42 house all clutch mechanisms of four channels corresponding to four output shafts (lifter shaft 54L, tilt shaft 54T, recliner shaft 54R, and slide shaft 54S) of the eight-way power seat. The worm 38 and the worm wheels 51 and 52 driven by the rotary motor 36 through the input torque cable 37 form a power transmission mechanism that transmits rotation to any of the output shafts (lifter shaft 54L, tilt shaft 54T, recliner shaft 54R, and slide shaft 54S) through the four tubular members 55. This power transmission mechanism is also housed in the body cases 41 and 42.

As shown in FIG. 6, the body case 42 has two substantially circular bearing holes 42g and 42h arranged between the bearing section 42a and the switch bearing section 49 and above and below the bearing section 42a and the switch bearing section 49 respectively. The bearing holes 42g and 42h are further formed between the bearing section 42b and the switch bearing section 49 and above and below the bearing section 42b and the switch bearing section 49 respectively. First cam members 61 as two cam members are supported in the upper bearing holes 42g. Second cam members 62 as two cam members are supported in the lower bearing holes 42h.

By referring further to FIG. 7(a), the first cam member 61 has a substantially columnar large-diameter shaft section 61a supported in the bearing hole 42g. The first cam member 61 has a substantially oval cam section 61b projecting toward the inside of the body case 42 from the bearing hole 42g. The first cam member 61 further has a flange section 61c projecting outward of the body case 42 from the bearing hole 42g to make sliding contact with an outer peripheral part of the bearing hole 42g. The first cam member 61 has a gear section 61d next to the flange section 61c and arranged externally to the body case 42. The first cam member 61 further has a columnar section 61e next to the gear section 61d and arranged further externally to the body case 42. The first cam member 61 also has a substantially columnar small-diameter shaft section 61f smaller in diameter than the columnar section 61e and supported on the cover 43.

Figure 19:
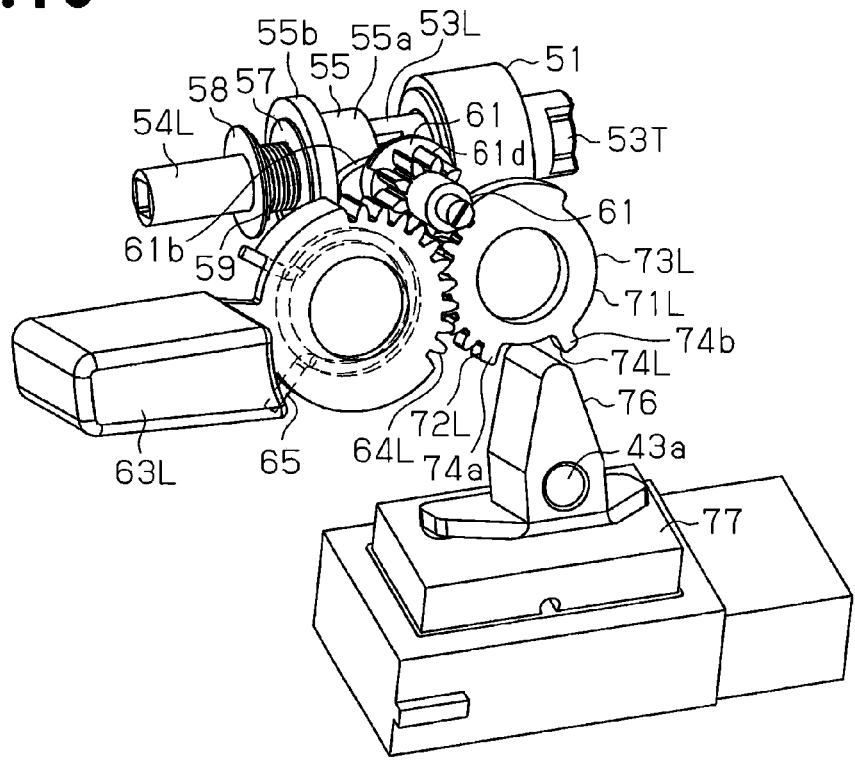
FIG. 19 is a perspective view showing behavior in the first embodiment.

As shown in FIG. 19, the first cam member 61 on the side of the lifter shaft 54L is arranged in a manner that permits abutting contact with the pressing piece 55b of the tubular member 55 at the cam section 61b while contacting or being close to the outer circumferential surface of the tubular section 55a of the tubular member 55. If the first cam member 61 is at a rotation position such that the longitudinal direction of the cam section 61b agrees with the direction of the axis of the tubular member 55, specifically at a rotation position that places the tubular member 55 farthest from the worm wheel 51 (hereinafter also called a "neutral position" of the first cam member 61), the first cam member 61 releases the fitting hole 55c of the tubular member 55 from the fitting section 53L of the worm wheel 51 against the urging force of the compression spring 59.

Figure 20:
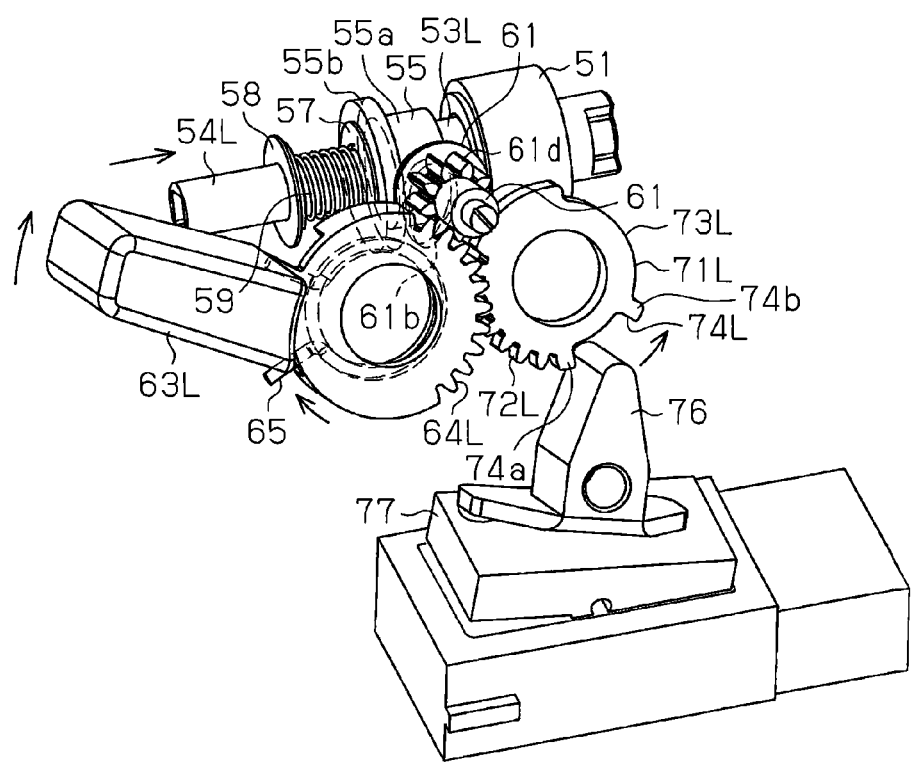
FIG. 20 is a perspective view showing behavior in the first embodiment.
Figure 21:
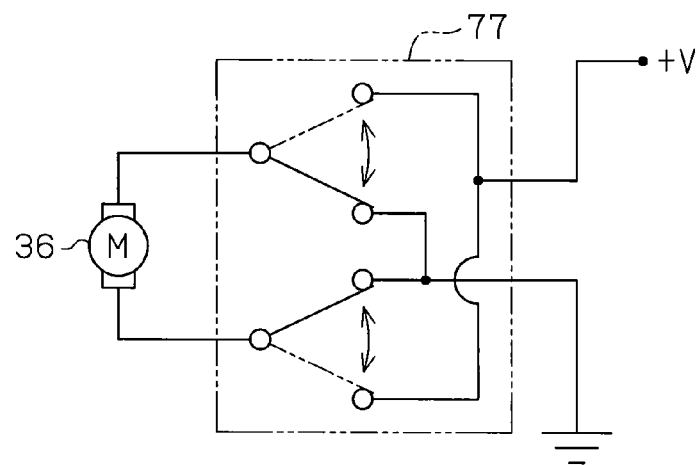
FIG. 21 is an equivalent circuit diagram showing an electrical structure of the first embodiment.
Figure 22:
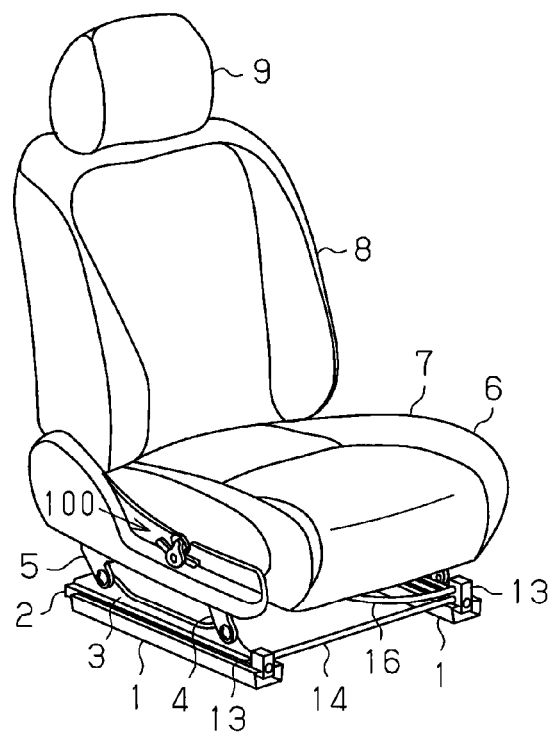
FIG. 22 is a perspective view showing an eight-way power seat to which a seat drive device of a second embodiment of the present invention is applied.

As shown in FIG. 20, if the longitudinal direction of the cam section 61b deviates from the direction of the axis of the tubular member 55 in response to rotation, the first cam member 61 permits movement of the tubular member 55 such that the fitting hole 55c of the tubular member 55 urged by the compression spring 59 fits to the fitting section 53L of the worm wheel 51. If the first cam member 61 moves the tubular member 55 such that the longitudinal direction of the cam section 61b agrees with the direction of the axis of the tubular member 55 again while causing the cam section 61b to press the pressing piece 55b of the tubular member 55 against the urging force of the compression spring 59 in response to rotation, the fitting hole 55c of the tubular member 55 is released from the fitting section 53L of the worm wheel 51. The first cam member 61 on the side of the tilt shaft 54T behaves in the same manner.

By referring further to FIG. 7(b), the second cam member 62 has a substantially columnar large-diameter shaft section 62a supported in the bearing hole 42h. The second cam member 62 has a substantially oval cam section 62b projecting toward the inside of the body case 42 from the bearing hole 42h. The second cam member 62 further has a flange section 62c projecting outward of the body case 42 from the bearing hole 42h to make sliding contact with an outer peripheral part of the bearing hole 42h. The second cam member 62 has a columnar section 62d next to the flange section 62c and arranged externally to the body case 42. The second cam member 62 further has a gear section 62e next to the columnar section 62d and arranged further externally to the body case 42. The second cam member 62 also has a substantially columnar small-diameter shaft section 62f smaller in diameter than the columnar section 62d and supported on the cover 43. Specifically, the first and second cam members 61 and 62 have the same shape, except for that the respective gear sections 61d and 62e and the respective columnar sections 61e and 62d are arranged alternately in the direction of the axis.

The second cam member 62 on the side of the recliner shaft 54R is arranged in a manner that permits abutting contact with the pressing piece 55b of the tubular member 55 at the cam section 62b while contacting or being close to the outer circumferential surface of the tubular section 55a of the tubular member 55. If the second cam member 62 is at a rotation position that makes the longitudinal direction of the cam section 62b agree with the direction of the axis of the tubular member 55, specifically at a rotation position that places the tubular member 55 farthest from the worm wheel 52 (hereinafter also called a "neutral position" of the second cam member 62), the second cam member 62 releases the fitting hole 55c of the tubular member 55 from the fitting section 53R of the worm wheel 52 against the urging force of the compression spring 59.

If the longitudinal direction of the cam section 62b deviates from the direction of the axis of the tubular member 55 in response to rotation, the second cam member 62 permits movement of the tubular member 55 such that the fitting hole 55c of the tubular member 55 urged by the compression spring 59 fits to the fitting section 53R of the worm wheel 52. If the second cam member 62 moves the tubular member 55 such that the longitudinal direction of the cam section 62b agrees with the direction of the axis of the tubular member 55 again while making the cam section 62b press the pressing piece 55b of the tubular member 55 against the urging force of the compression spring 59 in response to rotation, the fitting hole 55c of the tubular member 55 is released from the fitting section 53R of the worm wheel 52. The second cam member 62 on the side of the slide shaft 54S behaves in the same manner.

As shown in FIG. 10, the lifter bearing part 46L of the bearing section 42a supports a lifter operating handle 63L as an operating member such that the lifter operating handle 63L makes sliding contact with the inner circumferential surfaces of the guide sections 42c and 42d. The lifter operating handle 63L has a gear section 64L in meshing engagement with the gear section 61d of the first cam member 61 while making free rotation at the position of the columnar section 62d of the second cam member 62. Hence, in response to rotating operation on the lifter operating handle 63L, for example, the rotation is transmitted between the gear sections 64L and 61d to rotate the first cam member 61 (cam section 61b). As a result, the tubular member 55 moves in the direction of the axis in the aforementioned manner.

A torsion spring 65 as a second urging member is wound around the rotary axis of the lifter operating handle 63L. The spring 65 has legs 65a on opposite ends thereof each having a root portion contacting a stopper of the lifter operating handle 63L to prevent rotation. The legs 65a have tip portions placed at positions determined by the guide sections 42c and 42d. The lifter operating handle 63L is urged by the torsion spring 65 to be held at a predetermined initial position extending toward the back from the lifter bearing part 46L. In this condition, the first cam member 61 to rotate integrally with the lifter operating handle 63L is determined to be placed in the aforementioned neutral position. The urging force of the torsion spring 65 that holds the lifter operating handle 63L at the initial position is set to be greater than the urging force of the compression spring 59 that moves the tubular member 55 such that the fitting hole 55c of the tubular member 55 fits to the fitting section 53L of the worm wheel 51.

Hence, the lifter operating handle 63L is generally held at the initial position, so that the first cam member 61 is placed at the neutral position. Specifically, the lifter operating handle 63L and the first cam member 61 are generally held in a condition that disables transmission of rotation between the worm wheel 51 and the lifter shaft 54L through the tubular member 55. In response to rotating operation on the lifter operating handle 63L against the urging force of the torsion spring 65, the first cam member 61 rotates to be displaced from the neutral position. Then, the urging force of the compression spring 59 moves the tubular member 55 such that the fitting hole 55c of the tubular member 55 fits to the fitting section 53L of the worm wheel 51. This permits transmission of rotation of the worm wheel 51 through the tubular member 55 to the lifter shaft 54L.

The tilt bearing part 46T of the bearing section 42b supports a tilt operating handle 63T as an operating member such that the tilt operating handle 63T makes sliding contact with the inner circumferential surfaces of the guide sections 42e and 42f. The tilt operating handle 63T has a gear section 64T in meshing engagement with the gear section 61d of the first cam member 61 while making free rotation at the position of the columnar section 62d of the second cam member 62. The tilt operating handle 63T behaves in the same manner as the lifter operating handle 63L. Specifically, the tilt operating handle 63T is generally held in a condition that disables transmission of rotation between the worm wheel 51 and the tilt shaft 54T through the tubular member 55. In response to rotating operation on the tilt operating handle 63T against the urging force of the torsion spring 65, the first cam member 61 rotates to be displaced from the neutral position. Then, the urging force of the compression spring 59 moves the tubular member 55 such that the fitting hole 55c of the tubular member 55 fits to the fitting section 53T of the worm wheel 51. This permits transmission of rotation of the worm wheel 51 through the tubular member 55 to the tilt shaft 54T.

Specifically, in this embodiment, the lifter operating handle 63L and the tilt operating handle 63T are arranged to be bilaterally symmetric with respect to the center of the drive device 40 as viewed in the fore-and-aft direction.

As shown in FIG. 11, the recliner bearing part 46R of the bearing section 42a supports a recliner operating handle 63R as an operating member such that the recliner operating handle 63R makes sliding contact with the inner circumferential surfaces of the guide sections 42c and 42d. The recliner operating handle 63R has a gear section 64R in meshing engagement with the gear section 62e of the second cam member 62 while making free rotation at the position of the columnar section 61e of the first cam member 61. Hence, in response to rotating operation on the recliner operating handle 63R, for example, the rotation is transmitted between the gear sections 64R and 62e to rotate the second cam member (cam section 62b). As a result, the tubular member 55 moves in the direction of the axis in the aforementioned manner.

A torsion spring 66 as a second urging member is wound around the rotary axis of the recliner operating handle 63R. The spring 66 has legs 66a on opposite ends thereof each having a root portion contacting a stopper of the recliner operating handle 63R to prevent rotation. The legs 66a have tip portions placed at positions determined by the guide sections 42c and 42d. The recliner operating handle 63R is urged by the torsion spring 66 to be held at a predetermined initial position extending above the recliner bearing part 46R. In this condition, the second cam member 62 to rotate integrally with the recliner operating handle 63R is determined to be placed in the aforementioned neutral position. The urging force of the torsion spring 66 that holds the recliner operating handle 63R at the initial position is set to be greater than the urging force of the compression spring 59 that moves the tubular member 55 such that the fitting hole 55c of the tubular member 55 fits to the fitting section 53R of the worm wheel 52.

Hence, the recliner operating handle 63R is normally held at the initial position, so that the second cam member 62 is placed at the neutral position. Specifically, the recliner operating handle 63R and the second cam member 62 are generally held in a condition that disables transmission of rotation between the worm wheel 52 and the recliner shaft 54R through the tubular member 55. In response to rotating operation on the recliner operating handle 63R against the urging force of the torsion spring 66, the second cam member 62 rotates to be displaced from the neutral position. Then, the urging force of the compression spring 59 moves the tubular member 55 such that the fitting hole 55c of the tubular member 55 fits to the fitting section 53R of the worm wheel 52. This permits transmission of rotation of the worm wheel 52 through the tubular member 55 to the recliner shaft 54R.

The lifter operating handle 63L and the recliner operating handle 63R are supported on the common bearing section 42a. Specifically, the lifter operating handle 63L and the recliner operating handle 63R form a group that is supported to rotate about the same rotation axis. As described above, the gear section 64L of the lifter operating handle 63L and the gear section 61d of the first cam member 61 in meshing engagement with the gear section 64L, and the gear section 64R of the recliner operating handle 63R and the gear section 62e of the second cam member 62 in meshing engagement with the gear section 64R, are placed at different positions in the direction of the axis of the bearing section 42a. Thus, rotating one of the lifter operating handle 63L and the recliner operating handle 63R does not rotate the first or second cam member 61 or 62 corresponding to the other operating handle.

The slide bearing part 46S of the bearing section 42b supports a slide operating handle 63S as an operating member such that the slide operating handle 63S makes sliding contact with the inner circumferential surfaces of the guide sections 42e and 42f. The slide operating handle 63S has a gear section 64S in meshing engagement with the gear section 62e of the second cam member 62 while making free rotation at the position of the columnar section 61e of the first cam member 61. The slide operating handle 63S behaves in the same manner as the recliner operating handle 63R. Specifically, the slide operating handle 63S is generally held in a condition that disables transmission of rotation between the worm wheel 52 and the slide shaft 54S through the tubular member 55. In response to rotating operation on the slide operating handle 63S against the urging force of the torsion spring 66, the second cam member 62 rotates to be displaced from the neutral position. Then, the urging force of the compression spring 59 moves the tubular member 55 such that the fitting hole 55c of the tubular member 55 fits to the fitting section 53S of the worm wheel 52. This permits transmission of rotation of the worm wheel 52 through the tubular member 55 to the slide shaft 54S.

Specifically, in this embodiment, the recliner operating handle 63R and the slide operating handle 63S are arranged to be bilaterally symmetric with respect to the center of the drive device 40 as viewed in the fore-and-aft direction.

The tilt operating handle 63T and the slide operating handle 63S are supported on the common bearing section 42b. Specifically, the recliner operating handle 63R and the slide operating handle 63S form a group that is supported to rotate about the same rotation axis. As described above, the gear section 64T of the tilt operating handle 63T and the gear section 61d of the first cam member 61 in meshing engagement with the gear section 64T, and the gear section 64S of the slide operating handle 63S and the gear section 62e of the second cam member 62 in meshing engagement with the gear section 64S, are placed at different positions in the direction of the axis of the bearing section 42b. Thus, rotating one of the tilt operating handle 63T and the slide operating handle 63S does not rotate the first or second cam member 61 or 62 corresponding to the other operating handle.

As shown in FIG. 12, the bearing part 49L of the switch bearing section 49 supports a lifter switch cam member 71L as a substantially annular switch cam member. As shown in FIG. 6, the lifter switch cam member 71L has a gear section 72L formed at an outer circumferential area facing the gear section 64L of the lifter operating handle 63L and makes meshing engagement with the gear section 64L. The lifter switch cam member 71L has an arcuate section 73L formed at an outer circumferential area facing the gear section 64T of the tilt operating handle 63T and makes free rotation at the gear section 64T. The lifter switch cam member 71L also has a switch cam section 74L formed by radially and inwardly cutting lower part of an outer circumferential area between the gear section 72L and the arcuate section 73L. Thus, in response to rotating operation on the lifter operating handle 63L, for example, the rotation is transmitted between the gear sections 64L and 72L to rotate the lifter switch cam member 71L (switch cam section 74L) while the arcuate section 73L makes free rotation at the gear section 64T of the tilt operating handle 63T.

As shown in FIG. 12, the bearing part 49T of the switch bearing section 49 supports a tilt switch cam member 71T as a substantially annular switch cam member. As shown in FIG. 10, the tilt switch cam member 71T has a gear section 72T formed at an outer circumferential area facing the gear section 64T of the tilt operating handle 63T and makes meshing engagement with the gear section 64T. The tilt switch cam member 71T has an arcuate section 73T formed at an outer circumferential area facing the gear section 64L of the lifter operating handle 63L and makes free rotation at the gear section 64L. The tilt switch cam member 71T also has a switch cam section 74T formed by radially and inwardly cutting lower part of an outer circumferential area between the gear section 72T and the arcuate section 73T. Thus, in response to rotating operation on the tilt operating handle 63T, for example, the rotation is transmitted between the gear sections 64T and 72T to rotate the tilt switch cam member 71T (switch cam section 74T) while the arcuate section 73T makes free rotation at the gear section 64L of the lifter operating handle 63L.

As shown in FIG. 12, the bearing part 49R of the switch bearing section 49 supports a recliner switch cam member 71R as a substantially annular switch cam member. As shown in FIG. 6, the recliner switch cam member 71R has a gear section 72R formed at an outer circumferential area facing the gear section 64R of the recliner operating handle 63R and makes meshing engagement with the gear section 64R. The recliner switch cam member 71R has an arcuate section 73R formed at an outer circumferential area facing the gear section 64S of the slide operating handle 63S and makes free rotation at the gear section 64S. The recliner switch cam member 71R also has a switch cam section 74R formed by radially and inwardly cutting lower part of an outer circumferential area between the gear section 72R and the arcuate section 73R. Thus, in response to rotating operation on the recliner operating handle 63R, for example, the rotation is transmitted between the gear sections 64R and 72R to rotate the recliner switch cam member 71R (switch cam section 74R) while the arcuate section 73R makes free rotation at the gear section 64S of the slide operating handle 63S.

As shown in FIG. 12, the bearing part 49S of the switch bearing section 49 supports a slide switch cam member 71S as a substantially annular switch cam member. As shown in FIG. 11, the slide switch cam member 71S has a gear section 72S formed at an outer circumferential area facing the gear section 64S of the slide operating handle 63S and makes meshing engagement with the gear section 64S. The slide switch cam member 71S has an arcuate section 73S formed at an outer circumferential area facing the gear section 64R of the recliner operating handle 63R and makes free rotation at the gear section 64R. The slide switch cam member 71S also has a switch cam section 74S formed by radially and inwardly cutting lower part of an outer circumferential area between the gear section 72S and the arcuate section 73S. Thus, in response to rotating operation on the slide operating handle 63S, for example, the rotation is transmitted between the gear sections 64S and 72S to rotate the slide switch cam member 71S (switch cam section 74S) while the arcuate section 73S makes free rotation at the gear section 64R of the recliner operating handle 63R.

As shown in FIG. 12, the cover 43 is provided with a projecting shaft 43a arranged below the switch bearing section 49 and having an axis extending parallel to the axis of the switch bearing section 49. As shown in FIGS. 10 and 11, a substantially inverted T-shaped switch lever 76 arranged below the switch cam sections 74L, 74T, 74R and 74S is supported on the shaft 43a at a central part of the switch lever 76. A tip portion of the switch lever 76 is arranged to intercept paths of rotations of downwardly extending opposite end sections (pressing sections) 74a and 74b of each of the switch cam sections 74L, 74T, 74R and 74S about the axis of the switch bearing section 49. Accordingly, if one of the switch cam members 71L, 71T, 71R and 71S rotates in response to rotating operation on the corresponding one of the operating handles 63L, 63T, 63R and 63S, the tip portion of the switch lever 76 is pressed with the switch cam section 74L, 74T, 74R or 74S (end section 74a or 74b). This rotates the switch lever 76 in a direction corresponding to the direction of the operation on the corresponding operating handle 63L, 63T, 63R or 63S.

It is assumed that all the operating handles 63L, 63T, 63R and 63S have not been operated and are placed in respective initial positions. In this case, as shown in the enlarged view of FIG. 13, the tip portion of the switch lever 76 is placed at a midpoint between the opposite end sections 74a and 74b of each of the switch cam members 71L, 71T, 71R and 71S. A gap C is formed between the tip portion of the switch lever 76 and each of the end sections 74a and 74b. Hence, in response to rotating operation on one of the operating handles 63L, 63T, 63R and 63S, the corresponding one of the switch cam members 71L, 71T, 71R and 71S (switch cam sections 74L, 74T, 74R and 74S) makes free rotation for a distance corresponding to the gap C and then starts to press the tip portion of the switch lever 76 with its end section 74a or 74b.

While one of the switch cam members 71L, 71T, 71R and 71S (switch cam sections 74L, 74T, 74R and 74S) presses the tip portion of the switch lever 76, rotations of remaining ones of the switch cam members 71L, 71T, 71R and 71S are inhibited.

Figure 13:
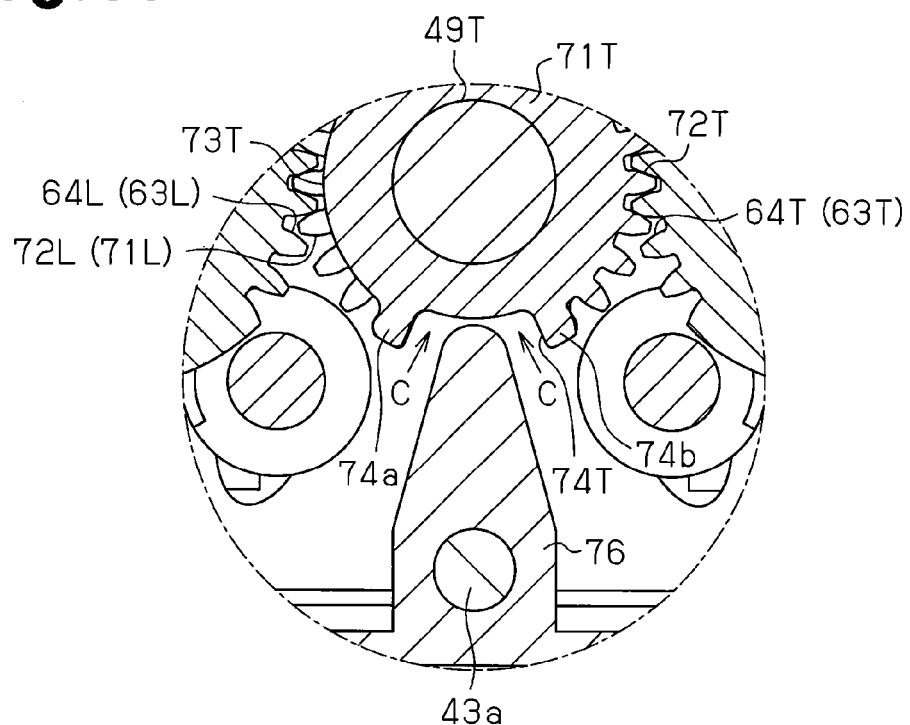
FIG. 13 is an enlarged view showing a switch lever and its behavior.
Figure 14:
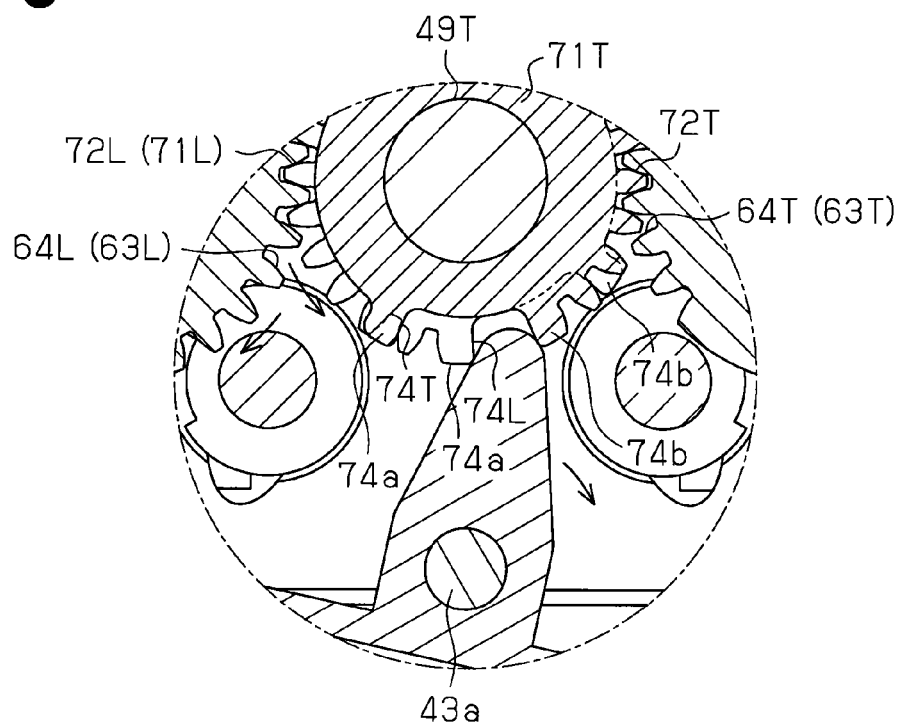
FIG. 14 is an enlarged view showing the switch lever and its behavior.

As an example, if the lifter switch cam member 71L (switch cam section 74L) rotates counterclockwise as viewed in FIG. 13 in response to rotating operation on the lifter operating handle 63L, the lifter switch cam member 71L makes free rotation for a distance corresponding to the gap C on the left side as viewed in the drawing and then presses the tip portion of the switch lever 76 with its end section 74a. This rotates the switch lever 76 clockwise about the shaft 43a (second rotary shaft) as viewed in the drawing. Then, as shown in FIG. 14, the tip portion of the switch lever 76 makes free rotation for a distance corresponding to the gap C between the tip portion of the switch lever 76 and the end section 74b of the switch cam section 74T to contact or be close to this end section 74b. In other words, if the switch lever 76 rotates in response to counterclockwise rotation of the lifter switch cam member 71L as viewed in the drawing, the presence of the gap C on the right side of FIG. 13 prevents the tip portion of the switch lever 76 from pressing the end section 74b of the tilt switch cam member 71T (switch cam section 74T) to prevent counterclockwise rotation of this end section 74b as viewed in the drawing. Causing the tip portion of the switch lever 76 to contact or be close to the end section 74b of the switch cam section 74T restricts clockwise rotation of the tilt switch cam member 71T as viewed in the drawing.

In contrast, if the lifter switch cam member 71L (switch cam section 74L) rotates clockwise as viewed in FIG. 13 in response to rotating operation on the lifter operating handle 63L, the lifter switch cam member 71L makes free rotation for a distance corresponding to the gap C on the right side as viewed in the drawing and then presses the tip portion of the switch lever 76 with its end section 74b. This rotates the switch lever 76 counterclockwise about the shaft 43a as viewed in the drawing. Then, the tip portion of the switch lever 76 makes free rotation for a distance corresponding to the gap C between the tip portion of the switch lever 76 and the end section 74a of the switch cam section 74T to contact or be close to this end section 74a. In other words, if the switch lever 76 rotates in response to clockwise rotation of the lifter switch cam member 71L as viewed in the drawing, the presence of the gap C on the left side of FIG. 13 prevents the tip portion of the switch lever 76 from pressing the end section 74a of the tilt switch cam member 71T (switch cam section 74T) to prevent clockwise rotation of this end section 74a as viewed in the drawing. Causing the tip portion of the switch lever 76 to contact or be close the end section 74a of the switch cam section 74T restricts clockwise rotation of the tilt switch cam member 71T as viewed in the drawing.

The same applies to the operation of the other switch cam members including the recliner switch cam member 71R and the slide switch cam member 71S when the lifter operating handle 63L is rotationally operated. Accordingly, even if the switch lever 76 rotates in response to rotation of one of the switch cam members 71L, 71T, 71R and 71S, the presence of the right and left gaps C prevents rotations of remaining ones of the switch cam members 71L, 71T, 71R and 71S. Further, when one of the switch cam members 71L, 71T, 71R and 71S (switch cam sections 74L, 74T, 74R and 74S) presses the tip portion of the switch lever 76, the switch lever 76 restricts rotations of remaining ones of the switch cam members 71L, 71T, 71R and 71S.

As described above, although all the switch cam members 71L, 71T, 71R and 71S are arranged on the same axis, rotation of one of the switch cam members 71L, 71T, 71R and 71S inhibits rotations of remaining ones of the switch cam members 71L, 71T, 71R and 71S. This inhibits swinging motions of the corresponding ones of the operating handles 63L, 63T, 63R and 63S coupled to the remaining ones of the switch cam members 71L, 71T, 71R and 71S to be caused by the rotations of these switch cam members.

Two projecting bosses 76a are provided at opposite sides of a lower surface of the switch lever 76. As shown in FIG. 12, the switch cover 44 houses a switch 77 with a seesaw button 77a. Rotation of the switch lever 76 presses the button 77a with one of the bosses 76a corresponding to the direction of the rotation of the switch lever 76, thereby causing the button 77a to tilt from a predetermined neutral position. The switch 77 opens (turns off) a circuit if the button 77a is at the neutral position. If the button 77a tilts from the neutral position, the switch 77 closes (turns on) the circuit with a polarity corresponding to the direction of the tilt. Accordingly, the switch 77 determines the direction of flow of a current such that the current flows in one direction while the button 77a tilts rightward and in an opposite direction while the button 77a tilts leftward.

As shown in FIG. 5, the switch 77 is electrically connected through a wire harness W to the rotary motor 36 and a power source (not shown in the drawings). As shown in the equivalent circuit of FIG. 21, if the button 77a is at the neutral position, the circuit is opened such that the opposite terminals of the rotary motor 36 are both connected to the ground through the switch 77, thereby disconnecting the rotary motor 36 and the power source. If the circuit is closed in either way through the switch 77 as shown for example by a broken line in which a long dash alternates with a pair of short dashes of the drawing in response to tilt of the button 77a to connect the rotary motor 36 and the power source, the rotary motor 36 rotates in the normal or reverse direction depending on the polarity of the tilt.

Figure 15:
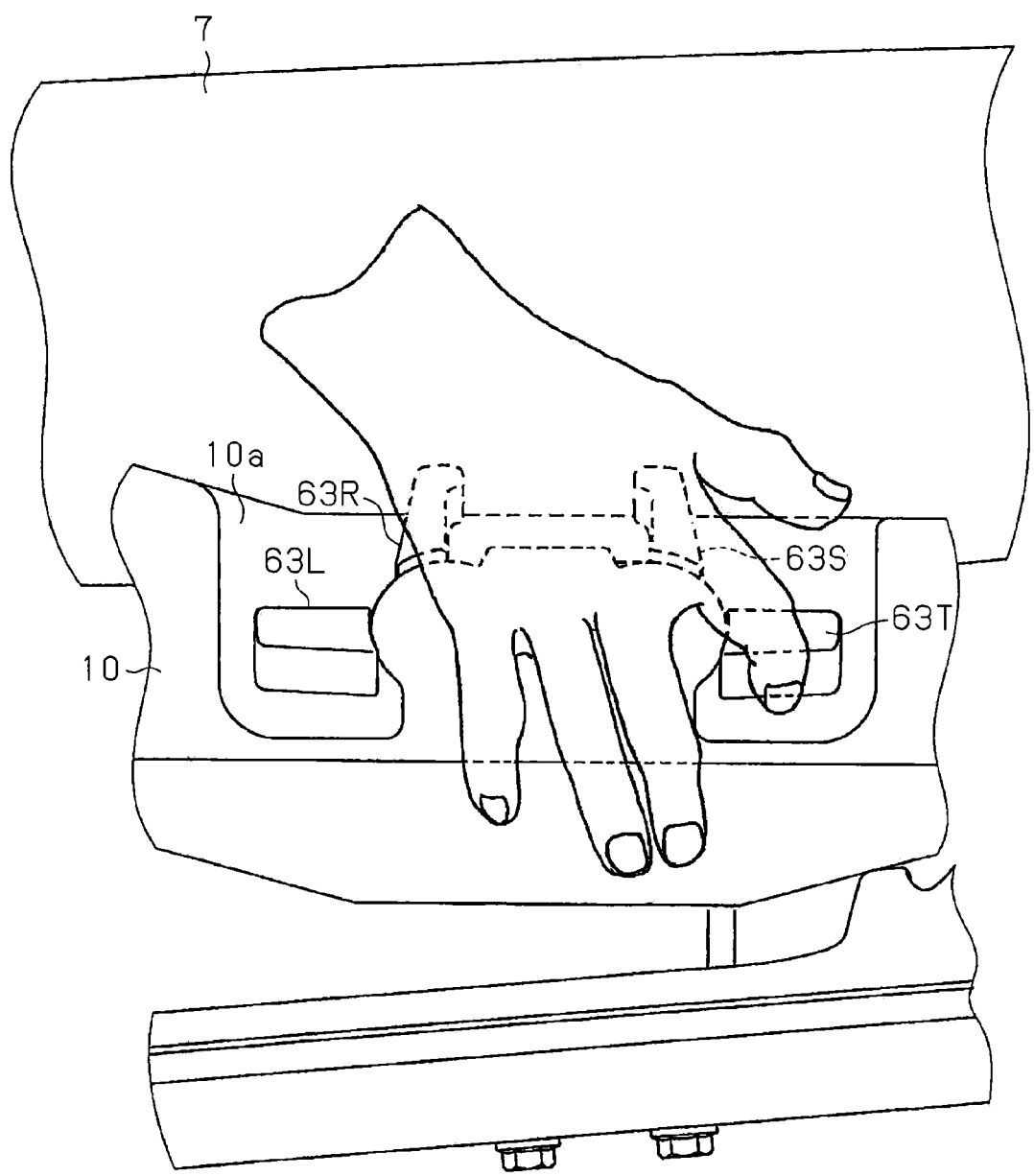
FIG. 15 is a side view illustrating operation on an operating handle.

As shown in FIG. 1, a side cover 10 made for example of a plastic is attached to a lateral part of the seat cushion 7 on one side, specifically on the right side as viewed in the direction toward the front of the seat. The side cover 10 covers the substantially entire area of the lateral part of the seat cushion 7 including the drive device 40. As shown in FIG. 15, the side cover 10 has a substantially U-shaped recessed section 10a to expose the operating handles 63L, 63T, 63R and 63S.

To conform to the outer shape of the drive device 40 (cover 43), the side cover 10 has lower part standing in a substantially vertical posture and upper part that tilts inward with respect to the direction of the seat width toward the upper end. In other words, upper part of the drive device 40 (upper part of the cover 43 and the body cases 41 and 42) tilt together with the upper part of the side cover 10, thereby allowing each of the operating handles 63L, 63T, 63R and 63S to project outward by a shorter distance in the direction of the seat width.

Figure 16:
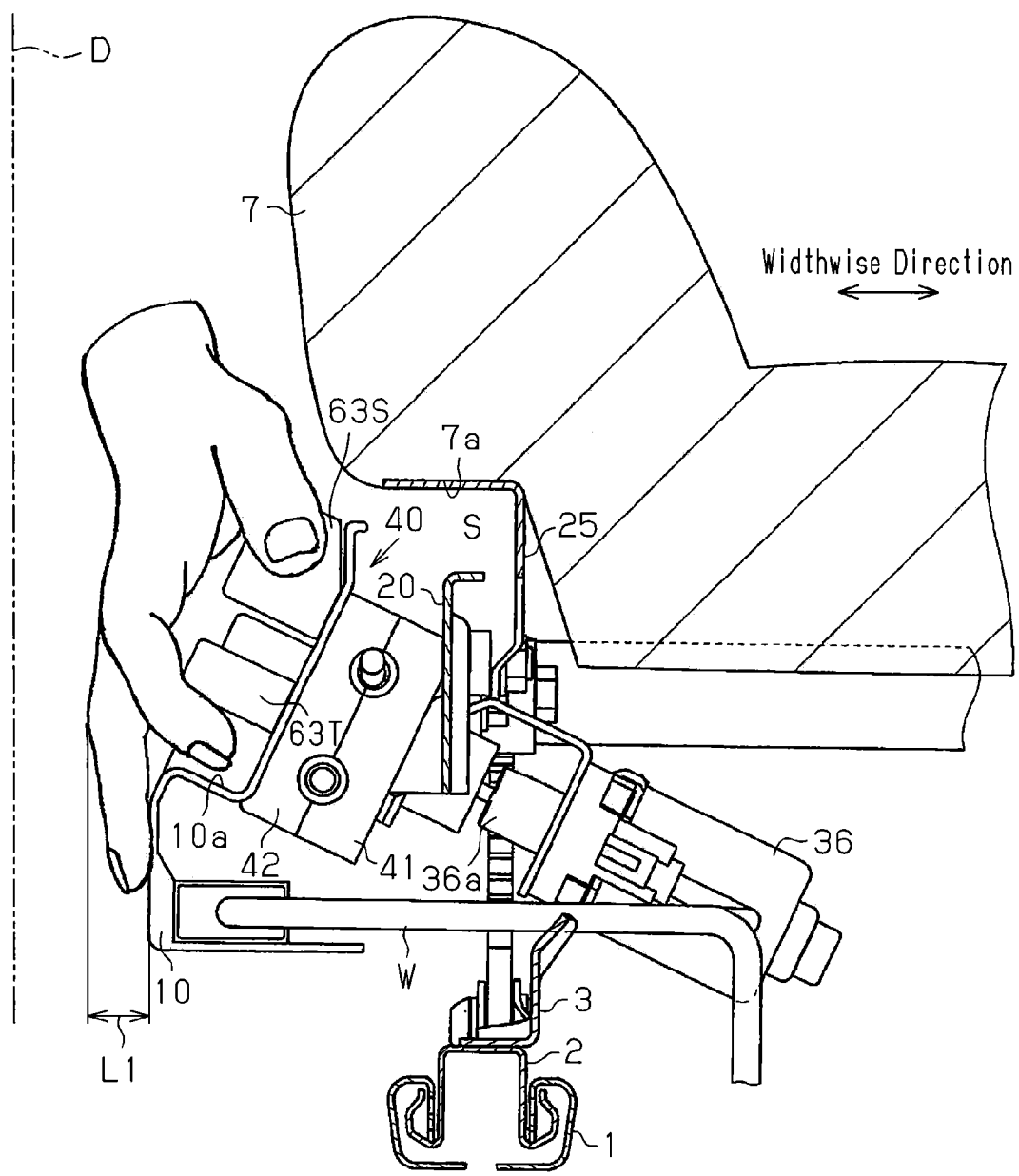
FIG. 16 is a cross-sectional view taken along line 16-16 of FIG. 2, illustrating operation on an operating handle.

More specifically, as shown in FIG. 16, lower part of the seat cushion 7 has a step 7a so that it is smaller in width in the direction of the seat width. A space S is formed below the step 7a. The drive device 40 basically tilts in the space S inward with respect to the direction of the seat width toward the upper end. Thus, the drive device 40 is installed effectively using the space S having a relatively wide margin in the height direction.

The upper part of the drive device 40 (upper part of the cover 43 and the body cases 41 and 42) tilts inward with respect to the direction of the seat width toward the upper end. Thus, compared to the case where the upper part of the drive device 40 is in a substantially vertical posture, for example, each of the operating handles 63L, 63T, 63R and 63S projects outward by a still shorter distance in the direction of the seat width. This maintains respective distances between the operating handles 63L, 63T, 63R and 63S and a door trim D of a vehicle door facing the operating handles 63L, 63T, 63R and 63S at a position external to the operating handles 63L, 63T, 63R and 63S as viewed in the direction of the seat width, for example.

As shown in FIGS. 15 and 16, what is required to operate for example the tilt operating handle 63T is to press a finger (here, forefinger) inserted into the recessed section 10a against the tilt operating handle 63T while the palm of the hand is placed on the outer surface (general surface) of the side cover 10 as viewed in the direction of the seat width, and to pivot the finger about the wrist. This is for the reason that the tilt operating handle 63T is supported to rotate about the axis extending in the direction of the seat width (direction orthogonal to the upper part of the cover 43). At this time, for assistance in the operation, the thumb may be placed at the upper end of the side cover 10 near the tilt operating handle 63T.

In this case, operation on the tilt operating handle 63T basically requires only the space corresponding to a short distance L1 ranging from the outer surface (general surface) of the side cover 10 as viewed in the direction of the seat width outwardly in the direction of the seat width and covering a finger in a substantially stretched position. This further reduces the space required for operation on the tilt operating handle 63T. Even if the door trim D external to the side cover 10 (drive device 40) as viewed in the direction of the seat width is close to the side cover 10 (drive device 40), the tilt operating handle 63T can be operated without interference by the door trim D. This applies to operations on the remaining operating handles 63L, 63R and 63S, except for that these operations involve different fingers.

Figure 17:
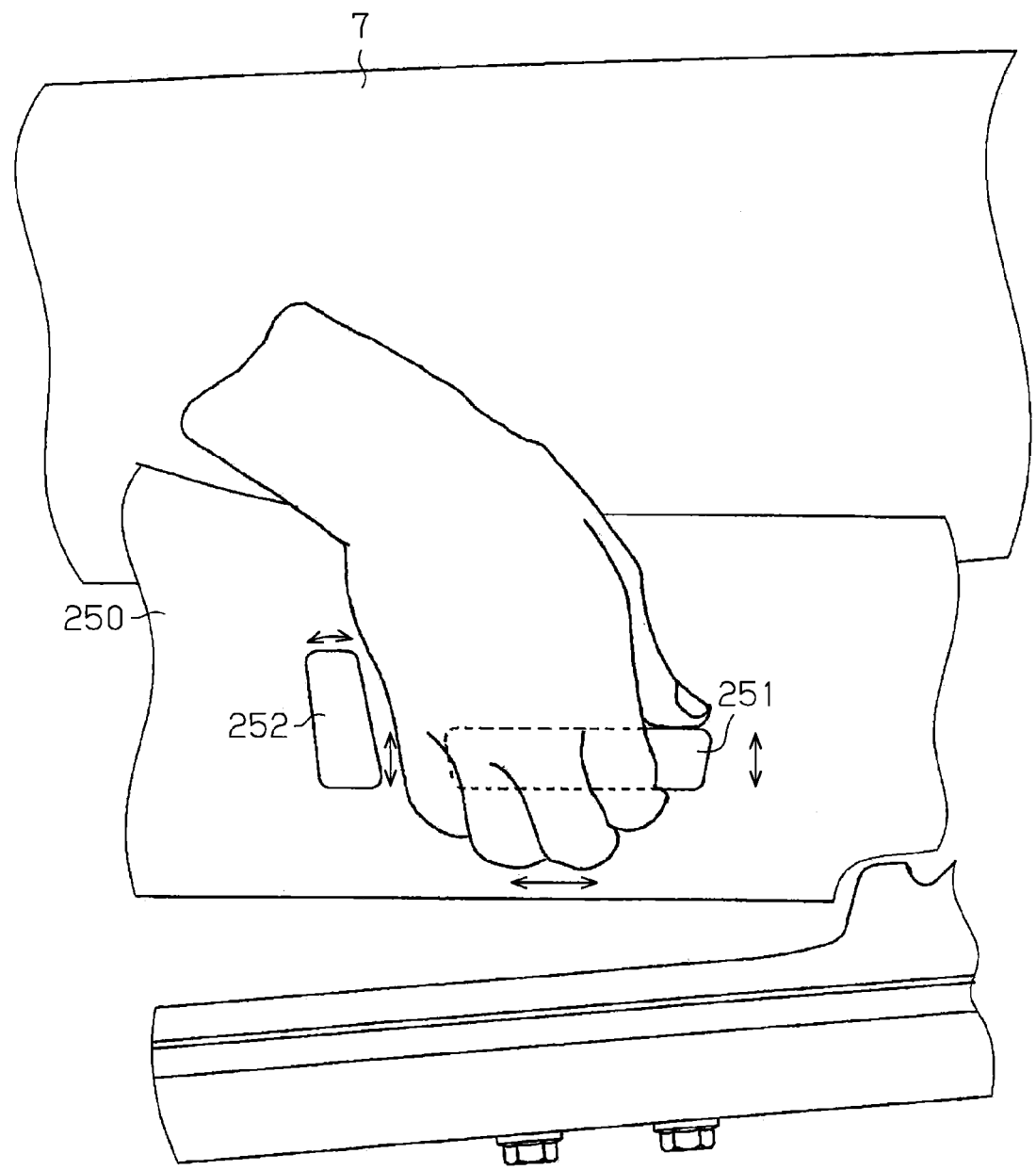
FIG. 17 is a side view illustrating operation on an operating handle in a conventional example.
Figure 18:
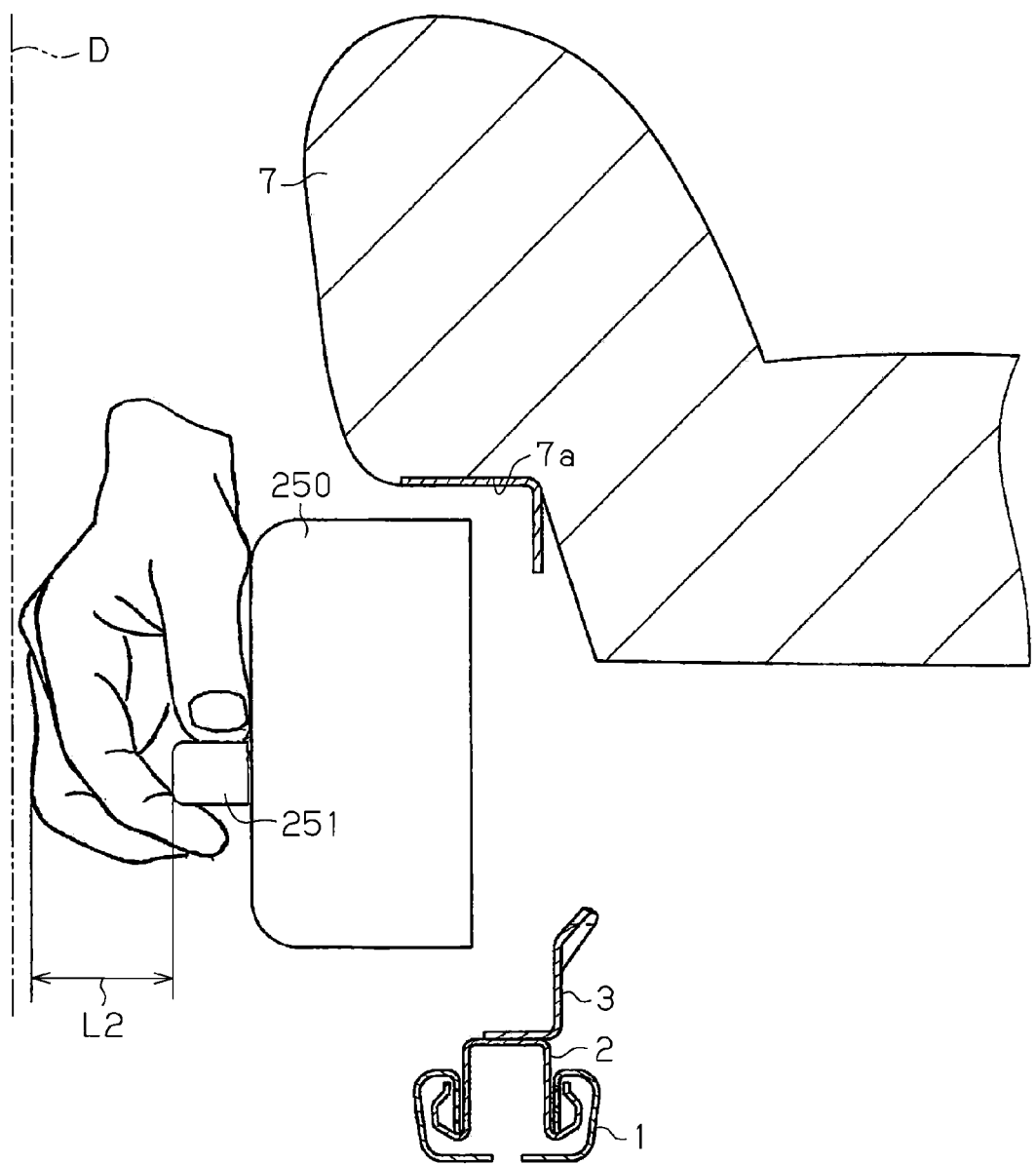
FIG. 18 is a cross-sectional view illustrating operation on the operating handle in the conventional example.

The following describes a conventional example shown in FIGS. 17 and 18. As shown in FIGS. 17 and 18, a side cover 250 attached to a lateral part on one side of the seat cushion 7 stands in a substantially vertical posture. An outer side surface of the side cover 250 standing in a substantially vertical posture is provided with a movement operating knob 251 extending in the fore-and-aft direction and reclining operating knob 252 extending in the height direction that are arranged to project outwardly in the direction of the seat width. The movement operating knob 251 is responsible for adjustment of the position of the seat 6 in the fore-and-aft direction, adjustment of the position of the seat 6 in the up-and-down direction, specifically in the vertical direction, and adjustment of the angle of tilt of a front part of the seat cushion 7 relative to a rear part of the seat cushion 7. The movement operating knob 251 is supported in a manner that allows the operating knob 251 to move in the fore-and-aft direction, allows a rear end portion thereof to tilt relative to a front end portion thereof in the up-and-down direction, specifically in the vertical direction, and allows the front end portion thereof to tilt relative to the rear end portion thereof in the up-and-down direction, specifically in the vertical direction. The reclining operating knob 252 is used for adjustment of the angle of tilt of the seat back 8 relative to the seat cushion 7. The reclining operating knob 252 is supported in a manner that allows an upper end portion thereof to tilt relative to a lower end portion thereof in the fore-and-aft direction.

In this case, operation for example on the movement operating knob 251 requires gripping of the movement operating knob 251 with a thumb and a forefinger, making the fingers extend outwardly in the direction of the seat width. Hence, operation on the movement operating knob 251 basically requires space corresponding to a long distance L2 ranging from the outer surface (general surface) of the side cover 250 as viewed in the direction of the seat width outwardly in the direction of the seat width and covering folded fingers. Accordingly, operation on the tilt operating handle 63T requires more space. During operation on the movement operating knob 251, the operation might be interfered by the door trim D close to the movement operating knob 251.

As shown in FIG. 16, in a place inward of the step 7a of the seat cushion 7 as viewed in the direction of the seat width, a gap in the height direction between the seat cushion 7 (seat cushion pad) and the rotary motor 36 arranged below the seat cushion 7 generally does not have a margin. However, the rotary motor 36 (rotary shaft 36a) attached to the drive device 40 tilting in the aforementioned manner has an axis tilting down further toward the center of the seat width. This produces a margin of the gap in the height direction.

Operation of this embodiment will be described next. Rotational operations on the lifter operating handle 63L, the tilt operating handle 63T, the recliner operating handle 63R, and the slide operating handle 63S are substantially the same and the behaviors of the corresponding ones of the mechanisms M1 to M4 are substantially the same, except for transmission of rotations to the corresponding ones of the torque cables 16, 22, 28 and 35 relating to drive of targets of adjustment. Hence, the following describes the behavior of the lifter operating handle 63L (lifter mechanism M2) as a representative.

FIG. 19 shows a condition where the lifter operating handle 63L has not been operated so that rotation of the worm wheel 51 cannot be transmitted to the lifter shaft 54L and the rotary motor 36 and the power source are disconnected by the switch 77. In this condition, the lifter operating handle 63L is rotationally operated clockwise or counterclockwise against the urging force of the torsion spring 65 as shown in FIG. 20. Then, the rotation is transmitted between the gear sections 64L and 61d to rotate the first cam member 61. This displaces the first cam member 61 from the neutral position so that the tubular member 55 is moved by the urging force of the compression spring 59 such that the fitting hole 55c of the tubular member 55 fits to the fitting section 53L of the worm wheel 51. This permits transmission of rotation of the worm wheel 51 through the tubular member 55 to the lifter shaft 54L.

In response to rotating operation on the lifter operating handle 63L clockwise or counterclockwise, the rotation is transmitted between the gear sections 64L and 72L to rotate the lifter switch cam member 71L clockwise or counterclockwise depending on the direction of the operation on the lifter operating handle 63L. At this time, the switch lever 76 is pressed with the end section 74a or 74b of the switch cam section 74L corresponding to the direction of the rotation of the lifter switch cam member 71L to rotate clockwise or counterclockwise about the axis of the shaft 43a. Rotation of the switch lever 76 about the axis of the shaft 43a presses the button 77a of the switch 77 with the corresponding one of the bosses 76a. This causes the button 77a of the switch 77 to tilt from the neutral position to connect the rotary motor 36 and the power source through the switch 77 with a polarity corresponding to the direction of the tilt. Then, the rotary motor 36 rotates in the normal or reverse direction. Specifically, the direction of the operation on the lifter operating handle 63L determines the direction in which the button 77*a* is pressed (specifically, the direction of tilt) to determine the direction of the rotation of the rotary motor 36.

When the rotary motor 36 rotates, the rotation is transmitted to the lifter shaft 54L through the input torque cable 37, the worm 38, the worm wheel 51, and the tubular member 55. Rotation of the lifter shaft 54L is transmitted through the lifter torque cable 22 to the lifter gear box 21, thereby actuating the lifter mechanism M2 in accordance with the direction of the rotation to move the seat 6 up and down.

Displacement of the first cam member 61 from the neutral position makes it impossible to make a fit between the fitting hole 55*c* of the tubular member 55 moved by the urging force of the compression spring 59 and the fitting section 53L of the worm wheel 51 if the position of the fitting hole 55*c* does not agree with the position of the fitting section 53L. However, when the worm wheel 51 starts to rotate together with the rotary motor 36, the position of the fitting hole 55*c* and that of the fitting section 53L enter into agreement with each other, thereby permitting a fit therebetween.

If the lifter operating handle 63L is released from the operation force thereafter, the lifter operating handle 63L is urged by the torsion spring 65 to return to the initial position of FIG. 19. This causes transmission of rotation between the gear sections 64L and 61*d* to rotate the first cam member 61 against the urging force of the compression spring 59, thereby making the first cam member 61 return to the neutral position. As described above, the urging force of the torsion spring 65 that makes the first cam member 61 return to the initial position together with the lifter operating handle 63L is greater than the urging force of the compression spring 59 that moves the tubular member 55. This disables transmission of rotation of the worm wheel 51 through the tubular member 55 to the lifter shaft 54L.

In contrast, return of the lifter operating handle 63L to the initial position causes transmission of rotation between the gear sections 64L and 72L to rotate the lifter switch cam member 71L. Thus, the lifter switch cam member 71L returns to the condition of FIG. 19. This causes the button 77*a* of the switch 77 to return to the neutral position together with the switch lever 76 to disconnect the rotary motor 36 and the power source through the switch 77. Then, rotation of the rotary motor 36 stops.

As described in detail above, this embodiment achieves the following advantages.

(1) Using the single rotary motor 36 and the single switch 77 achieves a simpler electrical structure. The tubular members 55 (clutch mechanisms) have respective structures (shaft couplings) that connect output shafts (lifter shaft 54L, tilt shaft 54T, recliner shaft 54R, and slide shaft 54S) to corresponding positioning mechanisms (M1 to M4) and the worm wheels 51 and 52. This allows layout where arrangements are concentrated in areas around the output shafts, so that the device as a whole can be reduced further in size. Additionally, functions (positioning mechanisms) relating to positioning of the seat can be increased to a number corresponding to the number of the output shafts (four). This relaxes restrictions further on the number of these functions.

(2) The four operating handles 63L, 63T, 63R and 63S are divided into a group composed of the operating handles 63L and 63R and a group composed of the operating handles 63T and 63S. These two groups of operating handles are supported to rotate about the axes of different two rotary shafts (bearing sections 42*a* and 42*b*). This reduces the possibility of mutual interference between the operating handles 63L, 63T, 63R and 63S, compared to the case where all the operating handles 63L, 63T, 63R and 63S are supported to rotate about the same rotation axis. During operations on the operating handles 63L, 63T, 63R and 63S, corresponding positioning mechanisms (M1 to M4) can behave more precisely. Supporting the operating handles 63L, 63T, 63R and 63S in a decentralized manner at a plurality of places makes it possible to understand the arrangements and the operations of the operating handles 63L, 63T, 63R and 63S.

(3) If one of the operating handles 63L, 63T, 63R and 63S rotates about the rotary shaft (bearing section 42*a* or 42*b*), the switch lever 76 is pressed with the switch cam section 74L, 74T, 74R or 74S of the corresponding one of the switch cam members 71L, 71T, 71R and 71S coupled to this operating handle 63L, 63T, 63R or 63S in a manner that enables drive by this operating handle 63L, 63T, 63R or 63S. This actuates the switch 77 with a polarity corresponding to the direction of the rotation (direction of the operation) of the operating handle 63L, 63T, 63R or 63S. Thus, although the operating handles 63L, 63T, 63R and 63S are divided into a plurality of groups to rotate about different rotation axes, the switch 77 to work in cooperation with operation on one of the operating handles 63L, 63T, 63R and 63S can be actuated through the corresponding one of the switch cam sections 74L, 74T, 74R and 74S. The arrangements of the switch cam members 71L, 71T, 71R and 71S are concentrated in areas around the same rotation axis, so that the device as a whole can be reduced further in size.

(4) If one of the operating handles 63L, 63T, 63R and 63S is operated at the initial position against the urging force of the torsion spring 65 or 66, the cam member 61 or 62 permits the worm wheel 51 or 52 (fitting section 53L, 53T, 53R or 53S) to be fitted into a corresponding tubular member 55 urged by the compression spring 59. Accordingly, rotation of the worm wheel 51 or 52 driven by the rotary motor 36 is transmitted through a corresponding tubular member 55 to an output shaft (lifter shaft 54L, tilt shaft 54T, recliner shaft 54R or slide shaft 54S), thereby actuating a corresponding positioning mechanism (M1, M2, M3 or M4). At this time, connection between the corresponding output shaft and the worm wheel 51 or 52 is maintained by the compression spring 59. This reduces the possibility of transmission of rotation of an output shaft to the cam members 61 and 62 and the operating handles 63L, 63T, 63R and 63S. This eliminates discomfort of a user operating the operating handle 63L, 63T, 63R or 63S caused by transmission of vibration of rotation of an output shaft through this operating handle to the user.

(5) Driving force of the rotary motor 36 can be output to a plurality of positioning mechanisms (M1 to M4) with the single rotary motor 36 and the single switch 77, regardless whether the rotary motor 36 rotates in the normal or reverse direction.

(6) Rotationally operating the operating handles 63L, 63T, 63R and 63S actuates clutch mechanisms and the switch lever 76 (switch 77) mechanically linked to the operating handles 63L, 63T, 63R and 63S. Unlike in a conventional example, this eliminates a drive device dedicated to a clutch or an electric circuit to control the drive device, for example. As a result, the switch is simplified and the electric cable through which power is supplied to a rotary motor is simplified and shortened, leading to reduction of manufacturing costs.

(7) The two worm wheels 51 and 52 in meshing engagement with the worm 38 produce outputs of the four channels. The number of the wheels smaller than the number of output shafts (four) reduces an area where noise occurs. The worm 38 and the worm wheels 51 and 52 (worm gears) decelerate rotation, thereby suppressing the occurrence of noise.

(8) The urging force of the compression spring 59 is used for connection of power through the tubular member 55 (clutch mechanism). Even if the fitting hole 55c of the tubular member 55 does not fit the fitting section 53L, 53T, 53R or 53S of the worm wheel 51 or 52 but it interferes with this fitting section, this prevents application of excessive force therebetween. If the rotary motor 36 starts to rotate in response to operation on the operating handle 63L, 63T, 63R or 63S, the worm wheel 51 or 52 rotates to permit a fit between the fitting section 53L, 53T, 53R or 53S and the fitting hole 55c of the tubular member 55. Then, in response to movement of the tubular member 55, the fitting hole 55c and the fitting section 53L, 53T, 53R or 53S fit each other to permit connection of power through the tubular member 55 (clutch mechanism).

(9) Rotationally operating the operating handle 63L, 63T, 63R or 63S from its initial position connects a corresponding clutch mechanism and causes the switch 77 to energize the rotary motor 36 with a polarity corresponding to the direction of the rotation. Accordingly, the rotary motor 36 is allowed to rotate in the normal or reverse direction depending on the direction of the operation on the operating handle 63L, 63T, 63R or 63S. This allows setting such that the direction of the operation on the operating handle 63L, 63T, 63R or 63S and the direction of adjustment of a positioning mechanism (M1, M2, M3 or M4) are correlated more easily.

(10) The operating handles 63L, 63T, 63R and 63S are arranged individually and independently in correspondence with adjustment functions, specifically with positioning mechanisms (M1 to M4). The positioning mechanisms (M1 to M4) are actuated by the single rotary motor 36. Accordingly, the seat drive device is configured such that, if one of the positioning mechanisms (M1 to M4) is actuated in response to operation on the corresponding one of the operating handles 63L, 63T, 63R and 63S, actuations of remaining ones of the positioning mechanisms (M1 to M4) are disabled. Thus, a user can be conscious of one of the operating handles 63L, 63T, 63R and 63S corresponding to a positioning mechanism (M1, M2, M3 or M4) the user hopes to actuate, and can be guided to operation on this operating handle 63L, 63T, 63R or 63S.

As in the conventional example (see FIGS. 17 and 18), in the presence of the movement operating knob 251 responsible for adjustment of the position of the seat 6 in the fore-and-aft direction, adjustment of the position of the seat 6 in the vertical direction, and adjustment of the angle of tilt of a front part of the seat cushion 7 relative to a rear part of the seat cushion 7, a front end portion and a rear end portion of the movement operating knob 251 might unintentionally be moved in the vertical direction simultaneously. Specifically, the position of the seat 6 in the vertical direction and the angle of tilt of the front part of the seat cushion 7 relative to the rear part of the seat cushion 7 might be adjusted simultaneously. This embodiment eliminates such simultaneous operations.

(11) When all the operating handles 63L, 63T, 63R and 63S are in a non-operated state, the gap C is formed between each of the end sections 74a and 74b of each of the switch cam sections 74L, 74T, 74R and 74S and the tip portion of the switch lever 76. Hence, in response to operation on one of the operating handles 63L, 63T, 63R and 63S, one of the end sections 74a and 74b of the corresponding one of the switch cam sections 74L, 74T, 74R and 74S makes free rotation for a distance corresponding to the gap C and then presses the tip portion of the switch lever 76. This rotates the switch lever 76 about the axis of the shaft 43a. In this case, the gap C is formed between the tip portion of the switch lever 76 and the other end section 74a or 74b of the switch cam member 71L, 71T, 71R or 71S (switch cam section 74L, 74T, 74R or 74S) corresponding to different one of the operating handles 63L, 63T, 63R and 63S in a non-operated state. This prevents the tip portion of the switch lever 76 from pressing the other end section 74a or 74b of different one of the switch cam members 71L, 71T, 71R and 71S, thereby preventing the tip portion of the switch lever 76 and this end section 74a or 74b from rotating integrally.

During rotation of the switch lever 76, the tip portion of the switch lever 76 makes free rotation for a distance corresponding to the gap C between the tip portion of the switch lever 76 and the other end section 74a or 74b of the switch cam member 71L, 71T, 71R or 71S (switch cam section 74L, 74T, 74R or 74S) corresponding to the different operating handle 63L, 63T, 63R or 63S, and then contacts or approaches this end section 74a or 74b. Thus, the presence of the tip portion of the switch lever 76 can restrict rotation of the different switch cam member 71L, 71T, 71R or 71S (switch cam section 74L, 74T, 74R or 74S).

(12) The drive device 40 is arranged in a central part of the lower arm 20 surrounded by the direction converting gear unit 15 (slide gear box 13), the lifter gear box 21, the tilt gear box 27, and the recliner gear box 33 of the positioning mechanisms (M1 to M4). This places the drive device 40 at a position spaced from the positioning mechanisms (M1 to M4) by substantially the same distance, thereby achieving substantially the same length of the torque cables 16, 22, 28 and 35. Thus, only some of the torque cables 16, 22, 28 and 35 will not be longer, thereby inhibiting cost increase and weight increase of this torque cable, high noise due to increase of rubbing sound, and efficiency reduction due to increase of resistance to sliding motion.

(13) The direction converting gear unit 15 is made to swing to follow swinging motion of the front link 4 that accompanies actuation of the lifter mechanism M2, thereby preventing excess or deficiency of the length of the slide torque cable 16 connected to the direction converting gear unit 15.

Specifically, as shown in FIG. 4, it is assumed that the lower arm 20 is placed in a raised position through the front and rear links 4 and 5. The front and rear links 4 and 5 and the lower arm 20 forming a four-bar linkage are indicated by bold solid lines schematically. Further, the front link 4, the travel link 17, and the direction converting gear unit 15 forming a four-bar linkage are indicated by bold solid lines schematically. The slide torque cable 16 in this condition is also indicated by bold solid lines.

It is assumed that the lower arm 20 is moved down through the front and rear links 4 and 5 by pivotal movement of the rear link 5. At this time, the front link 4 pivots to cause the direction converting gear unit 15 to pivot coaxially with the slide coupling rod 14 through the travel link 17. The front and rear links 4 and 5 and the lower arm 20 in this condition forming a four-bar linkage are indicated by bold broken lines in which a long dash alternates with a pair of short dashes schematically. Further, the front link 4, the travel link 17, and the direction converting gear unit 15 in this condition forming a four-bar linkage are indicated by bold broken lines in which a long dash alternates with a pair of short dashes schematically. The slide torque cable 16 in this condition is also indicated by bold broken lines in which a long dash alternates with a pair of short dashes.

As clearly seen from FIG. 4, the drive device 40 provided to the lower arm 20 is lowered in response to lowering of the lower arm 20. The direction converting gear unit 15 swings to follow swinging motion of the front link 4. This sets apart the direction converting gear unit 15 and the drive device 40 by a substantially constant distance, thereby inhibiting excess or deficiency of the length of the slide torque cable 16. In particular, this eliminates the need for making the slide torque cable 16 longer than necessary in consideration of deficiency, thereby reducing cost and weight due to an increase of the length of the slide torque cable 16, reducing high noise due to increase of rubbing sound, and reducing efficiency losses due to an increase of resistance to sliding motion.

(14) What is required to operate an intended one of the operating handles 63L, 63T, 63R and 63S is to press a finger against the operating handle 63L, 63T, 63R or 63S while the palm of a hand is placed on an outer surface (general surface) of the side cover 10 as viewed in the direction of the seat width and to rotate the finger about the wrist. Specifically, operating this operating handle 63L, 63T, 63R or 63S does not involve gripping the operating handle 63L, 63T, 63R or 63S, so that fingers will not extend outwardly in the direction of the seat width. As a result, the space (distance L1) required for operation of the operating handle 63L, 63T, 63R or 63S can be reduced further.

(15) The upper part of the drive device 40 (upper part of the cover 43 and the body cases 41 and 42) tilts inward with respect to the direction of the seat width toward the upper end. Thus, compared to the case where the upper part of the drive device 40 is in a substantially vertical posture, for example, each of the operating handles 63L, 63T, 63R and 63S projects outward by a still shorter distance in the direction of the seat width. This can maintain respective distances between the operating handles 63L, 63T, 63R and 63S and the door trim D of a vehicle door facing the operating handles 63L, 63T, 63R and 63S and at a position external to the operating handles 63L, 63T, 63R and 63S as viewed in the direction of the seat width, for example.

(16) The rotary motor 36 has an axis extending downward further toward the center of the seat width. This produces a greater gap in the height direction between the rotary motor 36 and the seat cushion 7 at a position closer to the inside of the direction of the seat width. This can maintain the gap between the seat cushion 7 and the rotary motor 36 arranged below the seat cushion 7 (specifically, below hips).

Second Embodiment

A seat drive device according to a second embodiment of the present invention will now be described by referring to FIGS. 22 to 33. The second embodiment has a structure mainly different from that of the first embodiment in that the four operating handles all rotate about the same rotation axis. Corresponding parts are identified by the same signs and will not be described entirely.

Figure 23:
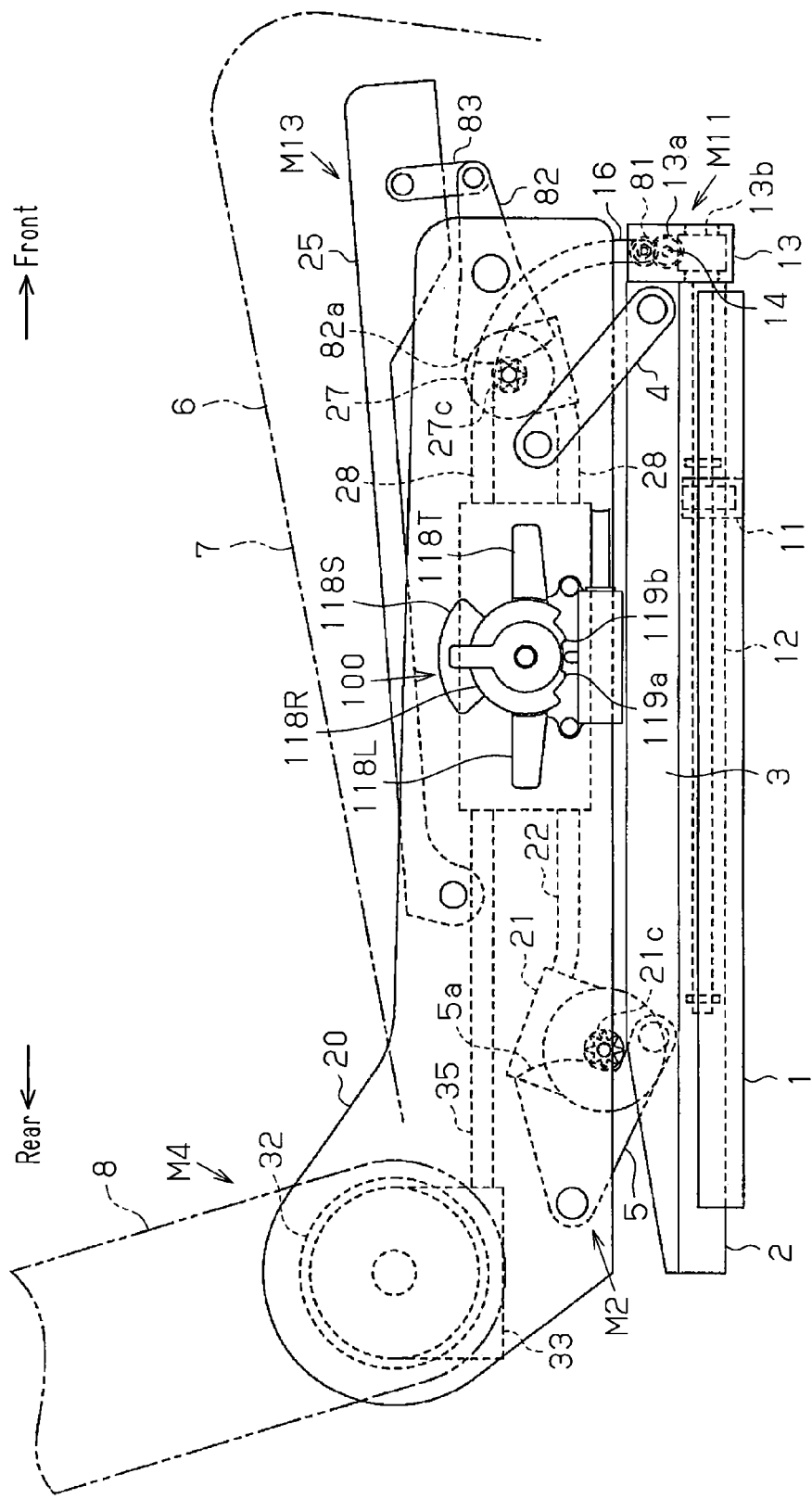
FIG. 23 is a side view showing the second embodiment.

As shown in FIG. 23, a slide mechanism M11 includes, instead of the direction converting gear unit 15 and the travel link 17, a gear 81 in meshing engagement with a helical gear 13a having an axis extending in the direction of the seat width in the slide gear box 13 on one side, specifically on the left side as viewed in the direction toward the front of a seat. The gear 81 is coaxial with the slide torque cable 16 and coupled to the slide torque cable 16 to rotate integrally with the slide torque cable 16.

Thus, if the slide torque cable 16 rotates, the rotation is transmitted from the gear 81 to the helical gear 13a in the slide gear box 13 on one side and is transmitted to the helical gear 13a in the slide gear box 13 on the opposite side through the slide coupling rod 14. Then, rotations of the helical gears 13a in the slide gear boxes 13 on the opposite sides are transmitted to helical gears 13b in the slide gear boxes 13 having axes extending in a fore-and-aft direction while being converted in direction by 90 degrees, and are then transmitted to the slide lead screws 12 on the opposite sides. As a result, the upper rail 2 moves in the fore-and-aft direction relative to the lower rail 1 in the aforementioned manner.

A tilt mechanism M13 includes, instead of the tilt link 26, a first tilt link 82 and a second tilt link 83. The first tilt link 82 is pivotally coupled at its central part to the lower arm 20 on the front side of the support shaft of the front link 4 supported on the lower arm 20. The first tilt link 82 is pivotally coupled at its front end portion to a lower end portion of the second tilt link 83. An upper end portion of the second tilt link 83 is pivotally coupled to the front end portion of the tilt arm 25. Accordingly, the lower arm 20, the tilt arm 25, and the first and second tilt links 82 and 83 form a four-bar linkage while the second tilt link 83 functions as an intermediate bar (joint bar) thereof.

The first tilt link 82 on one side has a sector gear section 82a spreading substantially in a sectoral pattern about a support shaft supported on the lower arm 20 toward the rear side from the support shaft. The sector gear section 82a makes meshing engagement with the tilt pinion 27c of the tilt gear box 27.

Thus, if the tilt torque cable 28 rotates, the rotation is transmitted to the tilt pinion 27c in the tilt gear box 27. Rotation of the tilt pinion 27c is transmitted to the first tilt link 82 in meshing engagement with the tilt pinion 27c at the sector gear section 82a, thereby making the first tilt link 82 pivot about the support shaft supported on the lower arm 20. As a result, the tilt arm 25 coupled to the first tilt link 82 through the second tilt link 83 pivots about the rear end portion of the tilt arm 25 to move the front end portion of the tilt arm 25 up and down, thereby moving the front end portion (front end portion of the seat 6) up and down relative to the lower arm 20. The angle of tilt of the tilt arm 25 relative to the lower arm 20 (the angle of tilt of a front part of the seat 6 relative to a rear part thereof) increases and decreases.

Figure 24:
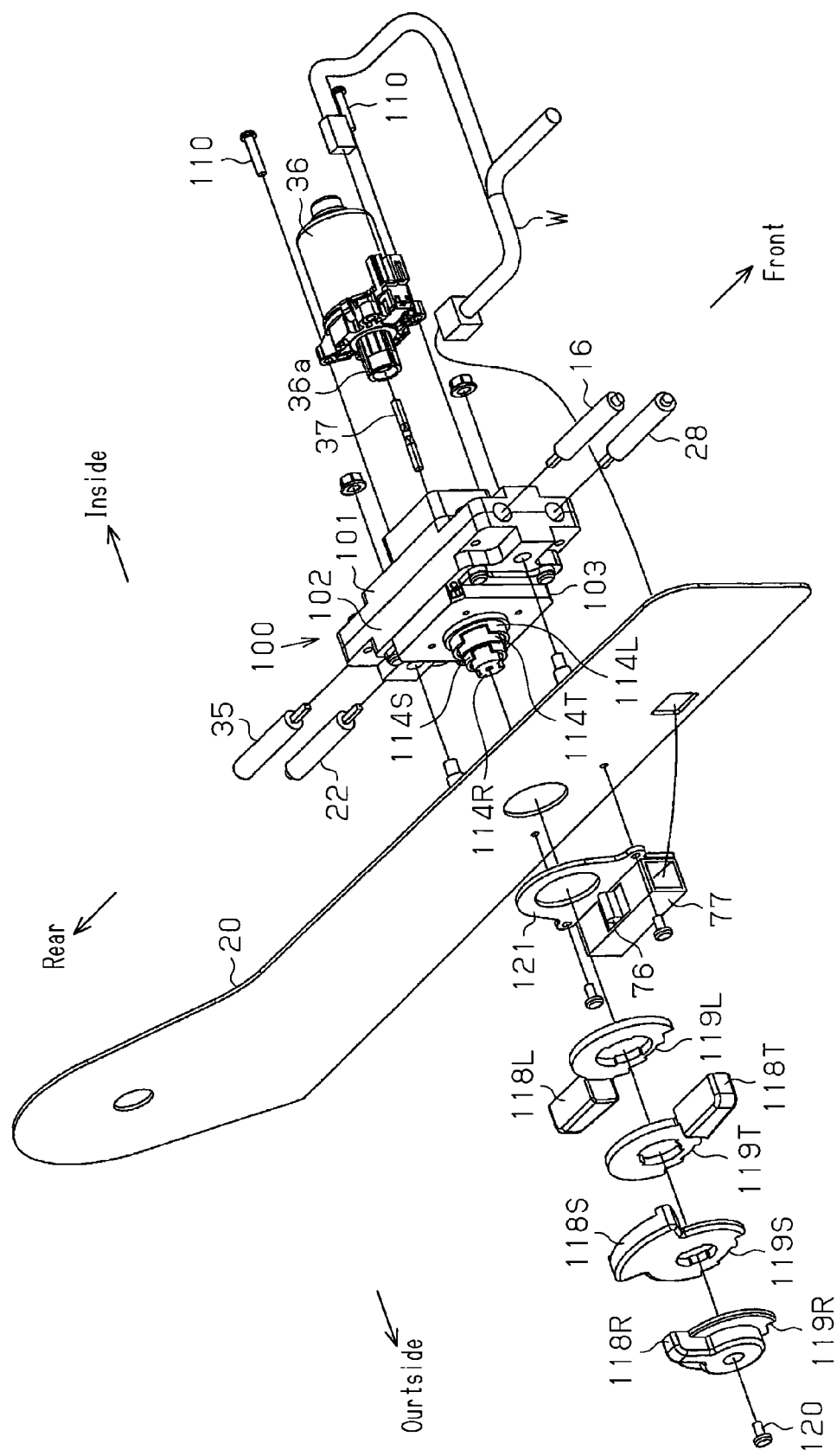
FIG. 24 is an exploded perspective view showing the second embodiment.

A drive device 100 is fastened to the lower arm 20 on the right side as viewed in the direction toward the front of the seat. The drive device 100 is fastened inward of the lower arm 20 as viewed in the direction of the seat width and at a middle part of this lower arm 20 in the fore-and-aft direction placed between the lifter gear box 21 and the tilt gear box 27. As shown in FIG. 24, the rotary motor 36 is fastened to the drive device 100 (body case 101) with screws 110. The drive device 100 is drivably coupled through the input torque cable 37 to the rotary shaft 36a of the rotary motor 36.

Figure 25:
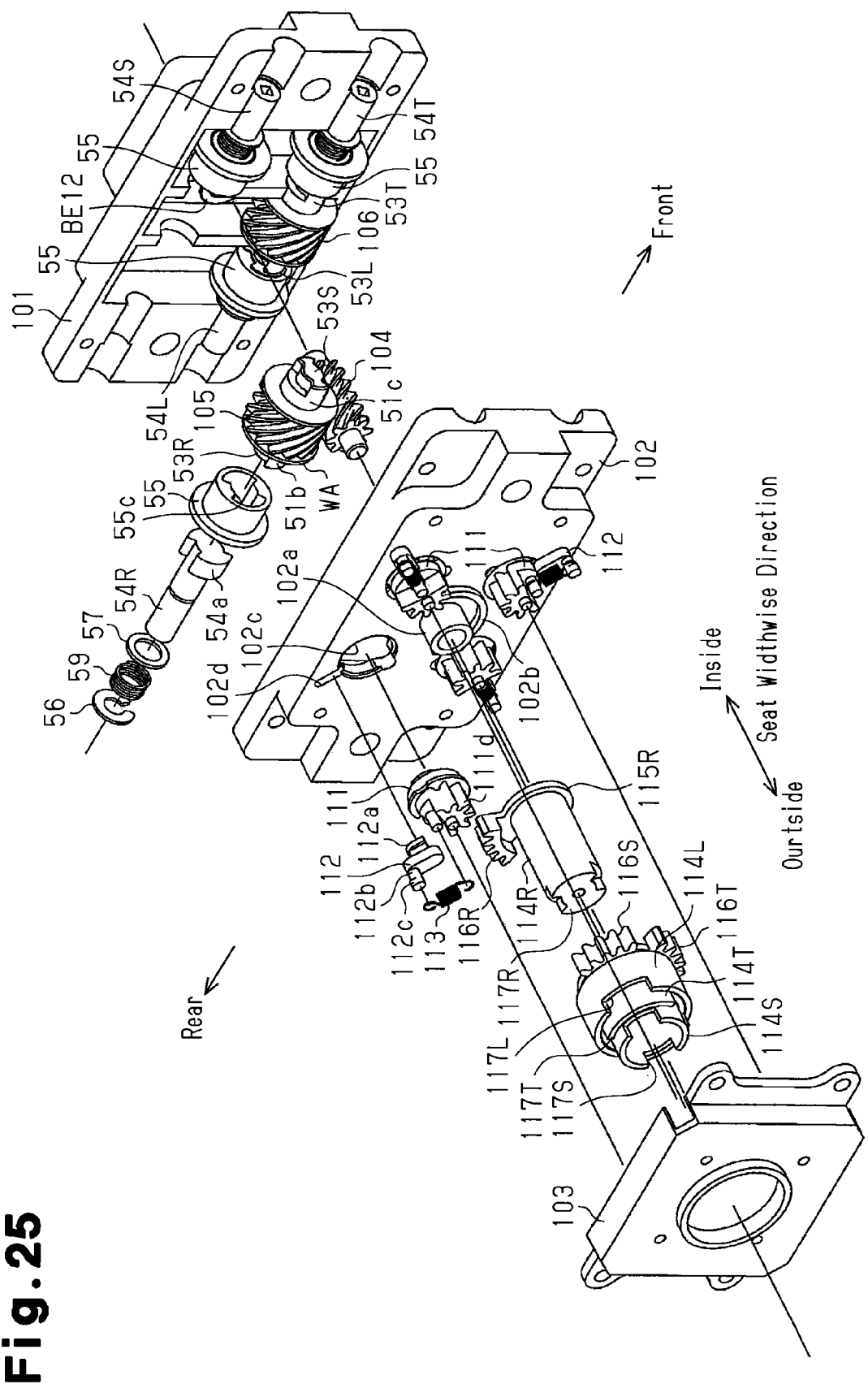
FIG. 25 is an exploded perspective view showing the second embodiment.

More specifically, as shown in FIG. 25, the drive device 100 has a housing composed of two body cases 101 and 102 separated in the direction of the axis of the rotary shaft 36a, and a cover 103 that covers the body case 102 from outside. The body cases 101 and 102 are fastened with four screws (not shown in the drawings) that extend through the body cases 101 and 102 at their respective four corners in a direction parallel to the direction of the axis of the rotary shaft 36a. The body case 102 and the cover 103 are also fastened with four screws not shown in the drawings) that extend through the body case 102 and the cover 103 at their respective four corners in a direction parallel to the direction of the axis of the rotary shaft 36a.

Figure 27:
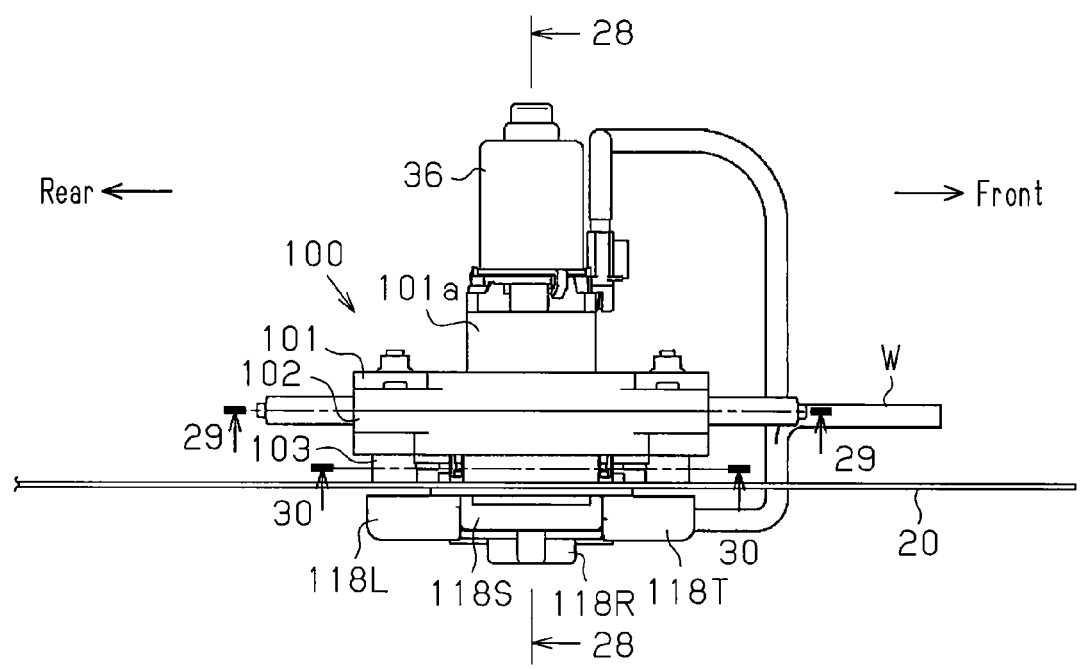
FIG. 27 is a plan view showing the second embodiment.
Figure 28:
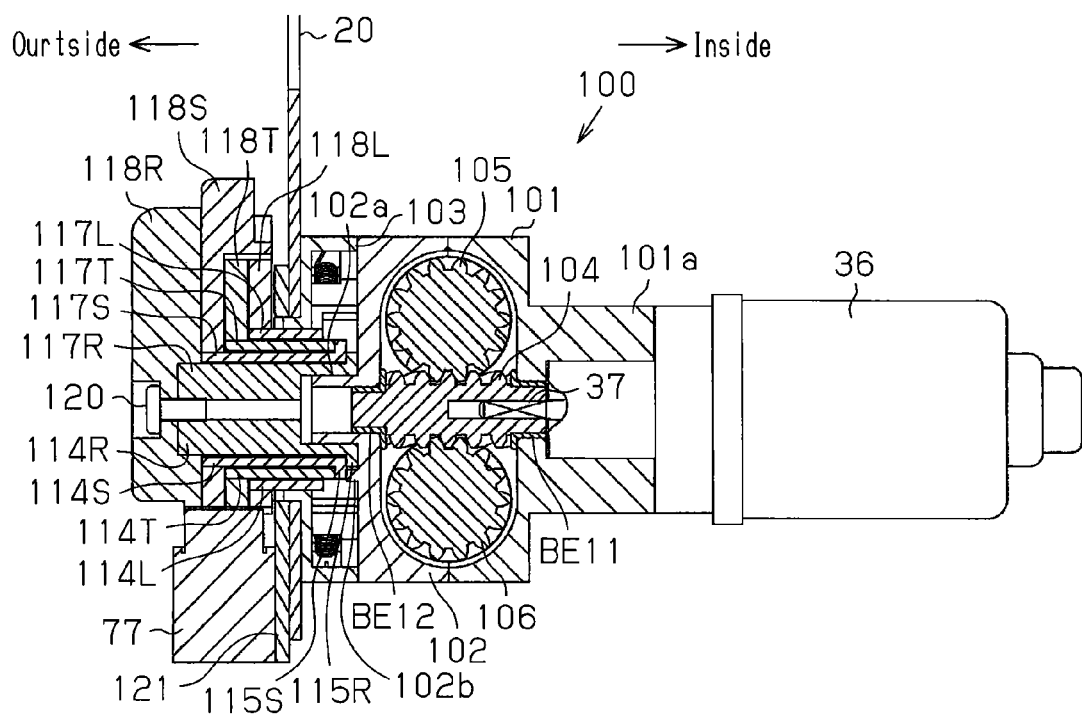
FIG. 28 is a cross-sectional view taken along line 28-28 of FIG. 27.
Figure 29:
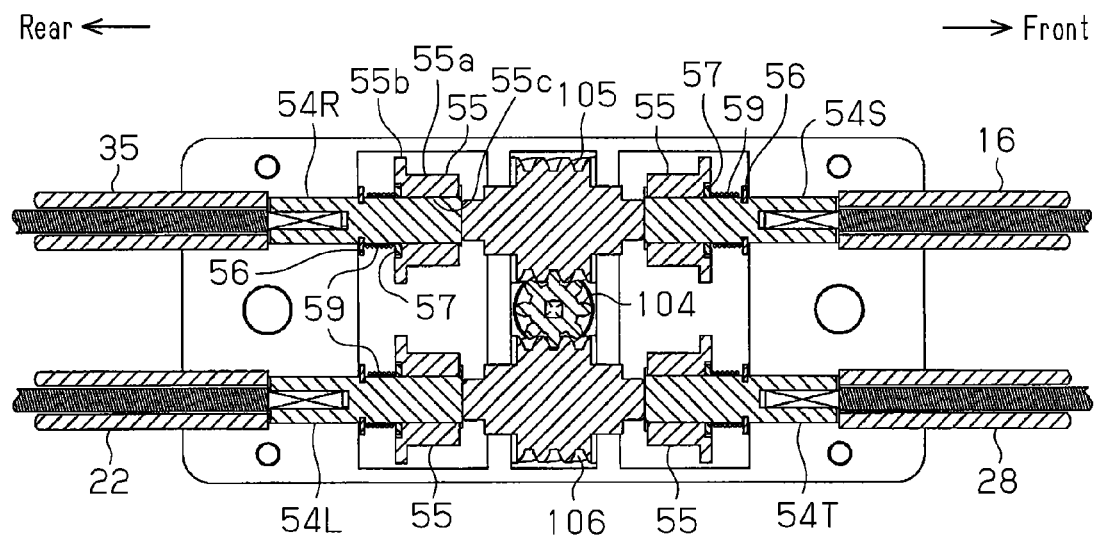
FIG. 29 is a cross-sectional view taken along line 29-29 of FIG. 27.

As shown in FIGS. 27 and 28, the body case 101 arranged near the rotary motor 36 includes a holding section 101a of a substantially cylindrical shape with a closed end concentric with the input torque cable 37 (rotary shaft 36a) that is provided to project from a side surface of the body case 101 through which the input torque cable 37 is inserted. A substantially cylindrical bearing BE11 is fitted in the holding section 101a. The input torque cable 37 is arranged at a central part of the bearing BE11. The bearing BE11 supports a base end portion of a helical gear 104 arranged coaxially with the input torque cable 37 and coupled to the input torque cable 37 to rotate integrally with the input torque cable 37. By referring further to FIG. 25, a substantially cylindrical bearing section 102a is provided at a central part of the body case 102 away from the rotary motor 36 to project outwardly parallel to the direction of the axis of the helical gear 104 (rotary shaft 36a). A guide section 102b of a substantially arcuate column concentric with the bearing section 102a is provided at a lower right part relative to the bearing section 102a that is also arranged to project outwardly. A tip portion of the helical gear 104 is supported on the body case 102 through a substantially cylindrical bearing BE12 fitted in the bearing section 102a.

As shown in FIG. 25, the body cases 101 and 102 include helical gears 105 and 106 as two input shafts arranged above and below the helical gear 104 and having axes extending in the fore-and-aft direction. The helical gears 105 and 106 are in meshing engagement with the helical gear 104 at different skew positions relative to the helical gear 104. The helical gears 105 and 106 have the same reduction ratio, which is one or greater.

Specifically, the rotary motor 36, and the helical gears 105 and 106 coupled to the rotary motor 36 (rotary shaft 36a) through the helical gear 104 form a T-shaped structure.

The body cases 101 and 102 support the lifter shaft 54L, the tilt shaft 54T, the recliner shaft 54R, and the slide shaft 54S. The recliner shaft 54R and the slide shaft 54S are coaxial with the upper helical gear 105 and arranged on the rear side and on the front side of the helical gear 105 respectively in symmetric postures. The lifter shaft 54L and the tilt shaft 54T are coaxial with the lower helical gear 106 and arranged on the rear side and on the front side of the helical gear 105 respectively in symmetric postures.

A clutch mechanism of the same structure as that of the first embodiment is formed between the helical gear 105 and the recliner shaft 54R, between the helical gear 105 and the slide shaft 54S, between the helical gear 106 and the lifter shaft 54L, and between the helical gear 106 and the tilt shaft 54T. Thus, the body cases 101 and 102 of this embodiment also house all clutch mechanisms of four channels corresponding to four output shafts (lifter shaft 54L, tilt shaft 54T, recliner shaft 54R, and slide shaft 54S) of an eight-way power seat. The helical gear 104 and the helical gears 105 and 106 driven by the rotary motor 36 through the input torque cable 37 form a power transmission mechanism that transmits rotation to any of the output shafts (lifter shaft 54L, tilt shaft 54T, recliner shaft 54R, and slide shaft 54S) through the four tubular members 55. This power transmission mechanism is also housed in the body cases 101 and 102.

The body case 102 has four substantially circular bearing holes 102c at four corners relative to the bearing section 102a that are spaced equiangularly (by 90 degrees). The body case 102 is also given four guide holes 102d that radially extend from the corresponding ones of the two bearing holes 102c arranged diagonally to be away from each other. A cam member 111 is supported in each bearing hole 102c.

Figure 26A:
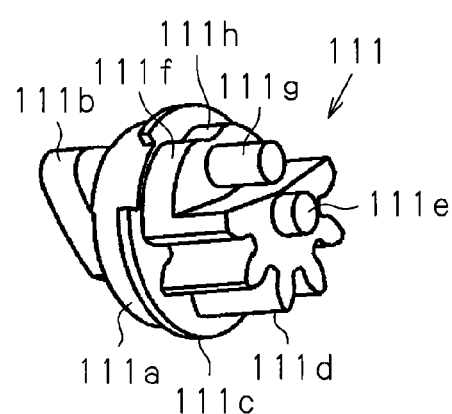
FIGS. 26(a) and 26(b) are perspective views showing a cam member.
Figure 26B:
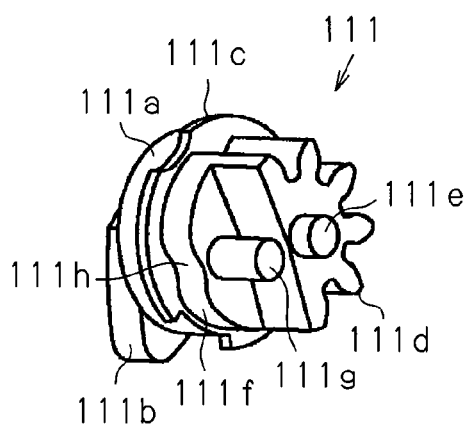

By referring further to FIGS. 26(a) and 26(b), the cam member 111 has a substantially columnar large-diameter shaft section 111a supported in the bearing hole 102c. The cam member 111 has a substantially oval cam section 111b projecting toward the inside of the body case 102 from the bearing hole 102c. The cam member 111 further has a flange section 111c projecting outward of the body case 102 from the bearing hole 102c to make sliding contact with an outer peripheral part of the bearing hole 102c. The cam member 111 has a sector gear section 111d next to the flange section 111c and arranged externally to the body case 102. The cam member 111 has a substantially columnar small-diameter shaft section 111e next to the sector gear section 111d and arranged further externally to the body case 102. The cam member 111 further has a support section 111f in a substantially sector pattern next to the flange section 111c and arranged externally to the body case 102 while extending in a range in the circumferential direction different from a range of the sector gear section 111d. The cam member 111 further has a substantially columnar spring latching section 111g provided parallel to the direction of the axis of the sector gear section 111d (small-diameter shaft section 111e) to project from a central part of the support section 111f. A guide section 111h is formed at a central part of an outer circumferential area of the support section 111f formed by radially and inwardly cutting the outer circumferential area.

Figure 31:
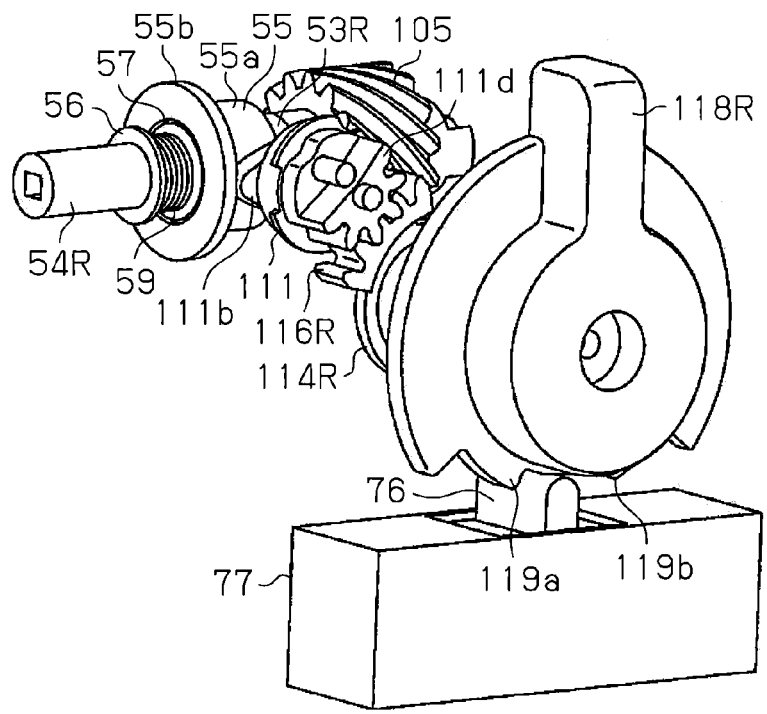
FIG. 31 is a perspective view showing behavior in the second embodiment.

As shown in FIG. 31, the cam member 111 on the side of the recliner shaft 54R is arranged in a manner that permits abutting contact with the pressing piece 55b of the tubular member 55 at the cam section 111b while contacting or being close to the outer circumferential surface of the tubular section 55a of the tubular member 55. If the cam member 111 is at a rotation position that makes the longitudinal direction of the cam section 111b agree with the direction of the axis of the tubular member 55, specifically at a rotation position that places the tubular member 55 farthest from the helical gear 105 (hereinafter also called a "neutral position" of the cam member 111), the cam member 111 releases the fitting hole 55c of the tubular member 55 from the fitting section 53R of the helical gear 105 against the urging force of the compression spring 59.

Figure 32:
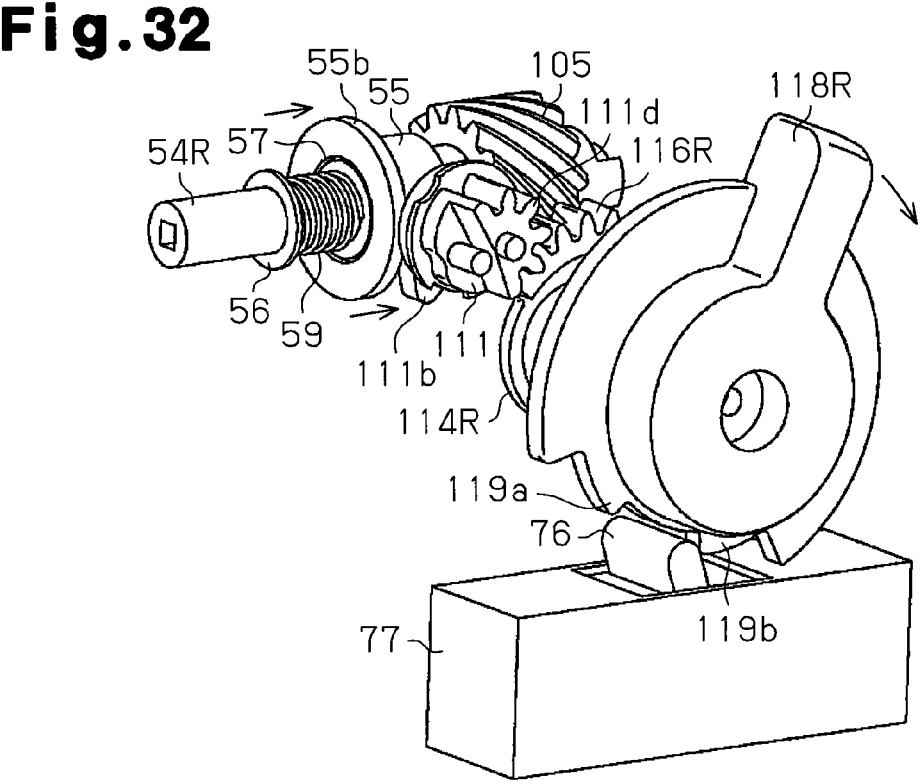
FIG. 32 is a perspective view showing behavior in the second embodiment.
Figure 33:
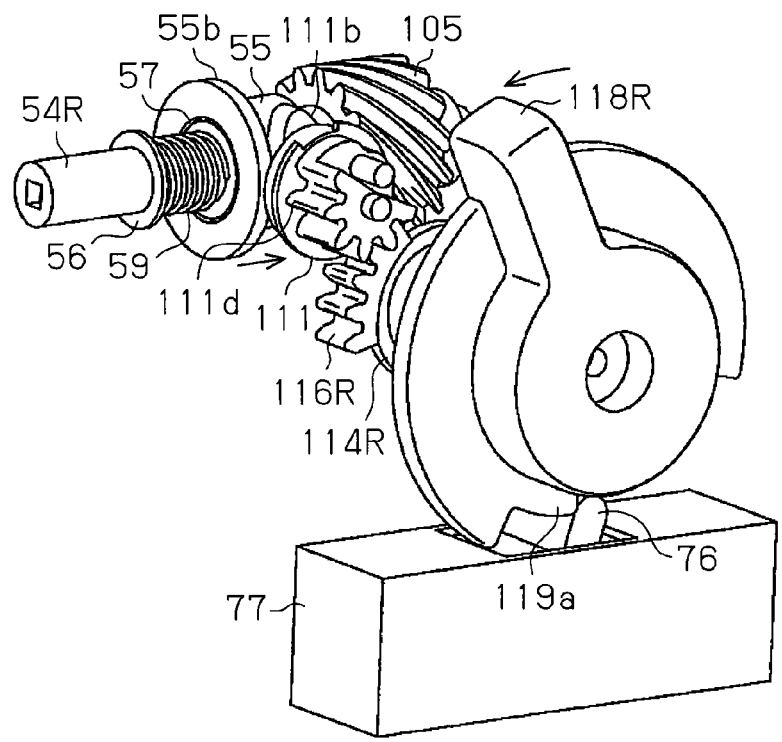
FIG. 33 is a perspective view showing behavior in the second embodiment.

As shown in FIGS. 32 and 33, if the longitudinal direction of the cam section 111b deviates from the direction of the axis of the tubular member 55 in response to rotation, the cam member 111 permits movement of the tubular member 55 such that the fitting hole 55c of the tubular member 55 urged by the compression spring 59 fits to the fitting section 53R of the helical gear 105. If the cam member 111 moves the tubular member 55 such that the longitudinal direction of the cam section 111b agrees with the direction of the axis of the tubular member 55 again while causing the cam section 111b to press the pressing piece 55b of the tubular member 55 against the urging force of the compression spring 59 in response to rotation, the fitting hole 55c of the tubular member 55 is released from the fitting section 53R of the helical gear 105. The cam member 111 on the side of the slide shaft 54S, the cam member 111 on the side of the lifter shaft 54L, and the cam member 111 on the side of the tilt shaft 54T behave in the same manner.

Figure 30:
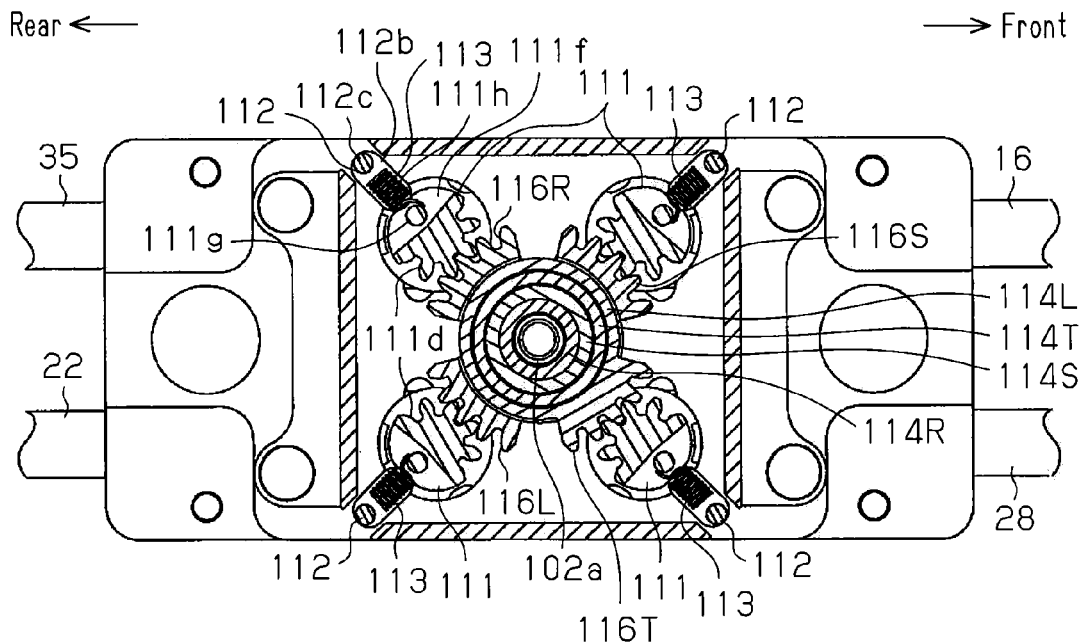
FIG. 30 is a cross-sectional view taken along line 30-30 of FIG. 27.

As shown in FIG. 25, a spring attachment member 112 is attached to each guide hole 102d of the body case 102 to be freely movable in the longitudinal direction thereof (in the radial direction of the bearing hole 102c). Specifically, each spring attachment member 112 has a sliding section 112a slidably attached to the guide hole 102d. Each spring attachment member 112 has a substantially oblong body section 112b next to the sliding section 112a and arranged externally to the body case 102. As shown in FIG. 30, each spring attachment member 112 further has a substantially columnar spring latching section 112c arranged parallel to the spring latching section 111g of the cam member 111 to project from the body section 112b. The body section 112b is arranged to face the support section 111f in a direction in which the body section 112b moves (radial direction of the cam member 111).

A tension spring 113 is attached to each spring attachment member 112. The tension spring 113 has one hook engaged with the spring latching section 112c of the spring attachment member 112 and an opposite hook engaged with the spring latching section 111g of the cam member 111. This always urges the cam member 111 and the spring attachment member 112 in a direction in which the tension spring 113 contracts. Specifically, on a side where the spring latching section 111g of the cam member 111 is placed near the spring latching section 112c of the spring attachment member 112, this cam member 111 is always urged in the direction of rotation extending in line with the radial direction of the spring latching section 112c and the bearing hole 102c.

A rotation position of the cam member 111 determined when the spring latching sections 111g and 112c are in line with the radial direction of the bearing hole 102c is set to agree with the aforementioned neutral position. Specifically, the cam member 111 is held at the neutral position while being urged by the tension spring 113. At this time, the guide section 111h of the cam member 111 faces the spring attachment member 112 in a direction (in the radial direction of the bearing hole 102c) in which the spring attachment member 112 (body section 112b) moves. Thus, while the cam member 111 is placed at the neutral position, the spring attachment member 112 urged by the tension spring 113 fits to the body section 112b into the guide section 111h. Alternatively, when displacing the cam member 111 from the neutral position against the urging force of the tension spring 113, the body section 112b goes onto the guide section 111h so that the spring attachment member 112 is placed at a retracted position along the guide hole 102d.

The urging force of the tension spring 113 that holds the cam member 111 at the neutral position is set to be greater than the urging force of the compression spring 59 that moves the tubular member 55 such that the fitting hole 55c of the tubular member 55 fits to the fitting section 53L, 53T, 53R or 53S. Accordingly, the cam member ill is generally arranged and held at the neutral position. Specifically, the cam member 111 is generally held in a condition that disables the aforementioned transmission of rotation through the tubular member 55. If the cam member 111 rotates against the urging force of the tension spring 113, the cam member 111 deviates from the neutral position. Then, the urging force of the compression spring 59 moves the tubular member 55 such that the fitting hole 55c of the tubular member 55 fits to the fitting section 53L, 53T, 53R, or 53S. This permits the aforementioned transmission of rotation through the tubular member 55.

As shown in FIGS. 25 and 28, the bearing section 102a supports a substantially cylindrical switching shaft 114R arranged on the outer circumferential side thereof and having one closed end. The switching shaft 114R has an annular flange section 115R extending radially and outwardly from a base end to be in sliding contact with the guide section 102b. The switching shaft 114R has a sector gear section 116R extending radially and outwardly from an upper left angular position of FIG. 25 as viewed from the flange section 115R to make meshing engagement with the sector gear section 111d of a corresponding cam member 111. Accordingly, in response to rotation of the switching shaft 114R, the rotation is transmitted between the sector gear sections 116R and 111d to rotate the cam member 111. A fitting section 117R of a shape like a two-bladed structure is formed at a tip portion of the switching shaft 114R.

The switching shaft 114R supports a substantially cylindrical switching shaft 114S arranged on the outer circumferential side thereof. The switching shaft 114S has an annular flange section 115S extending radially and outwardly from a base end to be in sliding contact with a distal surface of the guide section 102b and a distal surface of the flange section 115R. The switching shaft 114S has a sector gear section 116S extending radially and outwardly from an upper right angular position of FIG. 25 as viewed from the flange section 115S to make meshing engagement with the sector gear section 111d of a corresponding cam member 111. Accordingly, in response to rotation of the switching shaft 114S, the rotation is transmitted between the sector gear sections 116S and 111d to rotate this cam member 111. A fitting section 117S formed by cutting an opposite angular position as viewed in the radial direction is formed at a tip portion of the switching shaft 114S.

The switching shaft 114S supports a substantially cylindrical switching shaft 114T arranged on the outer circumferential side thereof. The switching shaft 114T has a base end in sliding contact with a distal surface of the flange section 115S. The switching shaft 114T has a sector gear section 116T extending radially and outwardly from a lower right angular position of FIG. 25 as viewed from its base end to make meshing engagement with the sector gear section 111d of a corresponding cam member 111. Accordingly, in response to rotation of the switching shaft 114T, the rotation is transmitted between the sector gear sections 116T and 111d to rotate this cam member 111. A fitting section 117T formed by cutting an opposite angular position as viewed in the radial direction is formed at a tip portion of the switching shaft 114T.

The switching shaft 114T supports a substantially cylindrical switching shaft 114L arranged on the outer circumferential side thereof. The switching shaft 114L has a sector gear section 116L extending radially and outwardly from a lower left angular position of FIG. 30 as viewed from a base end thereof to make meshing engagement with the sector gear section 111d of a corresponding cam member 111. Accordingly, in response to rotation of the switching shaft 114L, the rotation is transmitted between the sector gear sections 116L and 111d to rotate this cam member 111. A fitting section 117L formed by cutting an opposite angular position as viewed in the radial direction is formed at a tip portion of the switching shaft 114L.

Members such as the sector gear sections 116R, 116S, 116T and 116L of the switching shafts 114R, 114S, 114T and 114L exposed to the outside of the body case 102 and the cam members 111 in meshing engagement with the sector gear sections 116R, 116S, 116T and 116L are housed between the body case 102 and the cover 103 fasted to the body case 102. The switching shafts 114R, 114S, 114T and 114L extend through the cover 103 to expose respective tip portions to the outside of the cover 103.

The switching shafts 114R, 114S, 114T and 114L are set to increase in this order in respective outer diameters. The switching shafts 114R, 114S, 114T and 114L decrease in this order in distances from the body case 102 to respective tips as viewed in the direction of respective axes. The switching shaft 114L of the largest diameter is also supported on the cover 103. Specifically, the cover 103 supports all the switching shafts 114R, 114S, 114T and 114L directly or indirectly. As shown in FIG. 24, the switching shafts 114R, 114S, 114T and 114L exposed to the outside of the cover 103 extend through the lower arm 20 to expose respective tip portions (fitting sections) to the outside.

A lifter operating handle 118L as an operating member extending rearward is fitted to the fitting section 117L of the switching shaft 114L to rotate integrally with the switching shaft 114L. A tilt operating handle 118T as an operating member external to the lifter operating handle 118L and extending forward is fitted to the fitting section 117T of the switching shaft 114T to rotate integrally with the switching shaft 114T. A slide operating handle 118S as an operating member external to the tilt operating handle 118T and extending upward is fitted to the fitting section 117S of the switching shaft 114S to rotate integrally with the switching shaft 114S. A recliner operating handle 118R as an operating member external to the slide operating handle 118S and extending upward is fitted to the fitting section 117R of the switching shaft 114R to rotate integrally with the switching shaft 114R. The recliner operating handle 118R is fastened to the switching shaft 114R with a screw 120. This retains the recliner operating handle 118R together with the slide operating handle 118S, the tilt operating handle 118T, and the lifter operating handle 118L in the directions of their axes that are arranged inwardly of and coaxially with the recliner operating handle 118R.

Hence, in response to rotating operation on the lifter operating handle 118R, for example, the rotation is transmitted between the sector gear section 116R of the switching shaft 114R rotating integrally with the recliner operating handle 118R and the sector gear section 111d of the cam member ill to rotate the cam member 111 (cam section 111b). As a result, the tubular member 55 moves in the direction of the axis in the aforementioned manner. As described above, the cam member 111 is held at the neutral position while being urged by the tension spring 113. Accordingly, if being at a rotation position (hereinafter also called an "initial position") corresponding to the neutral position of the cam member 111, the recliner operating handle 118R rotating integrally with the cam member 111 is held stably by the urging force of the tension spring 113.

Specifically, the recliner operating handle 118R is generally held in a condition that disables transmission of rotation between the helical gear 105 and the recliner shaft 54R through the tubular member 55. When the recliner operating handle 118R returns to the initial position, the spring attachment member 112 (body section 112b) urged by the tension spring 113 is fitted into the guide section 111h of the cam member 111. This produces a click stop feeling while the recliner operating handle 118R rotates to the initial position.

The other operating handles 118S, 118T and 118L behave in the same manner as the recliner operating handle 118R. In this embodiment, the recliner operating handle 118R and the slide operating handle 118S are arranged above the center of the drive device 100 as viewed in the fore-and-aft direction to overlap in the direction of the seat width. The tilt operating handle 118T and the lifter operating handle 118L are arranged to be bilaterally symmetric with respect to the center of the drive device 100 as viewed the fore-and-aft direction.

The operating handles 118R, 118S, 118T and 118L have switch cam sections 119R, 119S, 119T and 119L respectively formed by radially and inwardly cutting lower parts of respective outer circumferential areas of the operating handles 118R, 118S, 118T and 118L. The switch 77 is fixed through a bracket 121 to the lower arm 20 to be placed below the switch cam sections 119R, 119S, 119T and 119L. The tip portion of the switch lever 76 is arranged to intercept paths of rotations of downwardly extending opposite end sections (pressing sections) 119a and 119b (see FIG. 23) of each of the switch cam sections 119R, 119S, 119T and 119L about the axis of the bearing section 102a. Accordingly, in response to rotating operation on one of the operating handles 118R, 118S, 118T and 118L, the tip portion of the switch lever 76 is pressed with the corresponding one of the switch cam sections 119R, 119S, 119T and 119L (end section 119a or 119b). This rotates the switch lever 76 in a direction corresponding to the direction of the operation on the corresponding operating handle 118R, 118S, 118T or 118L. As described above, in response to rotation of the switch lever 76, the switch 77 closes a circuit with a polarity corresponding to the direction of the rotation (direction of tilt of the button 77a).

It is assumed that all the operating handles 118R, 118S, 118T and 118L have not been operated and are placed in respective initial positions. In this case, as in the first embodiment, the tip portion of the switch lever 76 is placed at a midpoint between the opposite end sections 119a and 119b of each of the switch cam sections 119R, 119S, 119T and 119L. A gap is formed between the tip portion of the switch lever 76 and each of the end sections 119a and 119b. Hence, as in the first embodiment, when one of the operating handles 118R, 118S, 118T and 118L (switch cam sections 119R, 119S, 119T and 119L) presses the tip portion of the switch lever 76, rotations of remaining ones of the operating handles 118R, 118S, 118T and 118L are inhibited.

Operation of this embodiment will be described next. Rotational operations on the recliner operating handle 118R, the slide operating handle 118S, the tilt operating handle 118T, and the lifter operating handle 118L are substantially the same and the behaviors of the corresponding ones of the mechanisms M2, M4, M11 and M13 are substantially the same, except for transmission of rotations to the corresponding ones of the torque cables 16, 22, 28 and 35 relating to drive of targets of adjustment. Hence, the following describes the behavior of the recliner operating handle 118R (recliner mechanism M4) as a representative.

FIG. 31 shows a condition where the recliner operating handle 118R has not been operated at the initial position so that rotation of the helical gear 105 cannot be transmitted to the recliner shaft 54R and the rotary motor 36 and the power source are disconnected by the switch 77. In this condition, as shown in FIG. 32 or 33, the recliner operating handle 118R is rotationally operated clockwise or counterclockwise. Then, the rotation is transmitted between the sector gear sections 116R and 111d to rotate a corresponding cam member ill. This displaces the cam member 111 from the neutral position so that the tubular member 55 is moved by the urging force of the compression spring 59 such that the fitting hole 55c of the tubular member 55 fits to the fitting section 53R of the helical gear 105. This permits transmission of rotation of the helical gear 105 through the tubular member 55 to the recliner shaft 54R.

In response to rotating operation on the recliner operating handle 118R clockwise or counterclockwise from the initial position, the switch lever 76 is pressed with the end section 119a or 119b of the switch cam section 119R corresponding to the direction of the rotation of the recliner operating handle 118R, thereby rotating the switch lever 76 clockwise or counterclockwise. This rotates the rotary motor 36 in the normal or reverse direction in the aforementioned manner.

When the rotary motor 36 rotates, the rotation is transmitted to the recliner shaft 54R through the input torque cable 37, the helical gears 104 and 105, and the tubular member 55. Rotation of the recliner shaft 54R is transmitted through the recliner torque cable 35 to the recliner gear box 33, thereby actuating the recliner mechanism M4 in accordance with the direction of the rotation to make the seat back 8 pivot, specifically tilt relative to the seat cushion 7.

If the recliner operating handle 118R is released from the operation force thereafter, the recliner operating handle 118R is urged by the tension spring 113 together with the cam member 111 to return to the initial position of FIG. 31. At the same time, the cam member 111 returns to the neutral position. As described above, the urging force of the tension spring 113, which causes the cam member 111 to return to the neutral position together with the recliner operating handle 118R, is greater than the urging force of the compression spring 59, which moves the tubular member 55. This disables transmission of rotation of the helical gear 105 through the tubular member 55 to the recliner shaft 54R.

In response to return of the recliner operating handle 118R to the initial position, the rotary motor 36 and the power source are disconnected by the switch 77 in the aforementioned manner. Then, rotation of the rotary motor 36 stops.

As described in detail above, this embodiment achieves the following advantages in addition to the advantages (1), (4) to (10), (12) and (14) of the first embodiment.

(1) The operating handles 118R, 118S, 118T and 118L are supported to rotate about the axis of the same rotary shaft (axis of the bearing section 102a). Thus, the arrangements of the operating handles 118R, 118S, 118T and 118L can be concentrated in areas around this rotation axis, so that the device as a whole is reduced further in size.

(2) If one of the operating handles 118R, 118S, 118T and 118L rotates about the corresponding rotation axis, the switch lever 76 is pressed with the corresponding one of the switch cam sections 119R, 119S, 119T and 119L. This actuates the switch 77 with a polarity corresponding to the direction of the rotation (direction of the operation) of the operating handle 118R, 118S, 118T or 118L. Thus, the switch 77 to work in cooperation with operation on one of the operating handles 118R, 118S, 118T and 118L can be actuated by an extremely simple structure. The switch cam sections 119R, 119S, 119T and 119L are provided integrally with the operating handles 118R, 118S, 118T and 118L respectively, so that the device as a whole is reduced further in size.

(3) When the operating handles 118R, 118S, 118T and 118L return to their initial positions, specifically when the cam member 111 returns to the neutral position, the spring attachment member 112 (body section 112b) urged by the tension spring 113 is fitted into the guide section 111h of the cam member 111. This produces a click stop feeling reliably while the operating handles 118R, 118S, 118T and 118L return to their initial positions.

(4) When all the operating handles 118R, 118S, 118T and 118L are in a non-operated state, the gap is formed between each of the end sections 119a and 119b of each of the switch cam sections 119R, 119S, 119T and 119L and the tip portion of the switch lever 76. Hence, in response to operation on one of the operating handles 118R, 118S, 118T and 118L, one of the end sections 119a and 119b of the corresponding one of the switch cam sections 119R, 119S, 119T and 119L makes free rotation for a distance corresponding to the gap and then presses the tip portion of the switch lever 76. This rotates the switch lever 76. In this case, the gap is formed between the tip portion of the switch lever 76 and the other end section 119a or 119b of different one of the operating handles 118R, 118S, 118T and 118L (different one of the switch cam sections 119R, 119S, 119T and 119L) in a non-operated state. This prevents the tip portion of the switch lever 76 from pressing the other end section 119a or 119b of the different operating handle 118R, 118S, 118T or 118L, thereby preventing the tip portion of the switch lever 76 and this end section 119a or 119b from rotating integrally.

During rotation of the switch lever 76, the tip portion of the switch lever 76 makes free rotation for a distance corresponding to the gap between the tip portion of the switch lever 76 and the other end section 119a or 119b of the different operating handle 118R, 118S, 118T or 118L (switch cam section 119R, 119S, 119T or 119L), and then contacts or approaches this end section 119a or 119b. Thus, the presence of the tip portion of the switch lever 76 restricts rotation of the different operating handle 118R, 118S, 118T or 118L (switch cam section 119R, 119S, 119T or 119L).

Third Embodiment

A seat drive device according to a third embodiment of the present invention will now be described by referring to FIGS. 34 to 41. The third embodiment has a structure mainly differing from that of the first embodiment in the presence of a relay member. If the first or second cam member 61 or 62 is rotated in response to rotating operation on the corresponding one of the operating handles 63L, 63T, 63R and 63S, the relay member relays pressing force between the first or second cam member 61 or 62 (cam section 61b or 62b) and the tubular member 55 (pressing piece 55b). Corresponding parts are identified by the same signs and will not be described entirely.

Figure 34:
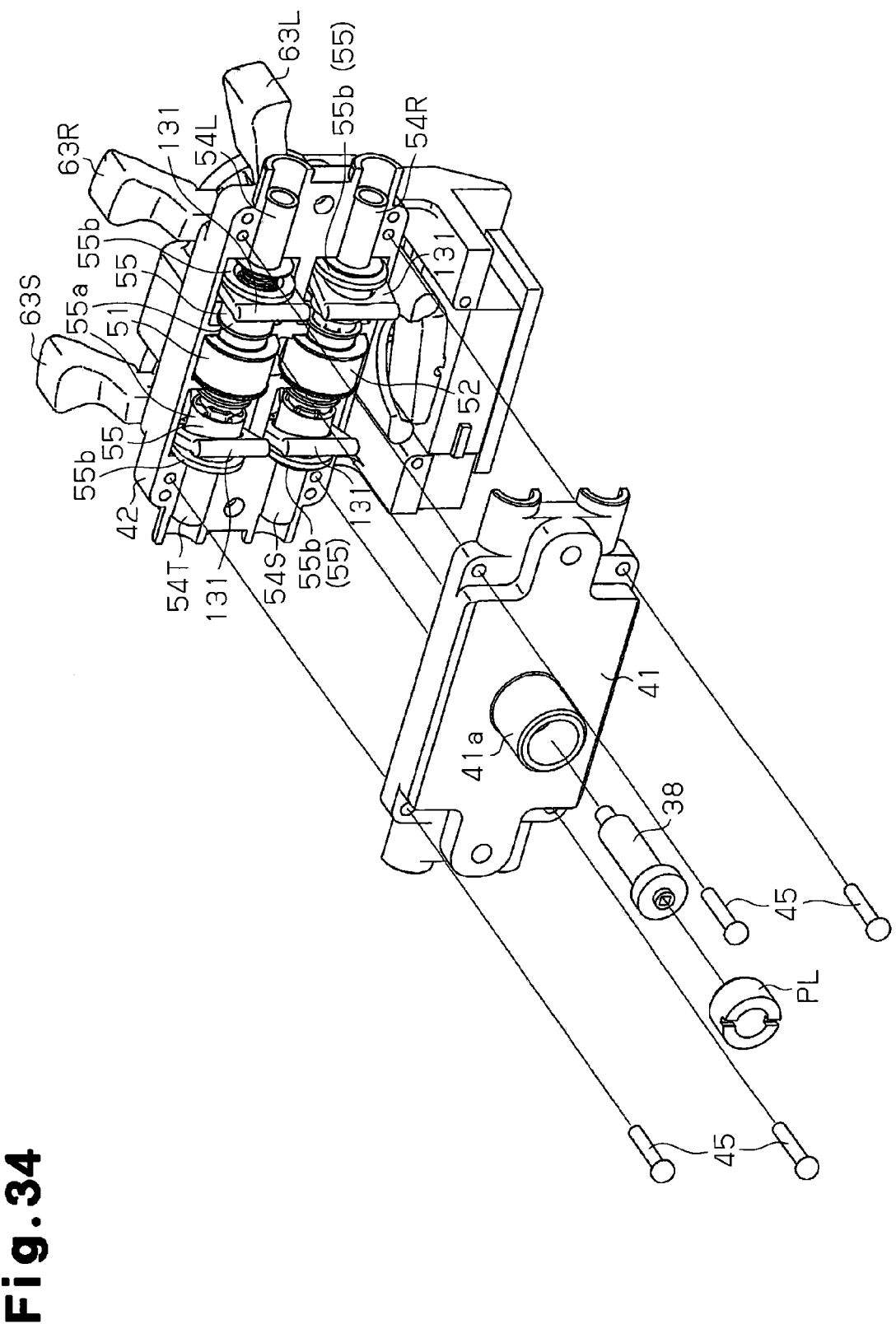
FIG. 34 an exploded perspective view showing a third embodiment of the present invention.
Figure 35:
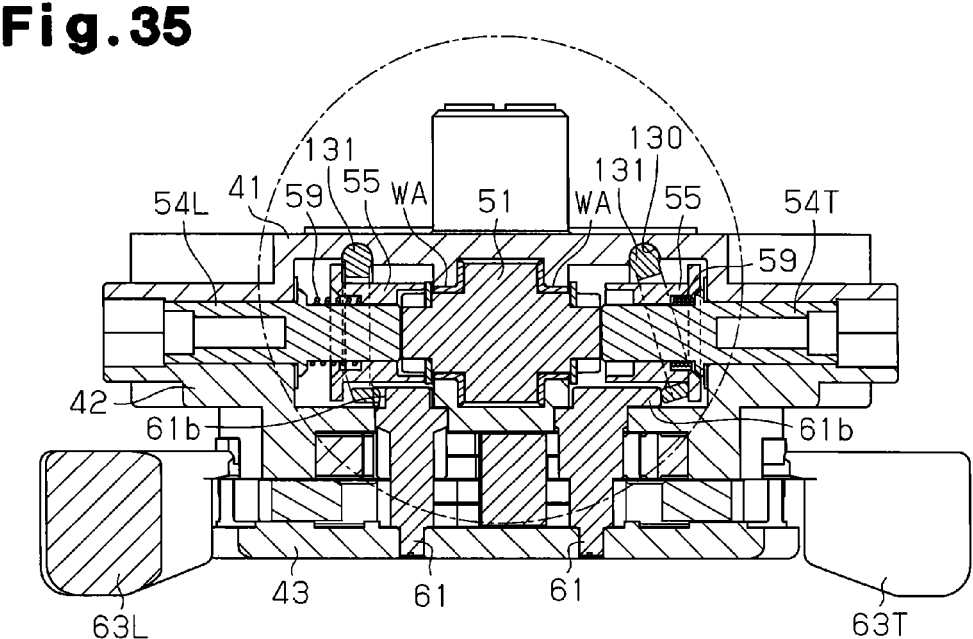
FIG. 35 is a cross-sectional view showing the third embodiment.

As shown in FIG. 34, the tubular section 55a of each tubular member 55 is loosely inserted in a relay member 131 in the shape of a substantially rectangular frame supported on the body case 41. Specifically, as shown in FIGS. 35 and 36, a bearing groove 130 in the shape of a substantially semicircular groove and extending in the vertical direction (direction orthogonal to the sheet of the drawing) is formed between the pressing piece (outward flange) 55b of the tubular member 55 and the worm wheel 51 (52) adjacent to each other.

The relay member 131 has a shaft section 132 like a column of a major arc supported in the bearing groove 130. The relay member 131 also has a body section 133 in the shape of a substantially rectangular frame crossing the tubular section 55a of the tubular member 55 in a direction substantially orthogonal to the direction of the axis of the tubular member 55. The tubular section 55a is loosely inserted in a substantially circular insertion hole 133a formed in the body section 133 of the relay member 131. This allows the relay member 131 to rotate in a predetermined range about the axis of the bearing groove 130 without interference by the tubular section 55a. A circumferential direction within this range of rotation complies with a direction in which the tubular member 55 moves and which agrees with the direction of the axis of the tubular member 55.

Figure 37:
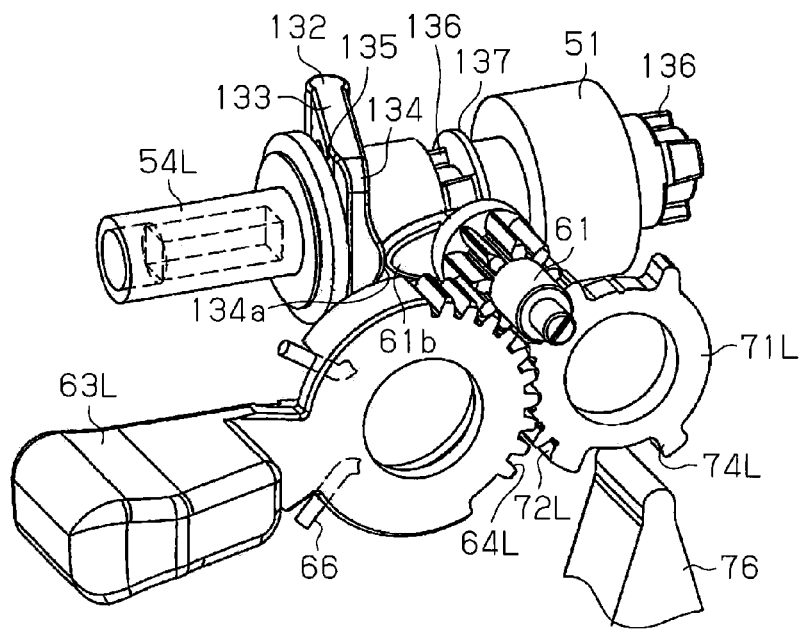
FIG. 37 is a perspective view showing behavior in the third embodiment.
Figure 38:
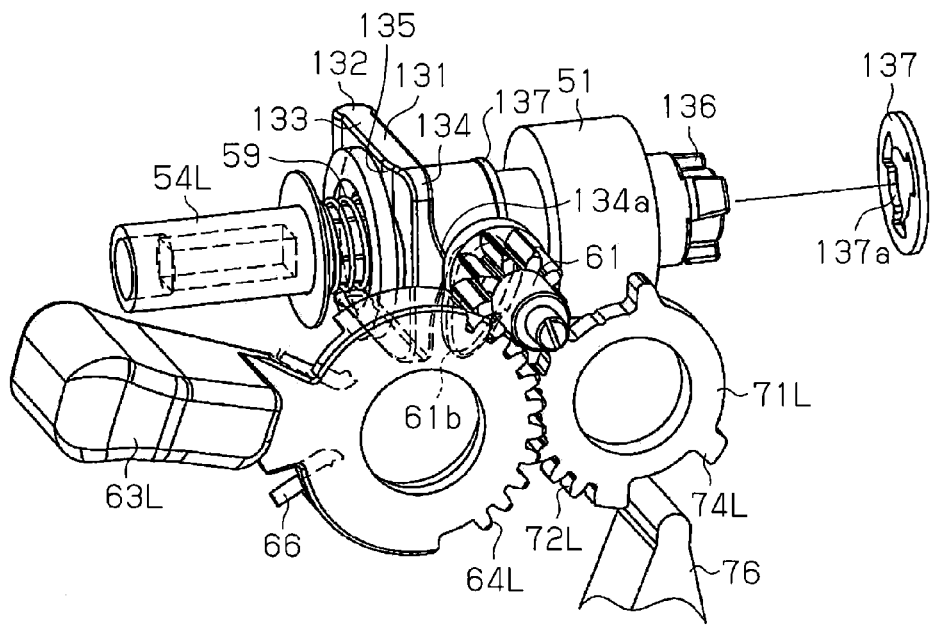
FIG. 38 is a perspective view showing behavior in the third embodiment.

A tip portion 134 of the relay member 131 away from the shaft section 132 is arranged to face the cam section 61b (62b) of the first cam member 61 (second cam member 62) in a circumferential direction about the bearing groove 130. As shown in FIGS. 37 and 38, a central part of the tip portion 134 as viewed in the vertical direction forms a projecting section 134a projecting toward the first cam member 61. The relay member 131 further has two pressure wall sections 135 arranged with the insertion hole 133a close to the tip portion 134 therebetween and above and below the insertion hole 133a (only the upper pressure wall section 135 is shown in FIGS. 37 and 38). These pressure wall sections 135 extend in the vertical direction and protrude further toward the pressing piece 55b of the tubular member 55 at their positions closer to the shaft section 132.

Figure 36:
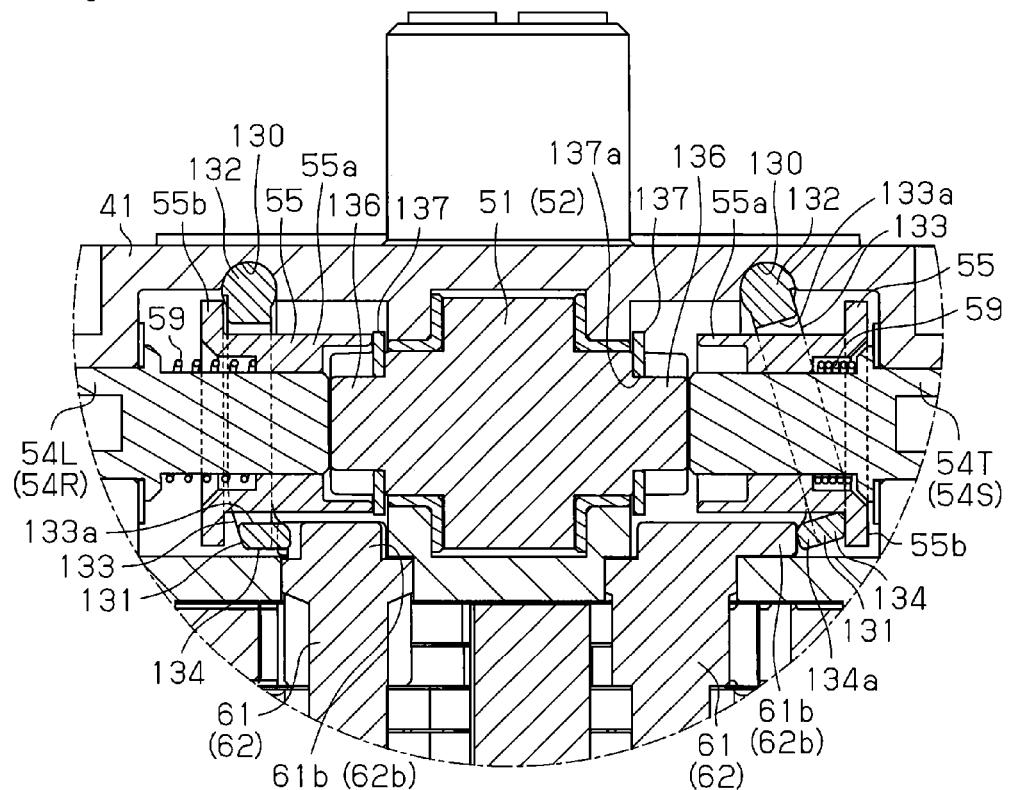
FIG. 36 is an enlarged view of FIG. 35.

If the operating handles 63L, 63T, 63R and 63S have not been operated so that the first and second cam members 61 and 62 are placed in the aforementioned neutral positions, the first cam member 61 (second cam member 62) presses the tip portion 134 (projecting section 134a) of the relay member 131 with the cam section 61b (62b), as shown in the right side of FIG. 36 and FIG. 37. This places the tip portion 134 of the relay member 131 in a condition rotated about the shaft section 132 to move in a direction away from the worm wheel 51 (worm wheel 52).

At this time, the relay member 131 presses the pressing piece 55b of the tubular member 55 with both the pressure wall sections 135 against the urging force of the compression spring 59, thereby releasing the worm wheel 51 (worm wheel 52) from the tubular member 55. Specifically, the first cam member 61 (second cam member 62) in the aforementioned neutral position presses the pressing piece 55b of the tubular member 55 through both the pressure wall sections 135 of the relay member 131. The pressing piece 55b is pressed at two points (or linearly) with both the pressure wall sections 135, so that the posture of the tubular member 55 is stabilized more than in the case where the pressing piece 55b is pressed at one point, for example.

If one of the operating handles 63L, 63T, 63R and 63S is operated so that it rotates from the aforementioned initial position, the corresponding one of the first and second cam members 61 and 62 rotates so that the cam section 61b (62b) of the first cam member 61 (second cam member 62) releases the tip portion 134 (projecting section 134a) of the relay member 131, as shown in the left side of FIG. 36 and FIG. 38. This moves the tubular member 55 urged by the compression spring 59 toward the worm wheel 51 (52). In response, the relay member 131 pressed with the pressing piece 55b of the tubular member 55 rotates about the shaft section 132 in a direction in which the tip portion 134 approaches the worm wheel 51 (worm wheel 52).

At this time, the relay member 131 crosses the tubular section 55a in a direction substantially orthogonal to the direction of the axis of the tubular member 55 (direction in which the tubular member 55 moves). Specifically, a circumferential direction of the tip portion 134 about the shaft section 132 substantially agrees with the direction of the axis of the tubular member 55 (direction in which the tubular member 55 moves). As in the first embodiment, movement of the tubular member 55 in a direction in which the tubular member 55 approaches the worm wheel 51 (52) inserts and fits the worm wheel 51 (52) into the tubular member 55.

Next, the aforementioned operating handle 63L, 63T, 63R or 63S is released from the operation to rotate to the aforementioned initial position, the first cam member 61 (second cam member 62) presses the tip portion 134 (projecting section 134a) of the relay member 131 with the cam section 61b (62b), as shown in the right side of FIG. 36 and FIG. 37. In response, the relay member 131 rotates about the shaft section 132 to move the tip portion 134 in a direction away from the worm wheel 51 (worm wheel 52).

At this time, the relay member 131 presses the pressing piece 55b of the tubular member 55 with both the pressure wall sections 135 against the urging force of the compression spring 59, thereby releasing the worm wheel 51 (worm wheel 52) from the tubular member 55. The pressing piece 55b is pressed at two points (or linearly) with both the pressure wall sections 135 at this time, so that the tubular member 55 moves more smoothly than in the case where the pressing piece 55b is pressed at one point, for example.

As shown in FIG. 38, the worm wheel 51 (worm wheel 52) includes, instead of the fitting section 53L, 53T, 53R or 53S having a shape like a two-bladed structure, a fitting section 136 having a shape like a three-bladed structure composed of a combination of a columnar shape and three arcuate columnar shapes equally and angularly spaced and extending radially from the former columnar shape. The fitting section 136 is inserted and fitted in a substantially annular buffer member 137. The buffer member 137 is made for example of elastomer or rubber and has a fitting hole 137a having a shape like a three-bladed structure to conform to the outer shape of the fitting section 136. The buffer member 137 closely contacts a distal surface of the worm wheel 51 (worm wheel 52) facing the tubular member 55 and forming a peripheral part of a base end of the fitting section 136.

The tubular member 55 obviously includes, instead of the fitting hole 55c having a shape like a two-bladed structure, a fitting hole (not shown in the drawings) having a shape like a three-bladed structure that can fit the fitting section 136. Hence, the buffer member 137 is placed between the aforementioned distal surface of the worm wheel 51 (worm wheel 52) and a distal surface of the tubular member 55 facing the worm wheel 51 (worm wheel 52) and forming a peripheral part of the fitting hole of the tubular member 55. Accordingly, if the fitting section 136 of the worm wheel 51 (worm wheel 52) is inserted and fitted in the fitting hole of the tubular member 55, the aforementioned distal surface of the tubular member 55 contacts the aforementioned distal surface of the worm wheel 51 (worm wheel 52) through the buffer member 137. This reduces sound that occurs as a result of contact between the distal surfaces of the worm wheel 51 (worm wheel 52) and the tubular member 55 when the worm wheel 51 (worm wheel 52) is inserted and fitted in this tubular member 55.

Figure 39:
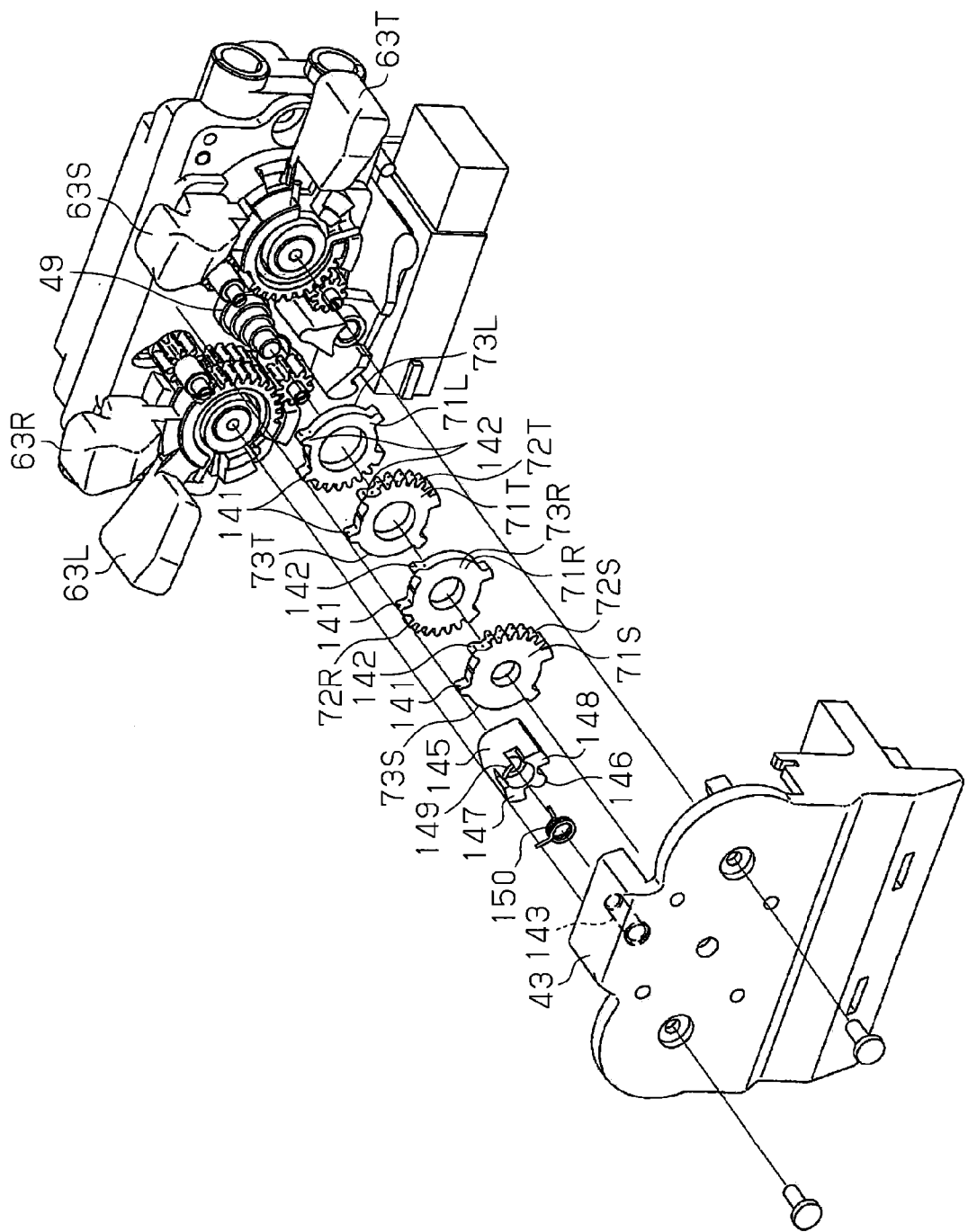
FIG. 39 is an exploded perspective view showing behavior in the third embodiment.

As shown in FIG. 39, the switch cam members 71L, 71T, 71R and 71S are each provided with two pawl like engagement sections 141 and 142 projecting radially outwardly with respect to the switch bearing section 49 from an upper area of an outer circumferential part of each of the switch cam members 71L, 71T, 71R and 71S placed between each of the gear sections 72L, 72T, 72R and 72S and each of the arcuate sections 73L, 73T, 73R and 73S.

The cover 43 is provided with a shaft 143 as a third rotary shaft arranged above the switch bearing section 49 and having an axis extending parallel to the axis of the switch bearing section 49. A stop cam 145 of a shape like a trefoil arranged above the switch cam members 71L, 71T, 71R and 71S is supported on a central part of the shaft 143.

Figure 40:
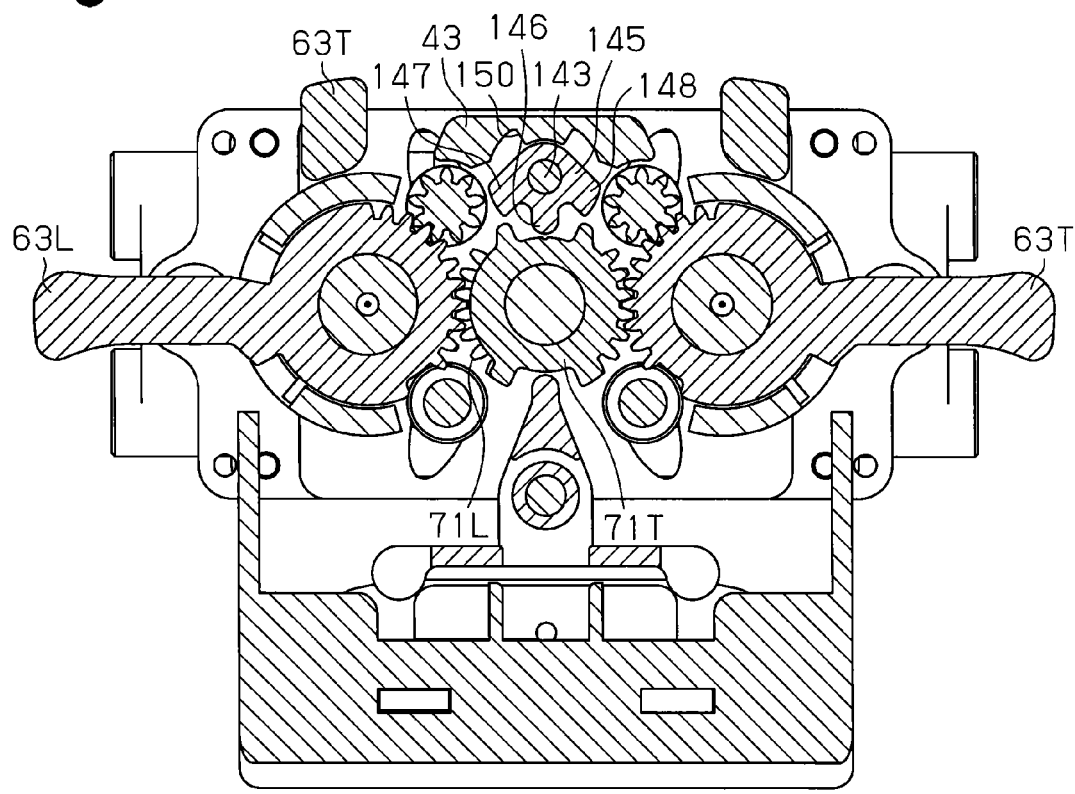
FIG. 40 is a cross-sectional view showing the third embodiment.
Figure 41:
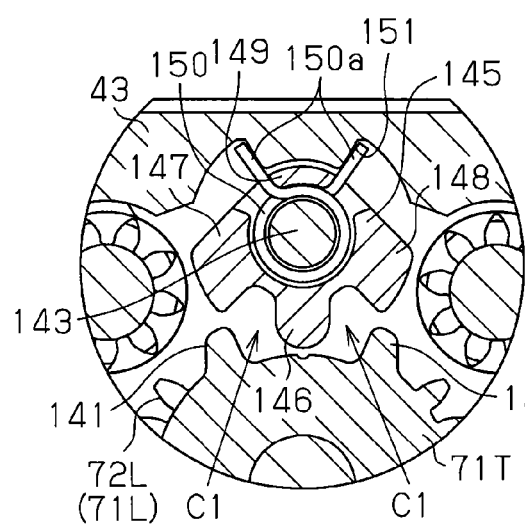
FIGS. 41(a) and 41(b) are cross-sectional views showing behavior in the third embodiment.
Figure 41:
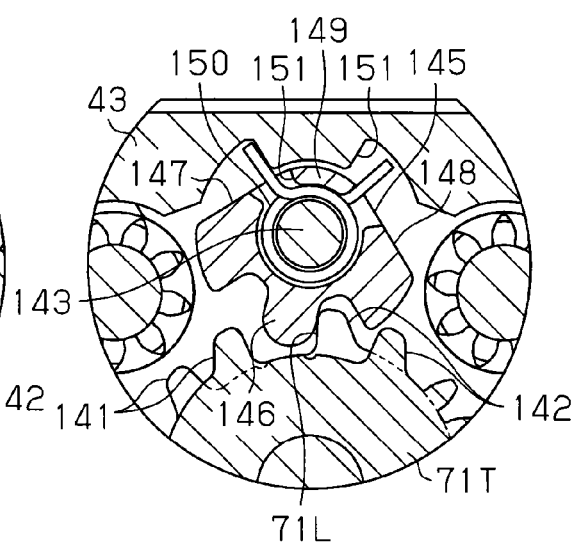
Figure 42:
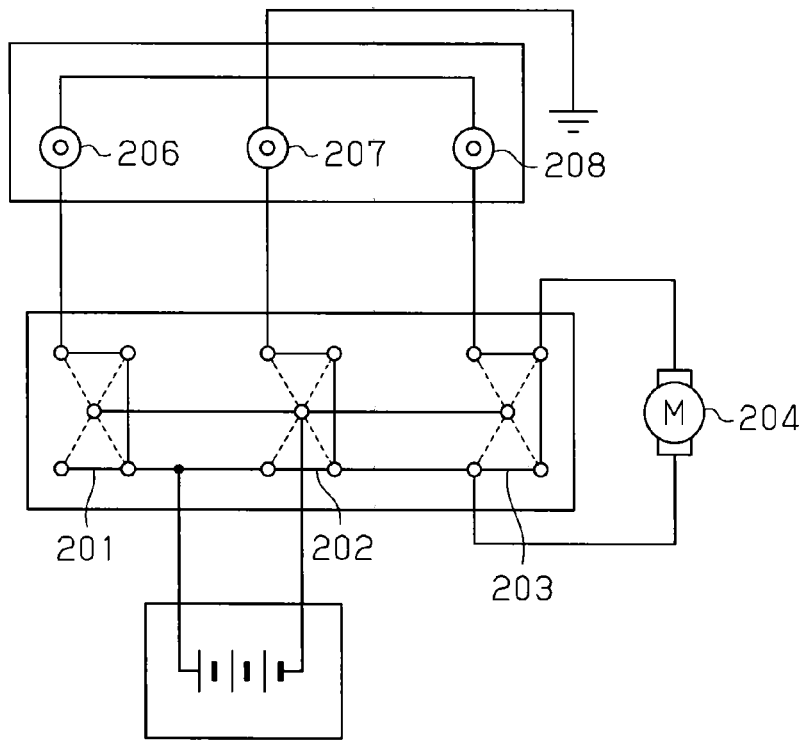
FIG. 42 is an explanatory view showing an electrical structure of a conventional example.
Figure 43:
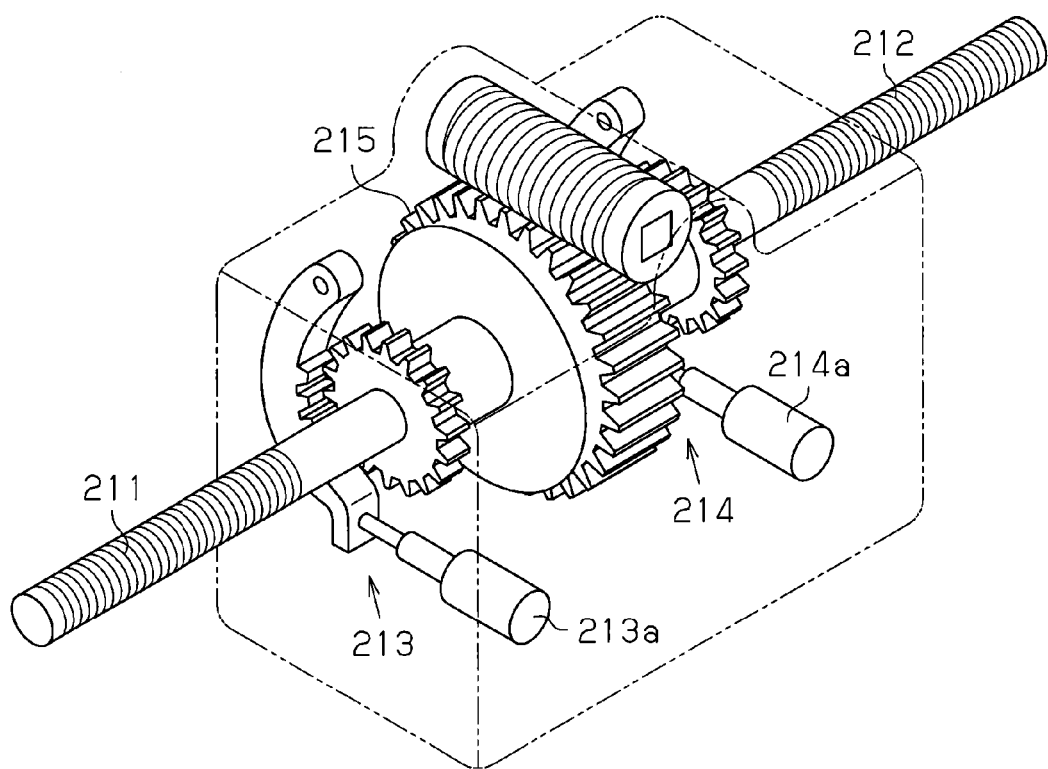
FIG. 43 is an explanatory view showing a different conventional example.
Figure 44:
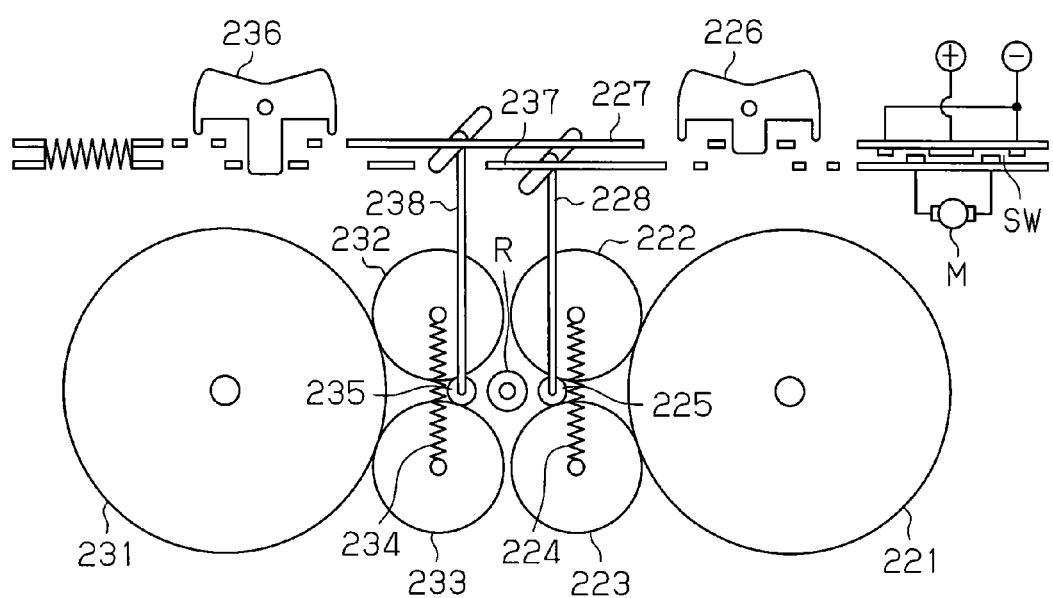
FIG. 44 is an explanatory view showing a different conventional example.

As shown in FIGS. 40, 41(a) and 41(b), the stop cam 145 has a pressed section 146 projecting radially with respect to the shaft 143, and two restricting sections 147 and 148 with the pressed section 146 therebetween. The restricting sections 147 and 148 radially project substantially in a sector pattern from opposite sides of a circumferential direction with respect to the shaft 143. The pressed section 146 and both the restricting sections 147 and 148 extend in the direction of the axes of all the switch cam members 71L, 71T, 71R and 71S (engagement sections 141 and 142) to cover the positions of the switch cam members 71L, 71T, 71R and 71S in the direction of the respective axes.

As shown in FIGS. 41(a) and 41(b), a torsion spring 150 is wound around the rotation axis of the stop cam 145. Legs 150a at opposite ends of the torsion spring 150 have root portions contacting a stopper section 149 of the stop cam 145, thereby preventing rotation of the legs 150a. Positions of respective tip portions of the legs 150a are determined at an engagement wall 151 of the cover 43. The stop cam 145 is held at a predetermined initial rotation position (neutral position) by being urged by the torsion spring 150.

It is assumed that all the operating handles 63L, 63T, 63R and 63S have not been operated and are placed in respective initial positions. In this case, as shown in FIG. 41(a), the stop cam 145 held at the initial rotation position is arranged such that the pressed section 146 intercepts paths of rotation of both the engagement sections 141 and 142 of each of the switch cam members 71L, 71T, 71R and 71S about the axis of the switch bearing section 49. The pressed section 146 is arranged in a central part between the engagement sections 141 and 142 of each of the switch cam members 71L, 71T, 71R and 71S. A gap C1 is formed between the pressed section 146 and each of the engagement sections 141 and 142 of the switch cam members 71L, 71T, 71R and 71S. The restricting sections 147 and 148 each have a tip to get close to a tip of each of the engagement sections 141 and 142, thereby freeing the paths of rotations of both the engagement sections 141 and 142 about the axis of the switch bearing section 49.

Accordingly, if one of the switch cam members 71L, 71T, 71R and 71S rotates in response to rotating operation on the corresponding one of the operating handles 63L, 63T, 63R and 63S, the engagement section 141 or 142 makes free rotation for a distance corresponding to the gap C1 and then starts to press the pressed section 146 of the stop cam 145. Pressing the pressed section 146 with the engagement section 141 or 142 rotates the stop cam 145 in a direction corresponding to the direction of the operation on the corresponding operating handle 63L, 63T, 63R or 63S. At this time, the stop cam 145 inhibits rotations of remaining ones of the switch cam members 71L, 71T, 71R and 71S.

As an example, if the lifter switch cam member 71L rotates counterclockwise as viewed in FIG. 41(a) in response to rotating operation on the lifter operating handle 63L, the lifter switch cam member 71L makes free rotation for a distance corresponding to the gap C1 on the right side as viewed in the drawing and then presses the pressed section 146 of the stop cam 145 with its engagement section 142. This rotates the stop cam 145 clockwise about the shaft 143 as viewed in the drawing. Then, as shown in FIG. 41(b), the restricting section 148 on the right side of the drawing intercepts a path of rotation of the engagement section 142 of the tilt switch cam member 71T on the right side of the drawing. Accordingly, the restricting section 148 of the stop cam 145 on the right side of the drawing restricts counterclockwise rotation of the tilt switch cam member 71T.

The pressed section 146 of the stop cam 145 makes free rotation for a distance corresponding to the gap C1 between the pressed section 146 and the engagement section 141 of the tilt switch cam member 71T to contact or be close to this engagement section 141. In other words, if the stop cam 145 rotates in response to counterclockwise rotation of the lifter switch cam member 71L as viewed in the drawing, the presence of the gap C1 on the left side of FIG. 41(a) prevents the pressed section 146 from pressing the engagement section 141 of the tilt switch cam member 71T to prevent counterclockwise rotation of this engagement section 141 as viewed in the drawing.

During rotation of the stop cam 145, the pressed section 146 makes free rotation for a distance corresponding to the gap C1 between the pressed section 146 and the engagement section 141 of the tilt switch cam member 71T on the left side as viewed in the drawing to contact or be close to this engagement section 141. Thus, the pressed section 146 of the stop cam 145 restricts clockwise rotation of the tilt switch cam member 71T.

In contrast, if the lifter switch cam member 71L rotates clockwise as viewed in FIG. 41(a) in response to rotating operation on the lifter operating handle 63L, the lifter switch cam member 71L makes free rotation for a distance corresponding to the gap C1 on the left side as viewed in the drawing and then presses the pressed section 146 of the stop cam 145 with its engagement section 141. This rotates the stop cam 145 counterclockwise about the shaft 143 as viewed in the drawing. Then, the restricting section 147 on the left side of the drawing intercepts a path of rotation of the engagement section 141 of the tilt switch cam member 71T on the left side of the drawing. Accordingly, the restricting section 147 of the stop cam 145 on the left side of the drawing restricts clockwise rotation of the tilt switch cam member 71T.

The pressed section 146 of the stop cam 145 makes free rotation for a distance corresponding to the gap C1 between the pressed section 146 and the engagement section 142 of the tilt switch cam member 71T to contact or be close to this engagement section 142. In other words, if the stop cam 145 rotates in response to clockwise rotation of the lifter switch cam member 71L as viewed in the drawing, the presence of the gap C1 on the right side of FIG. 41(a) prevents the pressed section 146 from pressing the engagement section 142 of the tilt switch cam member 71T to prevent clockwise rotation of this engagement section 142 as viewed in the drawing.

During rotation of the stop cam 145, the pressed section 146 makes free rotation for a distance corresponding to the gap C1 between the pressed section 146 and the engagement section 142 of the tilt switch cam member 71T on the right side as viewed in the drawing to contact or be close to this engagement section 142. Thus, the pressed section 146 of the stop cam 145 restricts counterclockwise rotation of the tilt switch cam member 71T.

The same applies to the operation of the other switch cam members including the recliner switch cam member 71R and the slide switch cam member 71S when the lifter operating handle 63L is rotationally operated. Accordingly, even if one of the switch cam members 71L, 71T, 71R and 71S rotates, the presence of the stop cam 145 restricts rotations of remaining ones of the switch cam members 71L, 71T, 71R and 71S. Further, if one of the switch cam members 71L, 71T, 71R and 71S rotates, the right and left gaps C1 prevent the stop cam 145 from rotating remaining ones of the switch cam members 71L, 71T, 71R and 71S.

As described above, although all the switch cam members 71L, 71T, 71R and 71S are arranged on the same axis, if one of the switch cam members 71L, 71T, 71R and 71S rotates first, the stop cam 145 restricts rotations of remaining ones of the switch cam members 71L, 71T, 71R and 71S. Further, the right and left gaps C1 prevent the stop cam 145 pressed with one of the switch cam members 71L, 71T, 71R and 71S from rotating remaining ones of the switch cam members 71L, 71T, 71R and 71S accidentally. This inhibits swinging motions of the corresponding ones of the operating handles 63L, 63T, 63R and 63S coupled to the remaining ones of the switch cam members 71L, 71T, 71R and 71S to be caused by the rotations of these switch cam members.

As described in detail above, this embodiment achieves the following advantages in addition to the aforementioned advantages of the first embodiment.

(1) If one of the operating handles 63L, 63T, 63R and 63S is operated at the initial position against the urging force of the torsion spring 65 or 66, the pressing piece 55b of the tubular member 55 is released from pressure applied from the cam section 61b or 62b of the first or second cam member 61 or 62 through the relay member 131. This permits the worm wheel 51 or 52 to be fitted into a corresponding tubular member 55 urged by the compression spring 59. This connects an output shaft (lifter shaft 54L, tilt shaft 54T, recliner shaft 54R, or slide shaft 54S) to a corresponding positioning mechanism (M1, M2, M3 or M4) and the worm wheel 51 or 52. In contrast, releasing this operating handle 63L, 63T, 63R or 63S from the operation return this operating handle 63L, 63T, 63R or 63S urged by the torsion spring 65 or 66 to the initial position. At this time, the relay member 131 is pressed with the corresponding one of the cam sections 61b and 62b to press the pressing piece 55b against the urging force of the compression spring 59. This releases the worm wheel 51 or 52 from the tubular member 55. In the meantime, the relay member 131 rotates in the circumferential direction along a direction in which the tubular member 55 moves to press the pressing piece 55b. Thus, the pressing piece 55b is pressed at a plurality of points (or linearly) with both the pressure wall sections 135, unlike the case where the pressing piece 55b is pressed directly at one point for example with the cam section 61b or 62b. As a result, the tubular member 55 moves more smoothly against the urging force of the compression spring 59.

(2) The buffer member 137 is placed between the distal surface of each tubular member 55 and that of the worm wheel 51 or 52 facing the distal surface of the tubular member 55. This reduces sound that occurs as a result of contact between these distal surfaces when the worm wheel 51 or 52 is inserted and fitted in each tubular member 55.

(3) While all the operating handles 63L, 63T, 63R and 63S are in a non-operated state, the gap C1 is formed between each of the engagement sections 141 and 142 of each of the switch cam members 71L, 71T, 71R and 71S and the pressed section 146 of the stop cam 145. Hence, in response to operation on one of the operating handles 63L, 63T, 63R and 63S, one of the engagement sections 141 and 142 of the corresponding one of the switch cam members 71L, 71T, 71R and 71S makes free rotation for a distance corresponding to the gap C1 and then presses the pressed section 146 of the stop cam 145. This rotates the stop cam 145 about the axis of the shaft 143. Thus, one of the restricting sections 147 and 148 intercepts a path of rotation of the aforementioned engagement section 141 or 142 of different one of the switch cam members 71L, 71T, 71R and 71S. Accordingly, rotation of the different switch cam member 71L, 71T, 71R or 71S can be restricted by this restricting section 147 or 148 of the stop cam 145.

When all the operating handles 63L, 63T, 63R and 63S are in a non-operated state, the gap C1 is formed between each of the engagement sections 141 and 142 of each of the switch cam members 71L, 71T, 71R and 71S and the pressed section 146 of the stop cam 145. Hence, when one of the operating handles 63L, 63T, 63R and 63S is operated, the pressed section 146 of the stop cam 145 is prevented from pressing the other engagement section 141 or 142 of the switch cam member 71L, 71T, 71R or 71S corresponding to different one of the operating handles 63L, 63T, 63R and 63S in a non-operated state, thereby preventing the pressed section 146 of the stop cam 145 and this engagement section 141 or 142 from rotating integrally.

During rotation of the stop cam 145, the pressed section 146 makes free rotation for a distance corresponding to the gap C1 between the pressed section 146 and the other engagement section 141 or 142 of the switch cam member 71L, 71T, 71R or 71S corresponding to the different operating handle 63L, 63T, 63R or 63S in a non-operated state, and then contacts this engagement section 141 or 142. Thus, the presence of the pressed section 146 of the stop cam 145 can restrict rotation of the different switch cam member 71L, 71T, 71R or 71S.

The aforementioned embodiments may be modified as follows.

In the first and second embodiments, one of a relay member (131), a buffer member (137), and a stop cam (145) conforming to those of the third embodiment may be provided, or these members may be provided selectively in combination. However, the absence of a switch cam member in the second embodiment prohibits combination including a stop cam (145).

In the first and third embodiments, the switch cam members 71L, 71T, 71R and 71S (switch cam sections 74L, 74T, 74R and 74S) may be omitted and the operating handles 63L, 63T, 63R and 63S may be provided with appropriate switch cam sections. Then, the switch lever 76 may be pressed directly with the operating handles 63L, 63T, 63R and 63S.

In the first and third embodiments, all the operating handles 63L, 63T, 63R and 63S may be supported to rotate about different rotation axes. In this case, the switch lever 76 may be pressed directly with the operating handles 63L, 63T, 63R and 63S or may be pressed with the operating handles 63L, 63T, 63R and 63S through a switch cam member.

In the first and third embodiments, outputs of two channels (specifically, two positioning mechanisms) may be produced by omitting one of the worm wheels 51 and 52. Outputs of three channels (specifically, three positioning mechanisms) may be produced by producing output of one channel connectable to one of the worm wheels 51 and 52.

While the travel link 17 is coupled to the front link 4 in the first and third embodiments, it may be coupled to an appropriate position of the rear link 5 or the lower arm 20, for example. In short, what is required is only to allow the direction converting gear unit 15 to pivot to follow up and down movement of the lower arm 20 (drive device 40).

In the first and third embodiments, the link structure may be omitted that makes the direction converting gear unit 15 swing to follow swinging motion of the front link 4 that accompanies actuation of the lifter mechanism M2.

In the first and third embodiment, the upper part of the drive device 40 (side cover) does not necessarily need to tilt inward with respect to the direction of the seat width toward the upper end.

Accordingly, the rotary motor 36 does not necessarily need to be arranged such that the axis thereof tilts down further toward the center of the seat width.

In the second embodiment, the four operating handles 118L, 118T, 118R and 118S may be divided into two groups. These two groups of operating handles may be supported to rotate about two different rotation axes. In this case, the switch lever 76 may be pressed directly with the operating handles 118L, 118T, 118R and 118S or may be pressed with the operating handles 118L, 118T, 118R and 118S through a switch cam member.

In the second embodiment, the operating handles 118L, 118T, 118R and 118S may press the switch lever 76 through corresponding switch cam members, as in the first embodiment.

In the second embodiment, the slide gear box 13 and the slide torque cable 16 may be coupled through a direction converting gear unit (15). Further, the second embodiment may employ a link structure conforming to that of the first embodiment that causes the direction converting gear unit to swing to follow swinging motion of the front link 4 that accompanies actuation of the lifter mechanism M2.

In the second embodiment, the drive device 100 may tilt inward with respect to the direction of the seat width toward the upper end.

Accordingly, the rotary motor 36 may be arranged such that the axis thereof tilts down further toward the center of the seat width.

In the second embodiment, outputs of two channels (specifically, two positioning mechanisms) may be produced by omitting one of the helical gears 105 and 106. Outputs of three channels (specifically, three positioning mechanisms) may be produced by producing output of one channel connectable to one of the helical gears 105 and 106.

In each of the aforementioned embodiments, an appropriate urging member may be provided that urges the tubular member 55 toward a direction that releases the fitting hole 55c of the tubular member 55 from the fitting sections 53L, 53T, 53R, and 53S. Further, each of the aforementioned embodiments may employ a structure where the tubular member 55 moves in a direction that allows the fitting hole 55c to be fitted to the fitting sections 53L, 53T, 53R, and 53S against the urging force of this urging member in response to rotation of the first and second cam members 61, 62 or the cam member 111.

In each of the aforementioned embodiments, the structure of each of the gear boxes 13, 21, 27 and 33 is merely shown as an example. As an example, two helical gears may be responsible for direction conversion. In this case, rotation may be transmitted at a constant speed between the two helical gears without being decelerated therebetween.

In the aforementioned embodiments, the drive devices 40 and 100 are arranged in a central part of the lower arm 20 surrounded by transmission units (gear boxes) of a plurality of positioning mechanism. However, the drive devices 40 and 100 can be arranged in any place.

In each of the aforementioned embodiments, each operating handle does not necessarily need to extend in a radial direction with respect to the axis thereof.

DESCRIPTION OF THE REFERENCE NUMERALS

C, C1 Gap
M1, M11 Slide mechanism (positioning mechanism)
M2 Lifter mechanism (positioning mechanism)
M3, M13 Tilt mechanism (positioning mechanism)
M4 Recliner mechanism (positioning mechanism)
1 Lower rail
2 Upper rail
3 Bracket
4 Front link
5 Rear link
7 Seat cushion
10 Side cover
10a Recessed section
15 Direction converting gear unit (transmission unit)
16 Slide torque cable (torque cable)
17 Travel link (link)
20 Lower arm
21 Lifter gear box (transmission unit)
22 Lifter torque cable (torque cable)
27 Tilt gear box (transmission unit)
28 Tilt torque cable (torque cable)
33 Recliner gear box (transmission unit)
35 Recliner torque cable (torque cable)
36 Rotary motor
38 Worm
41, 42 Body case (housing)
42a, 42b Bearing section
42g, 42h Bearing hole
43a Shaft (second rotary shaft)
43 Cover (housing)
44 Switch cover (housing)
49 Switch bearing section
51, 52 Worm wheel (input shaft)
53L, 53T, 53R, 53S Fitting section
54L Lifter shaft (output shaft)
54T Tilt shaft (output shaft)
54R Recliner shaft (output shaft)
54S Slide shaft (output shaft)
54a Output shaft fitting section
55 Tubular member (clutch mechanism)
55b Pressing piece (outward flange)
55c Fitting hole
59 Compression spring (first urging member)
63L, 63T, 63R, 63S, 118R, 118S, 118T, 118L Operating handle (operating member)
61 First cam member (cam member)
61b, 62b Cam section
62 Second cam member (cam member)
65, 66 Torsion spring (second urging member)
71L, 71T, 71R, 71S Switch cam member
74L, 74T, 74R, 74S Switch cam section
74a, 74b, 119a, 119b End section (pressing section)
76 Switch lever
77 Switch
104 Helical gear
105, 106 Helical gear (input shaft)
111 Cam member
119R, 119S, 119T, 119L Switch cam section
131 Relay member
137 Buffer member
141, 142 Engagement section
143 Shaft (third rotary shaft)
145 Stop cam
146 Pressed section
147, 148 Restricting section
149 Stopper section
150 Torsion spring

The invention claimed is:

1. A seat drive device comprising:
a single rotary motor;
a plurality of operating members provided in correspondence with a plurality of positioning mechanisms;
a plurality of clutch mechanisms provided in correspondence with the positioning mechanisms, wherein
each of the clutch mechanisms includes:
an output shaft connected to a corresponding positioning mechanism, and
an input shaft rotated by the rotary motor,
wherein, in response to operation on any one of the operating members, the clutch mechanism selectively connects the output shaft to the positioning mechanism corresponding to the operated operating member to the input shaft rotated by the rotary motor; and a single switch, wherein, in response to operation on any one of the operating members, the switch energizes the rotary motor with a polarity corresponding to a direction of the operation, wherein each of the clutch mechanisms includes a tubular member, wherein a corresponding output shaft is inserted and fitted in the tubular member to rotate integrally with the tubular member and to be movable in a direction of an axis, and wherein the input shaft is inserted and fitted in the tubular member such that the input shaft rotates integrally with the tubular member in response to movement of the tubular member in the direction of the axis toward the input shaft, and each of the clutch mechanisms of the seat drive device includes:
- a first urging member that urges each of the tubular members in the direction of the axis toward a direction in which the input shaft is inserted and fitted in the tubular member;
- a cam member drivably coupled to each of the operating members, wherein the cam member releases the input shaft from a fitted state with the corresponding one of the tubular members when the operating member is at a predetermined initial position, and, in response to operation on the operating member at the initial position, the cam member permits the input shaft to be fitted in the corresponding one of the tubular members urged by the first urging member; and
- a second urging member that urges the corresponding one of the operating members against an urging force of the first urging member such that each of the operating members is held at the initial position.

2. The seat drive device according to claim 1, wherein the operating members are supported to rotate about the same rotation axis.

3. The seat drive device according to claim 2, further comprising a single switch lever that actuates the switch such that the switch energizes the rotary motor, wherein each of the operating members includes a switch cam section, wherein in response to rotation of the operating member about the rotation axis, the switch cam section presses the switch lever such that the switch is actuated with a polarity corresponding to a direction of the rotation.

4. The seat drive device according to claim 3, wherein the rotation axis of the operating members is a first rotation axis, the switch lever is supported to rotate about a second rotation axis different from that of the operating members, the switch lever has a tip portion, the operating members are configured such that, in response to rotation of the operating members about the first rotation axis, the switch cam section presses the tip portion of the switch lever in accordance with the direction of the rotation, thereby rotating the switch lever about the second rotation axis to actuate the switch, the switch cam section has two pressing sections that can press the tip portion of the switch lever, and when all the operating members are in a non-operated state, a gap is formed between each of the pressing sections of the switch cam section of each of the operating members and the tip portion of the switch lever, the gap being defined in a circumferential direction with respect to the second rotation axis as a center.

5. The seat drive device according to claim 1, wherein the operating members include operating members divided into a plurality of groups, and the operating members in each group are supported to rotate about the same rotation axis.

6. The seat drive device according to claim 5, further comprising:
- a single switch lever that actuates the switch such that the switch energizes the rotary motor; and
- a plurality of switch cam members supported about the same rotation axis different from the rotation axis of the operating members in each group, wherein the switch cam members are drivably coupled to the corresponding ones of the operating members, wherein each of the switch cam members includes a switch cam section, wherein in response to rotation of the corresponding one of the operating members about the rotation axis, the switch cam section presses the switch lever such that the switch is actuated with a polarity corresponding to a direction of the rotation.

7. The seat drive device according to claim 6, wherein the rotation axis of the operating members is a first rotation axis, the switch lever is supported to rotate about a second rotation axis different from that of the operating members and that of the switch cam members, the switch lever has a tip portion, the operating members are configured such that, in response to rotation of the operating members about the rotation axis, the switch cam section presses the tip portion of the switch lever in accordance with the direction of the rotation, thereby rotating the switch lever about the second rotation axis to actuate the switch, the switch cam section has two pressing sections that can press the tip portion of the switch lever, and when all the operating members are in a non-operated state, a gap is formed between each of the pressing sections of the switch cam section of each of the operating members and the tip portion of the switch lever, the gap being defined in a circumferential direction with respect to the second rotation axis as a center.

8. The seat drive device according to claim 6, further comprising:
- a stop cam that is supported to rotate about a third rotation axis different from that of the operating members and that of the switch cam members, wherein the stop cam has a pressed section projecting radially with respect to the third rotation axis and two restricting sections with the pressed section therebetween, the restricting sections radially projecting from opposite sides of a circumferential direction with respect to the third rotation axis as a center; and
- two engagement sections each provided to one of the switch cam members, the engagement sections selectively pressing the pressed section in accordance with the direction of the rotation, wherein when all the operating members are in a non-operated state, a gap is formed between each of the engagement sections of each of the switch cam members and the pressed section, the gap being defined in the circumferential direction with respect to the third rotation axis as a center, and when any one of the operating members is operated and the pressed section is pressed with the engagement section of the corresponding switch cam member to rotate the stop cam, the restricting section intercepts a path of rotation of the engagement section of different one of the switch cam members.

9. The seat drive device according to claim 1, wherein each of the cam members is supported to be rotational about a rotation axis non-parallel to an axis of the corresponding one of the tubular members, and the seat drive device includes:

an outward flange provided to each of the tubular members;

a cam section provided to each of the cam members, wherein the cam section approaches the outward flange of the corresponding one of the tubular members when the corresponding one of the operating members is at the predetermined initial position, and, in response to operation on the corresponding operating member at the initial position, the cam section rotates to move away from the outward flange of the corresponding tubular member; and a relay member that is located between the corresponding one of the outward flanges and the corresponding one of the cam sections to be rotational in a circumferential direction along a path in which the tubular member moves, wherein, when the corresponding one of the operating members is at the initial position, the relay member is pressed with the cam section to press the outward flange such that the input shaft is released from the fitted state with the tubular member, and, in response to operation on the corresponding operating member at the initial position, the relay member is released from the corresponding cam section to release the outward flange.

10. The seat drive device according to claim 1, wherein each of the tubular members has a distal surface and each of the input shafts has a distal surface facing a corresponding tubular member, the seat drive device further comprising a buffer member placed between the distal surface of each of the tubular members and the distal surface of the input shaft facing each other.

11. The seat drive device according to claim 1, further comprising a housing configured to be attached to a lateral part of a seat cushion and accommodating the clutch mechanisms, wherein each of the positioning mechanisms is configured to be attached to the lateral part of the seat cushion, the positioning mechanism including a transmission unit driven by the corresponding one of the output shafts through a torque cable, and the housing is configured to be arranged in a central part of the lateral part of the seat cushion surrounded by the transmission mechanisms.

12. The seat drive device according to claim 1, further comprising a housing configured to be attached to a lower arm forming a frame of a lateral part of a seat cushion, the housing accommodating the clutch mechanisms, wherein each of the positioning mechanisms includes:

a slide mechanism having a lower rail configured to be fixed to a floor of a vehicle, an upper rail attached to be movable in a longitudinal direction of the lower rail, and a transmission unit driven by the corresponding one of the output shafts through a torque cable, the transmission unit moving the upper rail in the longitudinal direction of the lower rail relative to the lower rail; and a lifter mechanism having a front link pivotally coupled to the upper rail and a front end portion of the lower arm, and a rear link pivotally coupled to a rear end portion of the upper rail and a rear end portion of the lower arm, the lifter mechanism moving the lower arm up and down relative to the upper rail, and the transmission unit is pivotally coupled to the upper rail about an axis extending in a direction of a seat width, the seat drive device further comprising a link having one end portion pivotally coupled to the transmission unit and an opposite end portion pivotally coupled to one of the front link and the rear link or to the lower arm.

13. The seat drive device according to claim 1, further comprising:

a housing configured to be attached to a lower arm forming a frame of a lateral part of a seat cushion, the housing accommodating the clutch mechanisms; and a side cover configured to cover the lateral part of the seat cushion including the housing while exposing the operating members, wherein at least one of the operating members is supported on the housing to rotate about an axis extending in a direction of a seat width and extends in a radial direction with respect to this axis as a center.

14. The seat drive device according to claim 1, further comprising a housing configured to be attached to an outer surface of a lower arm forming a frame of a lateral part of a seat cushion, the outer surface being defined in a direction of a seat width, the housing accommodating the clutch mechanisms, wherein the operating members are configured to be supported on the outer surface of the housing in the direction of the seat width, and the housing tilts inward with respect to the direction of the seat width, toward an upper end.

15. The seat drive device according to claim 14, wherein the rotary motor is configured to be attached to the housing below the seat cushion such that a rotation axis of the rotary motor tilts down further toward a center of the seat width.

16. A seat drive device comprising:

a single rotary motor;

a plurality of operating members provided in correspondence with a plurality of positioning mechanisms;

a plurality of clutch mechanisms provided in correspondence with the positioning mechanisms, wherein each of the clutch mechanisms includes an output shaft connected to a corresponding positioning mechanism, and an input shaft rotated by the rotary motor, wherein, in response to operation on any one of the operating members, the clutch mechanism selectively connects the output shaft to the positioning mechanism corresponding to the operated operating member to the input shaft rotated by the rotary motor; and a single switch, wherein, in response to operation on any one of the operating members, the switch energizes the rotary motor with a polarity corresponding to a direction of the operation, wherein the operating members are supported to rotate about the same rotation axis, the seat drive device further comprises a single switch lever that actuates the switch such that the switch energizes the rotary motor, wherein each of the operating members includes a switch cam section, wherein in response to rotation of the operating member about the rotation axis, the switch cam section presses the switch lever such that the switch is actuated with a polarity corresponding to a direction of the rotation.

17. A seat drive device comprising:
a single rotary motor;
a plurality of operating members provided in correspondence with a plurality of positioning mechanisms;
a plurality of clutch mechanisms provided in correspondence with the positioning mechanisms, wherein each of the clutch mechanisms includes
an output shaft connected to a corresponding positioning mechanism, and
an input shaft rotated by the rotary motor,
wherein, in response to operation on any one of the operating members, the clutch mechanism selectively connects the output shaft to the positioning mechanism corresponding to the operated operating member to the input shaft rotated by the rotary motor; and
a single switch, wherein, in response to operation on any one of the operating members, the switch energizes the rotary motor with a polarity corresponding to a direction of the operation, wherein the operating members include operating members divided into a plurality of groups, and operating members in each group are supported to rotate about the same rotation axis, the seat drive device further comprises:

a single switch lever that actuates the switch such that the switch energizes the rotary motor, and a plurality of switch cam members supported about the same rotation axis different from the rotation axis of the operating members in each group, wherein the switch cam members are drivably coupled to the corresponding ones of the operating members, wherein each of the switch cam members includes a switch cam section, wherein in response to rotation of the corresponding one of the operating members about the rotation axis, the switch cam section presses the switch lever such that the switch is actuated with a polarity corresponding to a direction of the rotation.

* * * * *